(12) United States Patent
Toffey

(10) Patent No.: US 7,433,842 B2
(45) Date of Patent: Oct. 7, 2008

(54) METHOD AND SYSTEM FOR EFFECTING STRAIGHT-THROUGH-PROCESSING OF TRADES OF VARIOUS FINANCIAL INSTRUMENTS

(75) Inventor: James Warden Toffey, Summit, NJ (US)

(73) Assignee: Tradeweb Markets LLC, Jersey City, NJ (US)

( * ) Notice: Subject to any disclaimer, the term of this patent is extended or adjusted under 35 U.S.C. 154(b) by 501 days.

(21) Appl. No.: 10/808,820

(22) Filed: Mar. 25, 2004

(65) Prior Publication Data

US 2004/0236668 A1 Nov. 25, 2004

Related U.S. Application Data

(60) Provisional application No. 60/457,845, filed on Mar. 25, 2003.

(51) Int. Cl.
G06Q 40/00 (2006.01)
(52) U.S. Cl. .......................................... 705/37; 705/38
(58) Field of Classification Search ............... 705/35–37
See application file for complete search history.

(56) References Cited

U.S. PATENT DOCUMENTS

| | | | |
|---|---|---|---|
| 4,674,044 A * | 6/1987 | Kalmus et al. ............... | 705/37 |
| 4,750,135 A | 6/1988 | Boilen | |
| 5,003,473 A | 3/1991 | Richards | |
| 5,077,665 A | 12/1991 | Silverman et al. | |
| 5,136,501 A | 8/1992 | Silverman et al. | |
| 5,168,446 A | 12/1992 | Wiseman | |
| 5,195,031 A | 3/1993 | Ordish | |
| 5,270,922 A | 12/1993 | Higgins | |
| 5,297,032 A | 3/1994 | Trojan et al. | |
| 5,497,317 A * | 3/1996 | Hawkins et al. ............... | 705/37 |
| 5,502,637 A | 3/1996 | Beaulieu et al. | |
| 5,727,165 A | 3/1998 | Ordish et al. | |
| 5,774,880 A | 6/1998 | Ginsberg | |
| 5,826,243 A | 10/1998 | Musmanno et al. | |
| 5,857,176 A | 1/1999 | Ginsberg | |
| 5,905,974 A | 5/1999 | Fraser et al. | |
| 5,924,082 A | 7/1999 | Silverman et al. | |
| 5,924,083 A | 7/1999 | Silverman et al. | |
| 5,927,031 A | 7/1999 | Martin | |
| 5,940,809 A | 8/1999 | Musmanno et al. | |

(Continued)

OTHER PUBLICATIONS

International Search Report dated Jun. 19, 2006 in International Application No. PCT/US2005/10226.

*Primary Examiner*—James A. Kramer
*Assistant Examiner*—Thu Thao Havan
(74) *Attorney, Agent, or Firm*—Stroock & Stroock & Lavan LLP

(57) ABSTRACT

A Straight-Through-Processing (STP) trading platform provides a fully electronic and seamless solution to all substantially aspects of the trading cycle for fixed income instruments and other financial instruments. In an exemplary embodiment, all participants to a trade transaction have access to computer software that facilitates trade order management, trade order generation, trade execution (including electronic axes), trade allocation, allocation acknowledgement, trade confirmation, and finally acquisition of settlement instructions. In said exemplary embodiment, the STP trading platform includes computer software modules including at least an account management module and an electronic trading module to handle the various stages of executing a trade, confirming the trade, and facilitating settlement of the trade.

32 Claims, 48 Drawing Sheets

U.S. PATENT DOCUMENTS

| | | |
|---|---|---|
| 5,946,667 A | 8/1999 | Tull, Jr. et al. |
| 5,987,432 A | 11/1999 | Zusman et al. |
| 6,006,206 A | 12/1999 | Smith et al. |
| 6,016,482 A * | 1/2000 | Molinari et al. ............... 705/35 |
| 6,092,056 A | 7/2000 | Tull, Jr. et al. |
| 6,105,005 A | 8/2000 | Fuhrer |
| 6,173,270 B1 * | 1/2001 | Cristofich et al. ............. 705/37 |
| 6,260,025 B1 | 7/2001 | Silverman et al. |
| 6,269,346 B1 | 7/2001 | Cristofich et al. |
| 6,317,727 B1 | 11/2001 | May |
| 6,317,751 B1 | 11/2001 | Yeger et al. |
| 6,393,409 B2 | 5/2002 | Young et al. |
| 6,421,653 B1 | 7/2002 | May |
| 6,462,758 B1 | 10/2002 | Price et al. |
| 6,505,175 B1 | 1/2003 | Silverman et al. |
| 6,519,574 B1 | 2/2003 | Wilton et al. |
| 6,560,580 B1 | 5/2003 | Fraser et al. |
| 6,587,840 B1 | 7/2003 | Smith et al. |
| 6,606,637 B1 | 8/2003 | Hill et al. |
| 2001/0051908 A1 | 12/2001 | Foster et al. |
| 2002/0002530 A1 | 1/2002 | May |
| 2002/0004777 A1 | 1/2002 | Foster et al. |
| 2002/0016761 A1 | 2/2002 | Foster et al. |
| 2002/0026400 A1 | 2/2002 | Naravan et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otrero et al. |
| 2002/0055901 A1 * | 5/2002 | Gianakouros et al. ......... 705/37 |
| 2002/0082967 A1 | 6/2002 | Kaminsky et al. |
| 2002/0099651 A1 | 7/2002 | May |
| 2002/0116317 A1 | 8/2002 | May |
| 2002/0143694 A1 | 10/2002 | Young et al. |
| 2002/0156719 A1 | 10/2002 | Finebaum et al. |
| 2002/0169704 A1 | 11/2002 | Gilbert et al. |
| 2002/0184142 A1 | 12/2002 | Whang |
| 2003/0046095 A1 | 3/2003 | Jessop et al. |
| 2003/0055774 A1 | 3/2003 | Ginsberg |
| 2003/0061069 A1 | 3/2003 | Silverman et al. |
| 2003/0088509 A1 | 5/2003 | Wilton et al. |
| 2003/0093360 A1 | 5/2003 | May |
| 2003/0115131 A1 | 6/2003 | Heaton et al. |
| 2003/0139997 A1 | 7/2003 | Ginsburg |
| 2003/0149646 A1 | 8/2003 | Chen et al. |

* cited by examiner

FIG. 6

| Network | Index | Accounts | Dealers | Custodians | Users | Admin | Logout | Help |
| Account List | Add Account | Copy Account | Acct Quick Add | Group List | Conf Contact List | Add Contact |

☐ Print ☐ Acct List ☐ Scheduled List (acct) ☐ Scheduled List (acct) ☐ Account Audit ☐ Account Audit Branch Name: TW TradeXpress Inc Test    Branch Code: 1ABCDE762    ☐ Edit    ☐ Schedule Edit
Account Name: Test Separate Acct    Short Name: 629    ACODE XXXX444 — 610
Account Type: institutional    Account Sub Type: N/A
Tax Status: N/A    Tax ID: 00000000
Country Of occupation: UNITED STATES    Start Date: 11/21/2003 4:02:56 PM
Country Of jurisdiction: N/A    Account Group:
Settlement Profile: TEST BANK    Status: RELEASED
Last Modified: 11/20/2003 4:02:56 PM    Modify by: N/A ☐ Depository Country Product Type Search Settlement Insurance

| Country | Depository | Products | Complete |
|---------|-----------|----------|----------|
| ⊞ US | Federal Reserve Bank (Fed Book Entry) | AGCY, GOV | No |
| ⊞ US | The Depository Trust Company (DTCC) | ABS, AQCY, COMM, CORP, EQTY, GOV, MBS, MHKT, MUHI | Yes |

© 2003 TradeWeb Group LLC. All rights reserved (57)

Depository Physical

Name: US Physical Instructions.
Update ↶ Cancel ✗ Clear All

SETTLEMENT INSTRUCTIONS

| Field | Value | Field | Value |
|---|---|---|---|
| *Physical Depository Name: | BANK | *Physical Depository BIC: | |
| *Beneficiary Account #: | 123456 | Beneficiary Account Name: | ACME INVESTORS |
| Beneficiary SWIFT BIC: | ACMEUS33XXX | Beneficiary Market Registration Details: | TIN: |
| *Is Beneficiary a Custodian? | NO | Further Credit Account Number: | |
| Further Credit Account Name: | | Beneficiary Reference: | |
| Physical Depository Phone: | | Linked FX/PairOff/Free Payment Instructions: | US Payment Instructions |
| Physical Depository Contact Name: | Select Contact... | Physical Depository Address 1: | One Wall Street |
| Physical Depository Address 2: | 3rd Floor | Physical Depository Address 3: | Window A |
| Physical Depository Address 4: | New York, NY | | |
| Exchange Currency: | Select Currency... | Exchange Currency: | USD |

FIG.6a

Depository CREST Co Limited     Name: GB Crest Govt Eligible.
    Update   Cancel  ✕ Clear All

BENEFICIARY (BENE)

Beneficiary SWIFT BIC: ACMEUS33XXX

*Beneficiary Name:

Beneficiary Market Registration Details:

Beneficiary Account Number at the Global Custodian:

Beneficiary Further Credit Information:

GLOBAL CUSTODIAN (GC)

*Global Custodian SWIFT BIC:

Global Custodian Name:

*Global Custodian Participant ID/ CREST Code:

Global Custodian Address 1:

Global Custodian Address 2:

Global Custodian Address 3: UNITED KINGDOM

Global Custodian Internal Account Number at Sub-Custodian:

Global Custodian Accounting Agent for IM: Select Yes/No

Contact Name/Desk: Select Contact...

Fax:

*Is Global Custodian Local Clearing Agent: NO

Email:

Phone:

| FIG.6b-1 |
|---|
| FIG.6b-2 |

SUB-CUSTODIAN (SC)

- Sub-Custodian SWIFT BIC: [    ]
- Sub-Custodian Participant ID/CREST Code: [    ]
- Sub-Custodian Address 2: [    ]
- Contact Name/Desk: [Select Contact... ▼]
- Telex: [    ]
- Phone: [    ]

- Sub-Custodian Name: [    ]
- Sub-Custodian Address 1: [BISHOPSGATE EXCHANGE]
- Sub-Custodian Address 3: [UNITED KINGDOM]
- Fax: [    ]
- Email: [    ]

INTERESTED PARTY (IFI)

- Interested Party SWIFT BIC: [    ]
- Interested Party Address 1: [    ]
- Interested Party Address 3: [    ]
- Contact Name/Desk: [Select Contact... ▼]
- Telex: [    ]
- Phone: [    ]

- Interested Party Name: [    ]
- Interested Party Address 2: [    ]
- Interested Party Internal Account Number for IM: [    ]
- Fax: [    ]
- Email: [    ]

FIG.6b-2

Depository: The Depository Trust Company (DTCC)                                         Name: US DTC
                                                                            🔲 Update  ↶ Cancel  ✕ Clear All

SETTLEMENT INSTRUCTIONS

| | | |
|---|---|---|
| Clearing Broker Participant D: [355] | Clearing Broker Name: [        ] | |
| Clearing Broker SWIFT BIC: [        ] | Clearing Broker Contact: [Select Contact...▼] | |
| Clearing Broker Phone: [        ] | Executing Broker/Dealer Participant D: [        ] | |
| Executing Broker Dealer Name: [        ] | Executing Broker Dealer SWIFT BIC: [        ] | |
| Executing Broker/Dealer Contact: [Select Contact...▼] | Executing Broker/Dealer Phone: [        ] | |

ADDITIONAL PARTY

| | | |
|---|---|---|
| Additional Party #1 D: [        ] | Additional Party #1 Name: [        ] | |
| Additional Party #1 SWIFT BIC: [        ] | Additional Party #1 Type: [Select Additional Party Type..▼] | |
| Additional Party #1 ICA#: [        ] | Additional Party #1 Further Credit: [        ] | |
| Additional Party #2 Participant D: [        ] | Additional Party #2 Name: [        ] | |
| Additional Party #2 SWIFT BIC: [        ] | Additional Party #2 Type: [Select Additional Party Type..▼] | |
| Additional Party #2 ICA#: [        ] | Additional Party #2 Further Credit: [        ] | |

DETAILS/OPTIONS

| | |
|---|---|
| Settlement Currency: [USD ▼] | Settlement Currency: [Select Currency...▼] |
| Linked FX/Pairoff/Free Payment Instructions: [US— Cash ▼] | Affirming Party [Select Affirming Party...▼] |

USDEMO

SELL T 1 7/8 09/30/04 1,000 ON 03/12/2003
Composite Quote: 100-317/002  8- 6  1.225-217
Submitted Quote: 100-317                CUSIP: 91282AL4

| Trade | Dlr  | State     | Quantity | Yld(strt) | Price   | Action | End | Time |
|-------|------|-----------|----------|-----------|---------|--------|-----|------|
| 26    | DLRW | Dlr-Quote | 1,000    | 1.2199    | 101-001 | HIT    | END | 0:02 |
| 29    | DLRY | Dlr-Quote | 1,000    | 1.2351    | 100-313 | HIT    | END | 0:04 |
| 25    | DLRZ | Dlr-Quote | 1,000    | 1.2453    | 100-307 | HIT    | END | 0:01 |

NEG  0:09

Dealer Message

Send MSG   TO  ALL

END TRADING    LnUp  LnDn

Main | TSV | Actv | MES | EntV | CP | ADN | TKT | Bid | Book | Msg | Prt

Completed Trade List

Total: 0  Dir-Accept: 0  Auto-Accept: 0  Dir-Pass: 0  Cancelled: 0  Cust-End: 0  Other: 0

State: All ▶   Filter: All ▶   Update   Configure

| Mine | Trade | Axe | Trade State | Type | Size | Security | Quote | Company | Trader | Settle |
|------|-------|-----|-------------|------|------|----------|-------|---------|--------|--------|
|      | 1     |     | ENDED BY CUST | BUY | 10,000 M | FN 6.0 Dec | 102-25+ | TradeWeb | bhult | 12/12/2002 |

Print   Close   First  Pg Up  Pg Dn  Last

FIG.10

DEALER AXE ********Non-Competitive********

Trd# 1     #Accts   1

YOU BID

Issue     FNMA 30 y 6 Dec

Quantity     10.000 MM

Settlement     12/12/2002    1/2   1/4   1/8     December

Quote     102-26

Last Quote to Cust    102-25

0:00

On the Wire
−   10   +

Send

Axe Blotter

TradeWeb Composite On The Run Treasury — 1300

| Coupon | Mty | Price | Dir | Yield | Coupon | Mty | Price | Dir | Yield |
|---|---|---|---|---|---|---|---|---|---|
| 3.625 | 803 | 101-10/103 | 3-4 | 2.564-558 | 6.000 | 809 | 106-183/18+ | 1-3 | 4.908-907 |
| 2.750 | 903 | 100-05+/052 | 1-3 | 2.628-625 | 6.500 | 210 | 109-20+/207 | 1-1 | 4.961-979 |
| 2.750 | O03 | 100-013/016 | 2-5 | 2.719-710 | 5.750 | 810 | 104-235/24 | 1-2 | 5.038-037 |
| 3.000 | N03 | 100-083/085 | 3-5 | 2.823-818 | 5.000 | 211 | 99-06/062 | 1-2 | 5.081-080 |
| 3.250 | D03 | 100-177/181 | 1-3 | 2.890-885 | 5.000 | 811 | 99-06/062 | 1-1 | 5.110-109 |
| 3.000 | 104 | 100-007/01 | 2-5 | 2.952-979 | 4.875 | 212 | 98-051/05+ | 1-3 | 5.116-115 |
| 3.000 | 204 | 99-293/29+ | 1-2 | 3.046-044 | | | | | |
| 3.625 | 304 | 100-286/287 | 3-4 | 3.123-119 | 5.500 | 828 | 95-221/227 | 1-1 | 5.822-820 |
| 3.375 | 404 | 100-11+/115 | 5-1 | 3.181-179 | 5.250 | N28 | 92-125/126 | 1-3 | 5.816-816 |
| | | | | | 5.250 | 229 | 92-162/16+ | 1-2 | 5.804-804 |
| 6.000 | 804 | 105-211/213 | 2-1 | 3.344-341 | 6.125 | 829 | 104-13+/14 | 3-1 | 5.799-798 |
| 5.875 | N04 | 105-182/185 | 2-3 | 3.508-503 | 6.250 | 530 | 106-17+/185 | 2-1 | 5.775-773 |
| 6.750 | 505 | 108-105/095 | 4-1 | 3.777-775 | 5.375 | 231 | 96-09+/10 | 1-3 | 5.636-635 |
| 5.750 | N05 | 105-226/227 | 2-1 | 3.975-974 | | | | | |
| 4.625 | 506 | 101-226/227 | 3-2 | 4.155-153 | 3 mo 08/22 | | 1.7050-7000 | 4-3 | 1.736-731 |
| 3.500 | N06 | 96-208/21 | 2-2 | 4.331-329 | 6 mo 11/21 | | 1.8450-8400 | 5-4 | 1.888-883 |
| 4.375 | 507 | 99-242/24+ | 3-7 | 4.430-428 | | | | | |

11:47 SSB Seller 200MM 2yr @ 100-11+ 0:17 — 1310
11:47 CSFB Buyer 150MM 5⅞ 8/11 @ 99-062 0:28 — 1315

Phone Trade Notice (TRSY) - DLRX

You SOLD TO DLRX

T/D 10/22/2003          S/D  10/23/2003
Security Description    T 4 1/4 08/15/13 10yr Cusip 912828BH2         Qty    1,000
Price 99-252            Yield 4.2759
Trade # 48              Dlr Trade ID 83

Principal:    997,890.63
Interest:       7,968.75
Net:        1,005,859.38

Accept  Reject  Notice  Dismiss 2400 (window)
2410 (content area)

FIG. 25

```
USDEMO                    T  1 7/8 09/30/04                          |Set|
                              Trade Detail                          DETAIL ?

State Accepted    Trade Date  03/11/2003  Company  ABC Corp.
Dealer DLRW       Settlement  03/12/2003  Customer John Smith
Trade # 27        Time 14:54:34-14:54:57 EST LogonID
                                                   Sales Sell  Issue       T  1 7/8 09/30/04
                Cusip       912828AL4 TRSY
                Quantity(m) 1.000
                Price       101-001
                Yield       1.2199
                Price(dec)  101.00390625 USD Principal             1,010,039.06
                Accrued Interest          8,396.29
                Net                   1,018,435.35

Customer Confirm
Dealer Confirm                                    Customer Account
Description                                         # Accounts  1
 Detail | Tsn | Brsn |Tsy |Adv |Mss |Tsa Trad |Room|
                                        | Main | ? | < | > | BuyM | CP | ADJ | Trf | Blot | Book | Msg | Prnt |
```

USDEMO    T 1 7/8 09/30/04

Transaction History

State Accepted   TradeDate 03/11/2003   Company ABC Corp.
Dealer DLRW   Settlement 03/12/2003   Customer John Smith
Trade # 27   Time 14:54:34-14:54:57 EST LogonID
Issue T 1 7/8 09/30/04

```
14:54:34 Trade sent: Sell 1,000 @ 101-001 stl: 03/12/2003
COMP:101-001
14:54:34 Trade received by Dealer
14:54:41 Dealer quote: 101-001/ 0.000 for 1,000 Good for 7 secs
14:54:41 Quote received by Customer: 100-317/ 0.000 for 1,000
14:54:50 Quote update: 101-001/ 1.220 for 1,000 Good for 7 secs
14:54:50 Trade busy, quote update not seen
14:54:51 Customer HITS bid
COMP:101-00 , DLRW:1,000 @ 101-001, DLRY:1,000 @ 101-001
DLRZ:1,000 @ 101-001
14:54:51 Customer response received by Dealer
14:54:57 Dealer ACCEPTS trade
14:54:57 Dealer response received
```

TradeXpress Confirmation Notice

ABC Corp. Sold To You

As Principal:

| Quantity | |
|---|---|
| 1,000,000.00 | |

CUSIP #

Security Description
US Treasury Note
Maturity Date 05/15/11  13.87500%

Call Date 05/15/06
Call Price 100.00

Accrue From    54 Days

Price
115.0742188

Yield to Call
9.1360

Sales ID
534

Amount
Principal  $1,150,742.19
Interest     20,360.05
Comm/Fees/Misc  0.00
NET AMOUNT $1,171,102.24

Trade Date
07/01/2003

Settlement Date
07/01/2006

Account No.
60-12345

Dlr Trade ID
ABC-123

Company Name
A/C Acme
100 Main Street
New York, NY 10043

Special Instructions

Delivery Instructions
ABA # 011000000       ABA # 021000000
Bos Safe Dep/Cust/
A/c # 123456

Terms of Agreement

| File Bookmark Composite Dealers Analytics SecList Msg Admin Windows Help | | | | | | | |
|---|---|---|---|---|---|---|---|
| One Sec | | | | | | Sec ? | |
| TradeXpress Summary (01/20/2004)–MBLOT view | | | | | TRDXPRS | AXE IT | |
| Dir Loc: NY ▼ | View: MBLOT ▼ | All ▼ | TW | Phone | | Page 1 of 7 | |
| Cust Loc: NY ▼ | | Filter: | Allocate ▼ | Yes ▼ | | Update | |
| Date: 01/20/2004 − + | | | | | | | |

| Company | Done | Accepted | Allocated | Unallocated | Tickets | Confirm | Unconfirm |
|---|---|---|---|---|---|---|---|
| Allcan Inc. | 0 | 4 | 0 | 4 | 0 | 0 | 0 |
| Alchemy | 0 | 1 | 1 | 0 | | 0 | 1 |
| Alfa | 0 | 1 | 0 | 1 | 0 | 0 | 0 |
| Allegro | 0 | 1 | 0 | 1 | 0 | 0 | 0 |
| Alliance Capital Mgt | 0 | 5 | 0 | 5 | | 0 | 0 |
| Allianz | 0 | 8 | 8 | 0 | | | 0 |
| AllState | 0 | 1 | 1 | 0 | | 0 | 3 |
| Alleima | 0 | 2 | 2 | 2 | 0 | 0 | 12 |
| American Life | 0 | 7 | 7 | 0 | 0 | 0 | 0 |
| Atlantic | 0 | 1 | 0 | 1 | 0 | 0 | 0 |
| Alcoa | 0 | 6 | 8 | 0 | | | |
| Bank of New York | 0 | | | | | | 2 |

FIG.36A

|  |  | ACCEPTED |  | ALLOCATION | | | |
|---|---|---|---|---|---|---|---|
| COMPANY | PRODUCT | TRADES | VOLUME ('000) | TOTAL | % SINGLE | MULTIPLE | QUANTITY |
| ALL | ALL | 4,278 | 49,091,117 | 1,416 | 33.0% 1,242 | 174 | 18,702,541 |
| ALL | ADN | 159 | 3,853,461 | 104 | 65.0% 95 | 9 | 2,877,509 |
| ALL | AGCY | 429 | 1,183,224 | 165 | 38.0% 143 | 22 | 406,026 |
| ALL | CP | 504 | 15,230,680 | 393 | 78.0% 326 | 67 | 10,078,315 |
| ALL | MBS | 619 | 16,099,362 | 50 | 8.0% 38 | 12 | 2,482,115 |
| ALL | TRSY | 2,547 | 12,722,390 | 704 | 28.0% 640 | 64 | 2,858,176 |
| DEF Co | ALL | 17 | 49,134 | 0 | 0.0% 0 | 0 | 0 |
| DEF Co | MBS | 0 | 0 | 0 | 0.0% 0 | 0 | 0 |
| DEF Co | TRSY | 37 | 49,134 | 0 | 0.0% 0 | 0 | 0 |
| GHI Co | ALL | 0 | 0 | 0 | 0.0% 0 | 0 | 0 |
| GHI Co | AGCY | 0 | 0 | 0 | 0.0% 0 | 0 | 0 |
| GHI Co | TRSY | 0 | 0 | 0 | 0.0% 0 | 0 | 0 |
| SKL Co | ALL | 0 | 0 | 0 | 0.0% 0 | 0 | 0 |
| SKL Co | MBS | 0 | 0 | 0 | 0.0% 0 | 0 | 0 |
| MNO Co | ALL | 10 | 42,855 | 10 | 100.0% 7 | 3 | 42,855 |
| MNO Co | ADN | 1 | 150 | 1 | 100.0% 1 | 0 | 150 |
| MNO Co | CP | 3 | 36,790 | 3 | 100.0% 1 | 2 | 36,790 |
| MNO Co | MBS | 0 | 0 | 0 | 0.0% 0 | 0 | 0 |
| MNO Co | TRSY | 6 | 5,913 | 6 | 100.0% 5 | 1 | 5,915 |

| FIG. 37A | FIG. 37B | FIG. 37C |

| % | CANCEL $ | % | TIME TO ALLOCATE (min.) | | | | TICKETS | | |
|---|---|---|---|---|---|---|---|---|---|
| | | | TW | BENCH MARK (a) | DEALER (b) | DUT (a-b) | TICKETS | CONF | % |
| 38.0% | 5 | 0.0% | 17.4 | 30.0 | 27.8 | 2.2 | 1,900 | 1,764 | 67.0% |
| 75.0% | 0 | 0.0% | 8.2 | 30.0 | 6.8 | 23.2 | 145 | 34 | 23.0% |
| 34.0% | 0 | 0.0% | 11.4 | 30.0 | 9.2 | 20.8 | 224 | 187 | 83.0% |
| 66.0% | 4 | 0.0% | 14.7 | 30.0 | 15.3 | 14.7 | 518 | 190 | 37.0% |
| 15.0% | 0 | 0.0% | 6.7 | 30.0 | 19.5 | 14.1 | 73 | 55 | 75.0% |
| 22.0% | 1 | 0.0% | 21.7 | 30.0 | 43.2 | -13.2 | 940 | 798 | 85.0% |
| 0.0% | 0 | 0.0% | 0.0 | 30.0 | 0.0 | 30.0 | 0 | 0 | 0.0% |
| 0.0% | 0 | 0.0% | 0.0 | 30.0 | 0.0 | 30.0 | 0 | 0 | 0.0% |
| 0.0% | 0 | 0.0% | 13.6 | 30.0 | 0.0 | 30.0 | 0 | 0 | 0.0% |
| 0.0% | 0 | 0.0% | 7.5 | 30.0 | 0.0 | 30.0 | 0 | 0 | 0.0% |
| 0.0% | 0 | 0.0% | 16.1 | 30.0 | 0.0 | 30.0 | 0 | 0 | 0.0% |
| 0.0% | 0 | 0.0% | 0.0 | 30.0 | 0.0 | 30.0 | 0 | 0 | 0.0% |
| 0.0% | 0 | 0.0% | 0.0 | 30.0 | 0.0 | 30.0 | 0 | 0 | 0.0% |
| 0.0% | 0 | 0.0% | 4.9 | 30.0 | 1.4 | 28.6 | 18 | 8 | 44.0% |
| 100.0% | 0 | 0.0% | 0.0 | 30.0 | 0.0 | 30.0 | 1 | 0 | 0.0% |
| 100.0% | 0 | 0.0% | 0.7 | 30.0 | 0.5 | 29.5 | 8 | 0 | 0.0% |
| 0.0% | 0 | 0.0% | 1.9 | 30.0 | 0.0 | 30.0 | 0 | 0 | 0.0% |
| 100.0% | 0 | 0.0% | 15.5 | 30.0 | 2.1 | 27.9 | 9 | 8 | 89.0% |

FIG.37B

| UNCONF | % | ERROR | % | TW | BENCH MARK | DEALER | DUT | RANK |
|---|---|---|---|---|---|---|---|---|
| | | | | | TIME TO CONFIRM (min.) | | | |
| | | | | | (c) | (d) | (c-d) | |
| 636 | 33.0% | 0 | 0.0% | 46.9 | 60.0 | 19.7 | 40.3 | 3 |
| 111 | 77.0% | 0 | 0.0% | 44.5 | 60.0 | 33.3 | 26.7 | 4 |
| 37 | 17.0% | 0 | 0.0% | 43.8 | 60.0 | 9.3 | 50.7 | 3 |
| 328 | 63.0% | 0 | 0.0% | 65.8 | 60.0 | 33.9 | 26.1 | 3 |
| 18 | 25.0% | 0 | 0.0% | 66.8 | 60.0 | 3.2 | 56.8 | 2 |
| 142 | 15.0% | 0 | 0.0% | 38.5 | 60.0 | 19.4 | 40.6 | 4 |
| 0 | 0.0% | 0 | 0.0% | 0.0 | 60.0 | 0.0 | 60.0 | n/a |
| 0 | 0.0% | 0 | 0.0% | 0.0 | 60.0 | 0.0 | 60.0 | n/a |
| 0 | 0.0% | 0 | 0.0% | 0.0 | 60.0 | 0.0 | 60.0 | n/a |
| 0 | 0.0% | 0 | 0.0% | 121.4 | 60.0 | 0.0 | 60.0 | n/a |
| 0 | 0.0% | 0 | 0.0% | 115.6 | 60.0 | 0.0 | 60.0 | n/a |
| 0 | 0.0% | 0 | 0.0% | 124.0 | 60.0 | 0.0 | 60.0 | n/a |
| 0 | 0.0% | 0 | 0.0% | 0.0 | 60.0 | 0.0 | 60.0 | n/a |
| 10 | 36.0% | 0 | 0.0% | 30.2 | 60.0 | 66.1 | -6.1 | 5 |
| 1 | 100.0% | 0 | 0.0% | 5.8 | 60.0 | 0.0 | 60.0 | n/a |
| 8 | 100.0% | 0 | 0.0% | 128.3 | 60.0 | 0.0 | 60.0 | n/a |
| 0 | 0.0% | 0 | 0.0% | 0.0 | 60.0 | 0.0 | 60.0 | n/a |
| 1 | 11.0% | 0 | 0.0% | 56.8 | 60.0 | 66.1 | -6.1 | 2 |

| COMPANY | PRODUCT | ACCEPTED | | ALLOCATIONS | | | | |
|---|---|---|---|---|---|---|---|---|
| | | TRADES | VOLUME ('000) | TOTAL | % | SINGLE | MULTIPLE | QUANTITY |
| ALL | ALL | 32,320 | 336,966,904 | 10,797 | 33.0% | 9,381 | 1,416 | 143,729,122 |
| ABC Co | ALL | 4,278 | 49,091,117 | 1,416 | 33.0% | 1,242 | 174 | 18,702,541 |
| MAX | ALL | 8,854 | 53,010,140 | 2,511 | 28.0% | 3,224 | 217 | 18,086,005 |
| MIN | ALL | 295 | 1,141,290 | 99 | 34.0% | 93 | 6 | 152,711 |
| ALL | ADN | 587 | 11,636,247 | 392 | 67.0% | 322 | 70 | 7,675,716 |
| ABC Co | ADN | 159 | 3,853,471 | 104 | 65.0% | 95 | 9 | 2,877,509 |
| MAX | ADN | 50 | 1,141,350 | 35 | 70.0% | 26 | 9 | 473,213 |
| MIN | ADN | 0 | 0 | 0 | 0.0% | 0 | 9 | 0 |
| ALL | AGCY | 4,108 | 8,426,045 | 1,139 | 28.0% | 1,021 | 118 | 2,510,628 |
| ABC Co | AGCY | 429 | 1,185,124 | 163 | 38.0% | 143 | 22 | 406,026 |
| MAX | AGCY | 1,066 | 1,996,199 | 284 | 27.0% | 253 | 31 | 663,724 |
| MIN | AGCY | 64 | 88,605 | 8 | 13.0% | 7 | 1 | 2,620 |
| ALL | CORP | 0 | 0 | 0 | 0.0% | 0 | 0 | 0 |
| MAX | CORP | 0 | 0 | 0 | 0.0% | 0 | 0 | 0 |
| MIN | CORP | 0 | 0 | 0 | 0.0% | 0 | 0 | 0 |
| ALL | CP | 3,977 | 112,506,129 | 3,112 | 79.0% | 2,695 | 417 | 72,735,503 |
| ABC Co | CP | 504 | 15,230,680 | 393 | 78.0% | 326 | 67 | 10,078,315 |
| MAX | CP | 390 | 12,561,803 | 292 | 75.0% | 250 | 42 | 6,918,448 |
| MIN | CP | 307 | 8,332,460 | 257 | 84.0% | 220 | 37 | 5,338,911 |
| ALL | MBS | 3,791 | 88,953,967 | 509 | 13.0% | 433 | 76 | 23,933,250 |
| ABC Co | MBS | 639 | 16,099,362 | 50 | 8.0% | 38 | 12 | 2,482,515 |
| MAX | MBS | 86 | 1,324,850 | 18 | 21.0% | 12 | 6 | 484,550 |
| MIN | MBS | 195 | 4,296,489 | 23 | 12.0% | 17 | 6 | 535,070 |
| ALL | TRSY | 19,857 | 115,444,516 | 5,615 | 28% | 4,910 | 705 | 36,174,025 |
| ABC Co | TRSY | 2,517 | 12,722,390 | 704 | 28% | 640 | 64 | 2,858,176 |
| MAX | TRSY | 7,029 | 32,857,998 | 2,005 | 29.0% | 1,716 | 219 | 8,972,899 |
| MIN | TRSY | 264 | 1,065,980 | 87 | 33.0% | 82 | 5 | 107,216 |

FIG. 38B

| % | CANCEL $ | % | TW | BENCH MARK | DEALER | TICKETS | CONF | % |
|---|---|---|---|---|---|---|---|---|
| 43.0% | 52 | 0.0% | 17.4 | 30.0 | 12.6 | 15,937 | 10,171 | 64.0% |
| 38.0% | 5 | 0.0% | 27.8 | 30.0 | 2.2 | 1,900 | 1,262 | 66.0% |
| 34.0% | 11 | 0.0% | 18.5 | 30.0 | 11.5 | 3,591 | 3,295 | 92.0% |
| 13.0% | 0 | 0.0% | 0.2 | 30.0 | 29.2 | 149 | 0 | 0.0% |
| 66.0% | 1 | 0.0% | 8.2 | 30.0 | 21.8 | 642 | 304 | 47.0% |
| 75.0% | 0 | 0.0% | 6.8 | 30.0 | 23.2 | 145 | 14 | 83.0% |
| 41.0% | 1 | 3.0% | 11.4 | 30.0 | 18.6 | 57 | 52 | 93.0% |
| 0.0% | 0 | 0.0% | 0.0 | 30.0 | n/a | 0 | 0 | 0.0% |
| 30.0% | 5 | 0.0% | 11.4 | 30.0 | 18.6 | 1,531 | 1,098 | 72.0% |
| 34.0% | 0 | 0.0% | 9.2 | 30.0 | 20.8 | 224 | 187 | 83.0% |
| 33.0% | 0 | 0.0% | 14.3 | 30.0 | 15.7 | 179 | 360 | 95.0% |
| 3.0% | 0 | 0.0% | 0.1 | 30.0 | 29.9 | 9 | 0 | 0.0% |
| 0.0% | 0 | 0.0% | 0.0 | 30.0 | n/a | 0 | 0 | 0.0% |
| 0.0% | 0 | 0.0% | 0.0 | 30.0 | n/a | 0 | 0 | 0.0% |
| 0.0% | 0 | 0.0% | 0.0 | 30.0 | n/a | 0 | 0 | 0.0% |
| 65.0% | 3 | 0.0% | 14.7 | 30.0 | 15.3 | 4,071 | 2,569 | 63.0% |
| 66.0% | 4 | 1.0% | 15.3 | 30.0 | 14.7 | 518 | 188 | 36.0% |
| 55.0% | 6 | 0.0% | 13.2 | 30.0 | 16.8 | 375 | 353 | 94.0% |
| 64.0% | 0 | 0.0% | 14.8 | 30.0 | 15.2 | 125 | 0 | 0.0% |
| 23.0% | 6 | 0.0% | 6.7 | 30.0 | 23.3 | 671 | 267 | 40.0% |
| 15.0% | 0 | 0.0% | 15.9 | 30.0 | 14.1 | 73 | 55 | 75.0% |
| 37.0% | 0 | 0.0% | 0.6 | 30.0 | 29.4 | 29 | 26 | 50.0% |
| 12.0% | 0 | 0.0% | 2.8 | 30.0 | 27.3 | 34 | 0 | 0.0% |
| 32.0% | 38 | 1.0% | 21.7 | 30.0 | 8.3 | 9,022 | 5,933 | 66.0% |
| 22.0% | 1 | 0.0% | 43.2 | 30.0 | -13.2 | 940 | 798 | 85.0% |
| 27.0% | 11 | 1.0% | 19.7 | 30.0 | 10.3 | 2,910 | 30.0 | 92.0% |
| 10.0% | 0 | 0.0% | 0.3 | 30.0 | 29.7 | % | 0 | 0.0% |

| FIG.38A | FIG.38B | FIG.38C |
|---|---|---|

| UNCONF | % | ERROR | % | TIME TO CONFIRM (min.) | | |
|---|---|---|---|---|---|---|
| | | | | TW | BENCH MARK | DUT |
| 5,766 | 36.0% | 128 | 1.0% | 44.0 | 60.0 | 16.0 |
| 638 | 34.0% | 0 | 0.0% | 16.1 | 60.0 | 43.9 |
| 296 | 8.0% | 0 | 0.0% | 41.9 | 60.0 | 18.1 |
| 149 | 100.0% | 0 | 0.0% | 0.0 | 60.0 | n/a |
| 333 | 53.0% | 5 | 1.0% | 41.7 | 60.0 | 18.3 |
| 111 | 77.0% | 0 | 0.0% | 11.7 | 60.0 | 48.3 |
| 5 | 9.0% | 5 | 9.0% | 8.5 | 60.0 | 51.9 |
| 0 | 0.0% | 0 | 0.0% | 0.0 | 60.0 | n/a |
| 433 | 28.0% | 15 | 1.0% | 37.8 | 60.0 | 22.2 |
| 37 | 17.0% | 0 | 0.0% | 8.3 | 60.0 | 51.7 |
| 19 | 5.0% | 0 | 0.0% | 41.2 | 60.0 | 18.3 |
| 9 | 100.0% | 0 | 0.0% | 0.0 | 60.0 | n/a |
| 0 | 0.0% | 0 | 0.0% | 0.0 | 60.0 | n/a |
| 0 | 0.0% | 0 | 0.0% | 0.0 | 60.0 | n/a |
| 0 | 0.0% | 0 | 0.0% | 0.0 | 60.0 | n/a |
| 1,502 | 37.0% | 60 | 1.0% | 65.4 | 60.0 | -5.4 |
| 330 | 64.0% | 0 | 0.0% | 17.2 | 60.0 | 42.8 |
| 22 | 4.0% | 21 | 6.0% | 32.5 | 60.0 | 27.3 |
| 325 | 100.0% | 0 | 0.0% | 0.0 | 60.0 | n/a |
| 404 | 60.0% | 5 | 10.0% | 54.3 | 60.0 | 10.0% |
| 18 | 25.0% | 0 | 0.0% | 4.7 | 60.0 | 0.0% |
| 3 | 10.0% | 0 | 0.0% | 66.3 | 60.0 | 0.0% |
| 34 | 100.0% | 0 | 0.0% | 0.0 | 60.0 | n/a |
| 3,089 | 34.0% | 43 | 0.0% | 35.5 | 60.0 | 24.5 |
| 142 | 15.0% | 0 | 0.0% | 18.7 | 60.0 | 41.3 |
| 237 | 8.0% | 0 | 0.0% | 37.9 | 60.0 | 22.1 |
| 96 | 100.0% | 0 | 0.0% | 0.0 | 60.0 | n/a |

METHOD AND SYSTEM FOR EFFECTING STRAIGHT-THROUGH-PROCESSING OF TRADES OF VARIOUS FINANCIAL INSTRUMENTS

CROSS-REFERENCE TO RELATED APPLICATIONS

This application claims priority to U.S. Provisional Application Ser. No. 60/457,845, filed on Mar. 25, 2003, the entire disclosure of which is incorporated herein by reference.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND

1. Field of the Invention

The present invention relates generally to electronic trading methods and systems and, more particularly, to electronic trading methods and systems that provide straight-through processing.

2. Description of Related Art

Fixed income instruments, such as treasuries, mortgages, commercial paper offerings, corporate and government bonds, and the like, traditionally have been traded using an inefficient, error-prone manual process. Recently, the market for fixed income instruments has undergone a certain degree of automation. While such automation represents an improvement to the manual process, many of the problems and inefficiencies associated with the traditional, manual process still exist.

To summarize the manual process, a customer desiring to buy or sell a fixed income instrument first would make an inquiry, or a request for a quote, to a dealer that is willing to buy and sell such as principal. The customer may be any person or entity desiring to trade but generally refers to buy-side institutions, such as investment funds, institutional investors, money market funds, and mortgage brokers to name a few. The dealer generally is any person or entity that is registered with the Securities and Exchange Commission (SEC) or an equivalent non-U.S. regulator to deal (i.e., to make a market for) financial instruments for its own account (at its bid price) or sell from its own account (at its ask or offer price). In the past, to initiate the manual trading process, a customer would make an inquiry, for example, via the telephone or facsimile transmission. Frequently, the customer would make an inquiry to several dealers with which the customer has a relationship before identifying a dealer willing to trade in the desired instrument. Because the manual process required the customer to telephone each of the dealers individually, the process of requesting price quotes could take several minutes during which time the market may have moved against the customer. Once the customer identified an acceptable dealer the customer and dealer would verbally agree to the negotiated price for the desired fixed income instrument and execute the trade.

Upon verbal agreement, both the customer and dealer would manually write the trade details on a trade ticket. A trade ticket typically comprised several layers of carbon paper, such that at least one layer could be passed to the back office personnel responsible for confirming trades. These processes are prone to error due to the manual nature of the recordation process. In this case, the trade details may be electronically transmitted to back office systems operated by personnel responsible for confirming trades.

Executing the trade, however, is only part of the trade cycle. Back office functions, such as confirmation, allocation and settlement, were also performed manually. Rule 10b-10 under the Securities Exchange Act of 1934 ("Rule 10b-10") and equivalent non-U.S. rules relating to confirmation and clearance of trades require that a dealer provide certain written disclosures to a customer immediately after the completion of a transaction to confirm the trade. In order to create the Rule 10b-10 confirmation, the dealer would manually extract the details of the trade, such as those passed on the trade ticket, and create a paper confirmation—an inefficient process prone to potential human error.

As for allocation, the customer, if trading on behalf of several client accounts, would have to transmit allocation instructions to the dealer regarding the financial instruments being bought or sold to any of the number of different sub-accounts. More specifically, a customer entering into a large block trade on behalf of several accounts would provide allocation instructions to the dealer, for example, via the telephone or via facsimile. Again, this manual process was open to human error, not only in providing and recording the proper instructions, but also in propagating the correct instructions to the other back office personnel responsible for other functions, such as confirmation and settlement.

In order to settle allocated trades, a customer would deliver settlement instructions (e.g., Central Securities Depository (CSD) settlement data, including the CSD address, swift codes, ABA number, account number and account name) to a dealer via facsimile or telephone. The dealer would manually input this information into their internal systems to generate the confirmation and to facilitate clearance and settlement of the securities traded. Following the customer's approval of the information, the dealer would provide the trade details and settlement instructions to the relevant clearing agency to effect settlement of the trade. Similar to the trade execution phase, there was no direct link between customers, dealers, and clearing institutions to exchange trade details and settlement instructions during the settlement process. Thus, the manual trading and settlement process was prone to errors and often took several days to complete.

The traditional manual process recently has given way to electronic trading systems as mentioned above. In general, although the electronic trading systems have several advantages over the manual process, such electronic trading systems have focused on the discreet parts of the trading cycle and, consequently, suffer from a lack of compatibility and interoperability. Furthermore, existing electronic trading systems, in large part, simply automate the manual process and thereby perpetuate the inefficiencies of the manual process and fail to provide needed new functionality. As discussed below, because existing electronic trading systems lack compatibility across the various stages of the trade cycle and fail to automate key post-trade functions, existing systems have failed to eliminate significant sources of error and inefficiencies.

More specifically, because electronic trading systems are directed to discreet parts of the trading cycle, such systems do not adequately provide a means to achieve straight-through processing (STP) of trades, namely, to execute block trades, allocate block trades to sub-accounts, confirm the trade, details, allocations and settlement instructions, and settle the trades based on such information. Absent custom-built communication interfaces, a system directed to one aspect of the trade cycle typically cannot automatically pass recoded information to a system directed to another aspect of the trade cycle. Thus, the information must be manually duplicated and re-entered at various points during the trading cycle.

For example, even where a dealer uses an electronic trading system to effectuate a trade, the dealer must manually input details of the trade into a separate back office system in order to generate confirmations and facilitate the settlement process. As a result, the post-trade confirmation and settlement process remains open to possible human error, even where electronic trading systems are used. Moreover, typical electronic post-trade allocation confirmation systems are often incompatible with electronic settlement instruction databases and systems that provide trade details regarding trades executed in non-electronic formats, such as via telephone, thereby forcing dealers to maintain redundant systems. Although an improvement to traditional manual processes, unnecessary duplication of records and potential delays with delivery of trade details, allocations, confirmations and settlement instructions and in the settlement of trades still exist.

Similarly, although many market participants have begun using electronic back office trade management systems, such systems are typically incompatible with front office electronic trade execution systems. Thus, even if a trade is executed electronically, the trade details must be manually input into the various back office systems. In short, the electronic trade allocation and settlement of fixed-income instruments remains a fractured process that is subject to inefficiencies and errors and prevents efficient straight-through-processing of trades.

Furthermore, efficiencies provided by existing electronic trading systems are typically limited to only a portion of a dealer's or customer's trading volume. Dealers frequently enter into trades via more than one electronic system and over the phone. These electronic systems, while providing increased efficiency for trades conducted on each system, are incompatible with each other and with manual processes, making it impossible to recognize a benefit of one system across all phases of the trading cycle. Indeed, such disparate systems can add to the complexity and inefficiency of management of a customer's or dealer's entire trading volume.

The inefficiencies of existing electronic systems are further exacerbated due to the lack of uniformity across market participants. Because trades must be accepted and confirmed at least by the two parties to the trade (and sometimes third and fourth parties), and because different parties often utilize incompatible systems, there is presently no system available that can process trades from generation to execution to allocation to confirmation and finally to settlement to achieve true straight-through processing of trades.

In addition to incompatibility among electronic trading systems limiting their effectiveness, existing electronic trading systems simply have automated the traditional, manual process without changing the general trading-cycle paradigm and without adding new features to enhance the usability or efficiency of the systems. As such, the existing electronic trading systems have many of the inherent inefficiencies as the manual trading.

Thus, a need exists for a system and method for effecting straight-through processing of trades and, more particularly, for a system and method for enabling electronic execution of trades, an electronic allocation and acceptance system that is integrated with a standing settlement instructions database, such that settlement instructions can be propagated throughout the trading cycle to reduce the possibility of costly and time consuming error inherent in the tradition manual process.

Furthermore, there is a need for a system and method for generating electronic trade confirmations that conform to regulatory standards to permit the virtually seamless execution, allocation, acceptance, confirmation and settlement of trades.

Moreover, because most existing fixed-income electronic trading systems merely implement the traditional customer inquiry-based and inventory-based trading paradigms, such electronic trading systems do not provide a means for permitting dealers to initiate trading by transmitting executable, firm trade offers. In the industry, a message from a dealer to a customer regarding a trade is commonly referred to as an "axe." Presently, dealer axes are communicated to customers via telephone or some other electronic based messaging system, such as through Bloomberg L.P.'s BLOOMBERG PROFESSIONAL® service, electronic mail, or an electronic indication of interest (IOI system). These systems, however, are inefficient for the transmission of axes for several reasons. Such systems do not permit the transmission of executable axes that are actionable by one or more customers to execute a trade. Thus, a need exists for trading systems and methods that provide increased liquidity and, more particularly, that allow dealers an improved means for initiating trades.

SUMMARY

Various embodiments of the present invention satisfy the foregoing, as well as other needs. More specifically, such embodiments generally relate to an electronic trading platform that provides straight-through processing (STP) of various financial instruments, including, but not limited to, liquid fixed-income instruments. The STP trading platform (e.g., systems and methods) described herein overcomes the shortcomings of present trading systems and methods for the trading, allocation, confirmation and settlement of fixed income instruments.

In an exemplary embodiment of the present invention, the STP trading platform has the ability to execute trades, dynamically allocate trades according to customer instructions, confirm the trade details and allocations and provide accurate settlement instructions for the trades using a centralized database of standing settlement instructions.

The STP trading platform also is capable of generating electronic confirmations to facilitate confirmation and settlement of trades. Further, the STP trading platform is capable of leveraging it unique position as a centralized trading, allocation confirm the trade details and allocations and settlement platform to provide customers and dealers with advanced reporting of various industry and trade data. As will be appreciated by those skilled in the art, the STP trading platform permits participants to initiate trade inquires, execute trades, allocate trades to sub-accounts, confirm the trade details and allocations and electronically confirm trades, so as to eliminate the need to manually input and re-input trade data in multiple systems designed to handle only one aspect of the trading cycle. Moreover, by maintaining a centralized database of standing settlement instructions, the described STP trading platform reduces the possibility of trade failures due to inaccuracies in the provisions of settlement instructions between customers and dealers. Thus, the standardized and integrated approach of the STP trading platform both streamlines and comprehensively improves the trading process. Due to integration of such functionality, the trading platform also provides an electronic, paperless solution for the entire trading cycle, including trade order generation, trade execution, trade allocation, allocation and trade detail acknowledgement, electronic trade confirmation, and access to standing settlement instructions to facilitate settlement of trades.

Certain embodiments described herein further satisfy the needs of the dealers to initiate binding electronic trade inquiries (or electronic axes). The binding electronic axe functionality of such embodiments adds an additional layer of liquidity for dealers who traditionally could only initiate actionable trades via the Interdealer Broker market, which is comprised solely of other dealers and is conducted in an anonymous manner (as compared to the dealer-to-customer fully disclosed model). Thus, by permitting dealers to initiate trade inquiries in an efficient and binding manner, the dealer has access to an additional layer of market liquidity, while its customer base is afforded the opportunity to see real-time, firm market prices—information a composite pricing matrix can only approximate.

In an exemplary embodiment, the STP trading platform comprises one or more software applications operative on a server system, along with data storage devices and communication devices, to achieve straight-through processing of the entire trading cycle.

Participants to a transaction have access to computer software that facilitates trade order management, trade order generation, trade execution (including electronic axes), trade allocation, allocation and trade details acknowledgement, trade confirmation, and finally acquisition of settlement instructions. In the exemplary embodiment presently being described, the STP trading platform includes computer software modules including at least an account management module, an electronic trading module, and a back office management module. The operation and functionality of these modules is discussed below.

Thus, as is evident from the above-description, the STP trading platform integrates various software modules and communication links to process the originating execution, allocation, acknowledgement of allocation, and trade details electronic confirmation, and enriching details with settlement instructions of trades. Additional features and advantageous of the system are described further below.

BRIEF DESCRIPTION OF THE DRAWINGS

FIGS. 6-18 are screen shots depicting exemplary graphical user interfaces of various features of the STP trading platform;

FIG. 23 is a screen shot depicting exemplary graphical user interfaces of various features of the STP trading platform;

FIGS. 25-28 are screen shots depicting exemplary graphical user interfaces of various features of the STP trading platform;

FIGS. 32-36 are screen shots depicting exemplary graphical user interfaces of various features of the STP trading platform; and FIGS. 37-38 depict exemplary performance reports in accordance with the exemplary embodiments of the present invention.

DETAILED DESCRIPTION OF THE EXEMPLARY EMBODIMENTS

Figure 1:
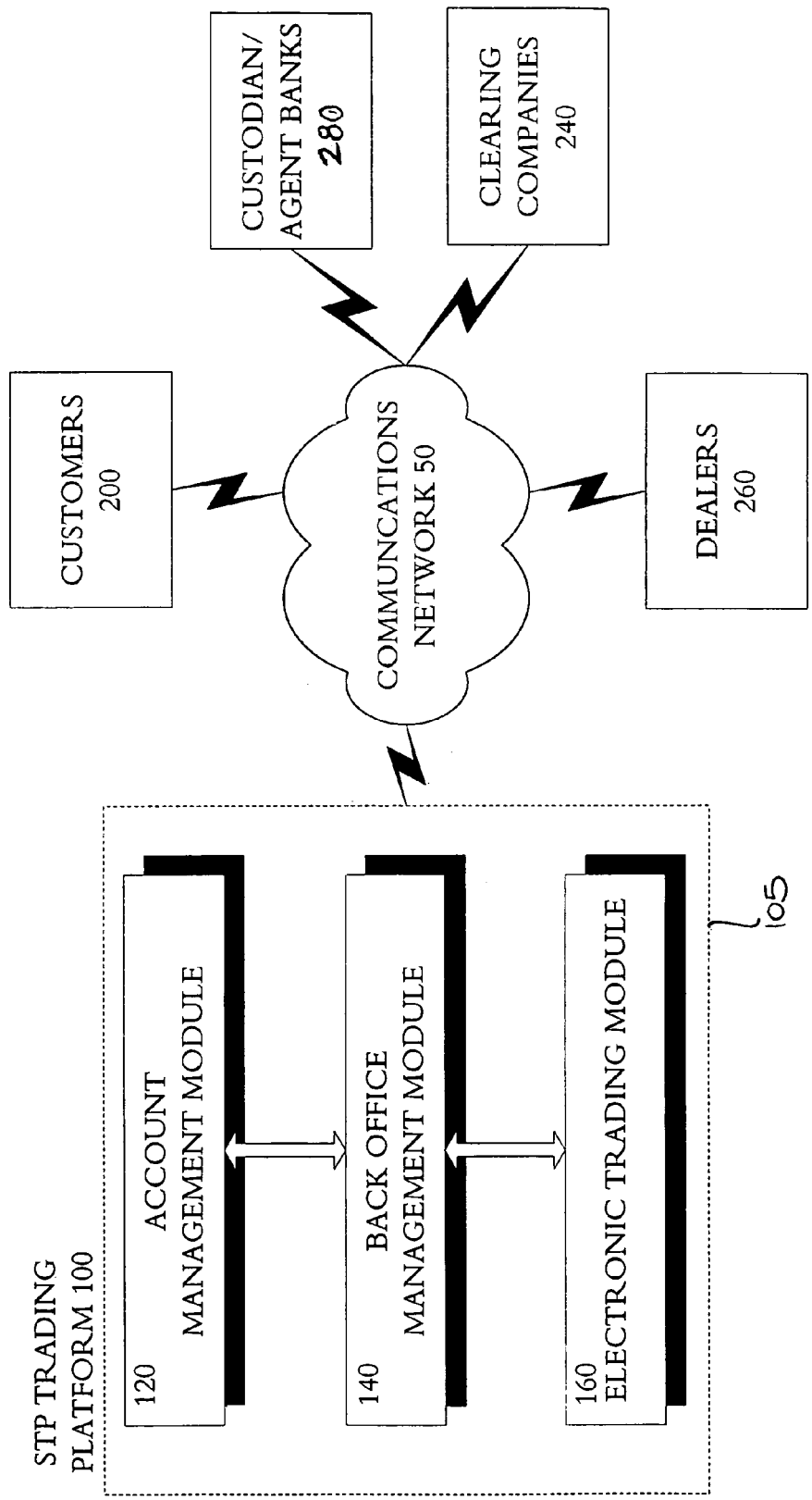
FIG. 1 is a schematic block diagram of the exemplary STP trading platform in communication with various users.
Figure 2:
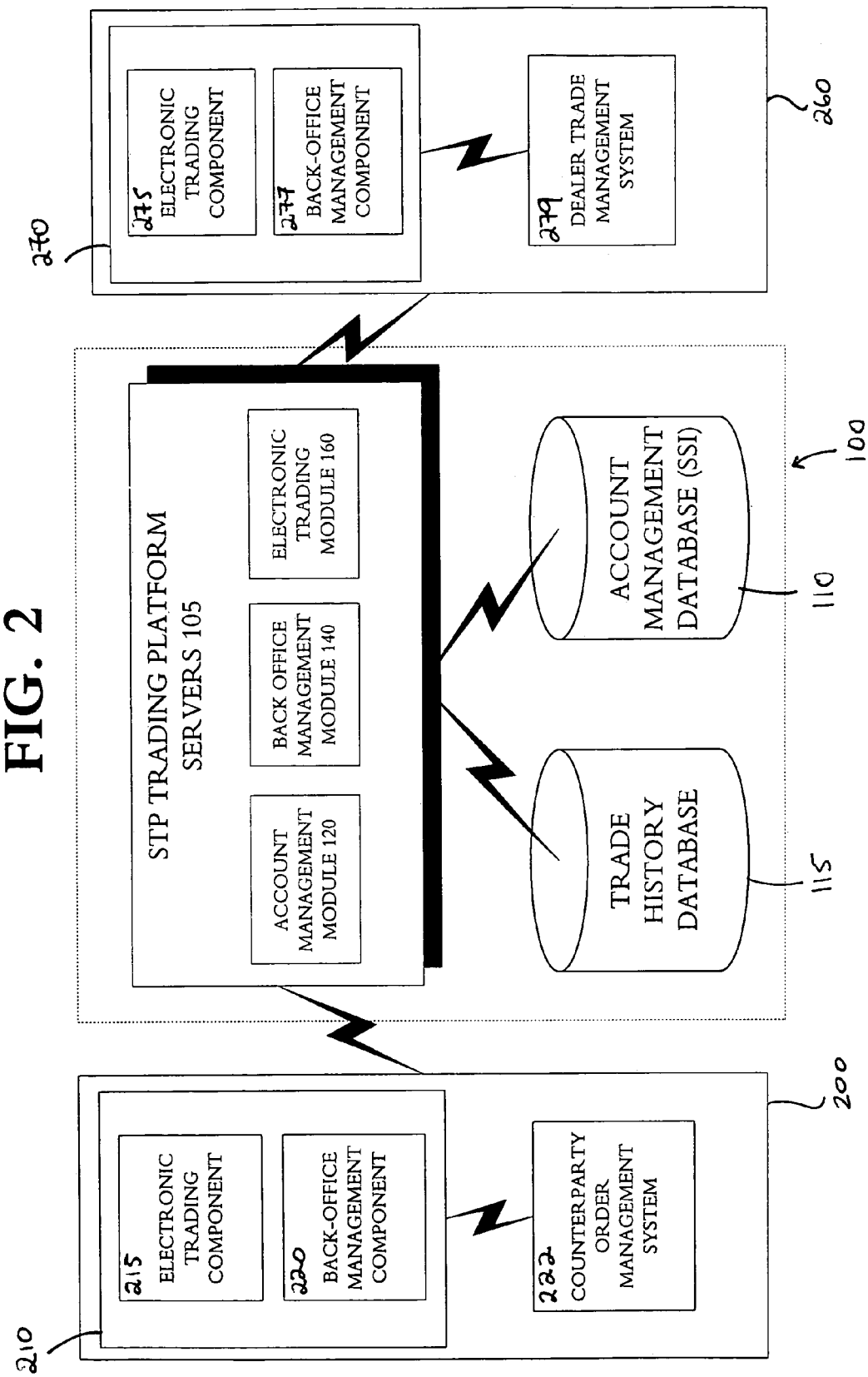
FIG. 2 depicts an exemplary system architecture of the STP trading platform.

In an exemplary embodiment, as shown in FIG. 1, a computerized STP trading platform 100 interconnects the computers of customers 200, custodians 280, such as a bank, agent, trust company or other organization responsible for safeguarding the assets of another person or entity, like a customer, clearing institutions 240, and dealers 260 via existing communications network 50, such as the Internet. Moreover, as illustrated in FIG. 2, the STP trading platform 100 preferably utilizes a distributed software application arrangement, as will be further described below in the "System Architecture" section of the present application, to provide the straight-through-processing ("STP") of trades. Although the exemplary embodiments described herein are described in terms of a distributed, networked software solution operative in a client-server environment, a wholly server-based or client-based approach could be adopted, so long as the system was configured to provide the functionality disclosed herein.

The Trading Cycle

A summary of the trading cycle will now be described. The typical trading cycle begins with traders for customers accessing indicative market pricing feeds, although, as described below, trades can be initiated through an internal order management system. Indicative market pricing feeds or composite price matrices, such as those shown and described herein, generally receive near real-time indicative pricing data from dealers. The price data is then input into a software algorithm to generate the composite price screen. The operation of the composite price algorithm is not critical to the present invention and, therefore, specifics of the algorithm are not discussed. The composite price screens are generated by the software algorithm operative of the STP trading platform servers (shown in FIG. 2 as servers 105) and communicated through a network 50 to both the customer and dealer computer systems 200, 260.

With reference to FIG. 2, operative on the customer computer system 200 is a customer-side software client 210 that includes an electronic trading component 215 and a back-office management component 220. The customer-side software client 210 is configured to receive and display the composite price screens and to permit customer traders to create trade inquiries, search dealer offerings, receive dealer axes, execute trades, allocate trades, and perform various other back office functions, as further described below. The customer generally views a composite price screen so as to gather information relating to a particular fixed income instrument. Dealers may also view composite price screens to keep apprised of market trends. As described below, the customer can initiate a trade inquiry from the composite price screens.

In general, the STP trading platform 100 operates according to an inquiry-based trading environment. Thus, typically, a customer desiring to buy or sell financial instruments makes an electronic inquiry of one or more dealers for prices at which the instruments can be bought or sold. Because multiple dealers may be competing against one another, this type of inquiry is sometimes referred to as competitive auction-based inquiry. In other instances, for example, in the case of commercial paper offerings (CPOs), the STP trading platform 100 may be configured to operate according to an inventory-based trading environment in which dealers post inventories of various financial instruments from which customers can make purchases.

In the exemplary embodiment being described, dealers interact with a dealer-side software client 270 operative on the dealer system 260. Operating in connection with the electronic trading module 160 of the STP trading platform 100, an electronic trading component 275 of the dealer-side software client 270 permits dealers to receive trade inquiries from customers, create axes, manage the provision of market prices to customers in response to the inquiries through the STP trading platform 100, execute trades, receive customer allocations, confirm trade details and allocation instructions, generate confirmations, and perform other back office tasks.

Traders for the selected dealers receive inquiries through the STP trading platform 100 into the electronic trading component 275. The electronic trading component 275 operates to display customer-initiated inquiries on a graphical interface that provides dealers with the ability to input the requested bid/ask prices into an electronic trade ticket and transmit the prices to the customer. Dealers must typically present both bids and offers to customers so that customers can select to trade either side of a transaction. For instance, the dealer must provide bids that represent the price at which the dealer is willing to purchase a particular financial instrument from customers. Similarly, the dealer must post offers (or ask prices), which are the price at which the dealers are willing to sell particular financial instruments to customers. Moreover, according to known trading rules, dealers must make the prices they post firm for several seconds and, thus, the dealers will post prices "on the wire" for several seconds. If the customer selects a particular dealer's price while there is "on the wire" time remaining, then the dealer must honor the firm price and the transaction will automatically be accepted. A trade performed after the "on the wire" time has expired may be accepted or rejected at the dealer's sole discretion. Prior to a trade being performed after the "on the wire" time has expired, the dealer may refresh its trade price and reset the "on-the-wire" time.

Through a trade ticket interface (shown and described below) displayed by the dealer-side electronic trading component 275, dealers can provide market prices in response to customer inquiries and set specific "on the wire" time periods. Upon creation of a dealer price offer, an electronic message is created and an identifier is mapped to the dealer price offer so that a record of the offer can be stored in the trade history database 115 of the STP trading platform 100. The live market dealer price and "on the wire" time period is transmitted through the electronic trading module 160 of the STP trading platform 100 to the customer's computer 200 and displayed by the customer-side electronic trading component 215. Thus, the customer can see the selected dealers' prices, along with a countdown of "on the wire" time. Through the customer-side electronic trading component 215, the customer can "hit" a bid or "lift" an offer to initiate the purchase or sale, as applicable, of the selected financial product. This functionality is performed electronically, as described further below.

The STP trading platform 100 may also be configured to process trades executed on systems other than through the electronic trading module 160, such as trades executed via telephone or by an alternate electronic trading system. Trade details from alternate systems are electronically imported into the STP trading platform 100 so as to provide the straight-through-processing functionality described herein for trades executed using these alternate methods. Trade data regarding transactions effected on other systems is imported by dealers into the STP trading platform 100 using application programming interfaces (APIs) that link the two systems and through data transfer using standardized (e.g., FIX format) or customized formats, as described further below.

Further, in the exemplary embodiment, the STP trading platform 100 permits dealers to initiate trade inquiries using the dealer-side electronic trading component 215. Such dealer-generated trade inquiries are referred to as electronic axes. A dealer using axe generation functionality can input the material terms of an offer to trade a particular instrument. Unlike present systems that permit only non-executable messages, the dealer can set an "on the wire" time during which the trade will be accepted by a selected customer or group of customers at the dealer's terms. Once an electronic axe is created, the dealer can communicate the electronic axe using the STP trading platform 100 to one or more selected customers. If a customer accepts a dealer electronic axe, the trade is executed in the same manner as customer initiated inquiries.

After a transaction is effected through the electronic trading module 160 of the STP trading platform 100, or through an alternate electronic trading system or via telephone and imported into the STP trading platform 100, the customer may make any necessary account allocations to block trades. The functionality to allocate block trades to the customer's sub-accounts is provided through integration of the electronic trading module 160, along with the customer-side electronic trading component 215, and the account management module 120 and associated account management database 110. The account management module 120 includes, at least in part, an account management database 110 for the storage and maintenance of account and sub-account information for each of the customers' client's accounts. By selecting the "breakdown" functionality provided by the electronic trading module 160 and customer-side electronic trading component 215, the customer's account information can be retrieved from the account management database 110. A breakdown interface provided by the customer-side electronic trading component 215 is populated by account information retrieved from the account management database 10, which includes at least a sub-account database. Thus, through integration of the electronic trading module 160 and the account management module 120, the customer is provided functionality to selectively allocate the block trade to one or more sub-accounts. Once block trades are allocated, the customer-side electronic trading component 215 of the electronic trading module 160 can generate an allocation ticket for each allocation of the block trade. Thus, in essence, each allocation is treated for the purposes of allocation acknowledgement, electronic confirmation and settlement as a separate allocation ticket. Each allocation ticket contains an identifier that permits the electronic trading module 160 to store a data record for each allocation ticket in the trade history database 115. The allocation ticket also may contain an identifier linking it to the original block trade executed between the parties.

The electronic trading module 160 of the STP trading platform 100, through integration with the account management module 120, also has the functionality to permit the allocation of trades through the use of integrated inter-systems or order management systems of the customer. As will be discussed in greater detail below, the STP trading platform can be, and preferably is, communicatively linked to the internal systems of customers and dealers. As an example, many customers operate order management systems ("OMS") (shown in FIG. 2 as 222) to handle trade generation, portfolio management, and order routing. Customer software may also electronically handle sub-account allocation in an automated fashion. The STP trading platform 100 enables customers to initiate the trading process using OMS 222, and electronically allocate block trades executed on the STP trading platform 100 using associated software. In the exemplary embodiment, OMS systems 222 are linked to the STP trading platform 100 using an API, which permits allocation details, for example, to be imported into the STP trading platform 100, so that the allocation details can, in turn, be transmitted through the STP trading platform 100 to the dealer-side computers 260 for acknowledgement.

At this point, the trade details, which may include a summary of the block trade and the account information for the allocation, if applicable, may be enriched through interaction with the account management database of the STP trading platform 100. In the exemplary embodiment, the account management database 110 stores standing settlement instructions pertaining to each of the customer accounts. Thus, during the process of transmitting the trade details and allocations, if any, to the dealer-side computers 260, the electronic trading module 160 accesses the account management database 115 to retrieve the standing settlement instructions for each designated account of the trade, and adds the instructions to the trade details.

It should also be understood that the STP trading platform 100 is designed to record and store in the trade history database 115 a historical record of all transactions executed, including a historical audit trail of all phases of the trade cycle, to thereby facilitate problem resolution should any issues or disputes arise.

The confirmation process may also be performed on the STP trading platform 100. According to the exemplary embodiment, the STP trading platform 100 provides dealers with the ability to have confirmations electronically generated and transmitted to customers through the STP trading platform 100 in a manner that would satisfy the requirements of applicable government regulations, such as SEC Rule 10b-10. For transactions effected through the STP trading platform 100, the transaction information contained in the confirmation is based on the terms of the transaction that have been agreed to between the customer and the dealer over the STP trading platform 100.

Upon electronic receipt of the trade details, including any allocations and the associated settlement instructions, dealers can confirm that the trade details and the records of the customers are accurate. If the dealer determines that the details of the customer's allocations are accurate, then the dealer can acknowledge the allocation via the STP trading platform 100. The STP trading platform 100 then dynamically generates an electronic confirmation in accordance with applicable government regulations, for example, SEC Rule 10b-10, to facilitate the electronic confirmation of trades. As discussed above, the STP trading platform 100 is also preferably adapted to handle the processing and confirmation of trades executed either via telephone or via an alternate trading system.

For trades made on alternate trading systems, such as dealer trade management system 279 or via telephone, the confirmation is based on transaction information that is electronically imported into the STP trading platform 100 by the dealer and affirmed by the applicable customer. In each case, the affirmation reflects any allocation among sub-accounts that has been made by the customer and accepted by the dealer.

Further, in the exemplary embodiment, both the customers and dealers are provided access through a back office management module 140 of the STP trading platform 100 to a master trade blotter interface, as well as various other summary interfaces. On the customer-side, the summary interface preferably displays trade information on a dealer-by-dealer basis. The summary information preferably includes the number of trades, the number of trades cancelled or corrected, the number of block trades allocated or unallocated, the number of tickets generated, the number of trades confirmed or unconfirmed, and the number of trades for which there are errors. This summary interface allows back office personnel to quickly and efficiently determine whether any executed trades have outstanding issues that require attention. Similarly, the dealer-side has access to summary trade information on a customer-by-customer basis.

System Architecture

In an exemplary embodiment, as shown in FIG. 2, software modules 120, 140, 160 of the STP trading platform 100 are capable of communication with customer-side software application components 210 operative on customer computers 200 via a communications network 50. In a similar way, dealer-side software application components 270 are operable on dealer computers 260 and capable of communication with the STP trading platform servers 105. Together the software modules 120, 140, 160 operative on the STP trading platform servers 105 with the client-side and dealer-side software modules 210, 270 comprise the server-client software system of the STP trading platform 100.

In the exemplary embodiment, the client-side software application components 210, such as the customer-side electronic trading and back office management components 215, 220 and dealer-side electronic trading and back-office management components 275, 280 are preferably "thin-clients". With respect to client/server applications, the term "thin-client" generally refers to a software client designed to be relatively small so that the bulk of the data processing occurs on the server. In the exemplary embodiment of the STP trading platform 100, the customer and dealer electronic trading and back office management components 215, 220 and 275, 280, respectively, are relatively small software applications capable of generating graphical user interface templates on the customer and dealer computers, such as the exemplary graphical user interface templates shown in FIGS. 7-18, which are populated and controlled, at least in part, by the software modules operative on the centralized STP trading platform servers 105 in communication with customer and dealer computers 200, 260. Persons of skill will recognize, however, that the use of thin-client technology, as opposed to other known and heretofore-developed client-server technologies, is not critical to the present invention.

Generally speaking, the electronic trading module 160 is operative on the STP trading platform servers 105 to communicate with and provide functionality to the dealer-side and customer-side electronic trading components, which generate and display graphical user interfaces that are populated by information communicated from dealers (e.g., live market pricing data) and retrieved from the account management database 110 (e.g., account information and settlement instructions), as described further below.

The account management module 120 is also preferably a server-side software application operative on the STP trading platform servers 105 and accessible by customer and dealer computers 200, 260 via a communications network 50, such as the Internet. In the exemplary embodiment, the account management module 120 is database management software programmed with graphical interfaces to provide a web-based program that can display information retrieved from the account management database 110 via the Internet and create, update, modify or delete, as applicable, account records including settlement instructions. Via known communications networks, customers and dealers can access their accounts through the account management module 120 of the STP trading platform 100. Through integration of the STP trading platform modules 120, 140, 160, the account management database 110 is also accessible by the electronic trading module 160 so as to permit the electronic trading module 160 to retrieve information from the account management database 110, when necessary.

Customer and dealer computers 200, 260 are any type of personal or network computer such as an IBM-compatible computer running an Intel chipset and having an operating system, such as Microsoft® Windows® NT, 2000, XP, and the like, and, preferably, running a browser program such as Microsoft® Internet Explorer or Netscape Navigator®. It is also within the scope of the present invention that computers 200, 260 may be handheld or table computing devices, such as a personal digital assistant (PDA), pocket PC, and tablet PC, or the like. Customer computers 200, 260 have access to a communications network via a modem or broadband connection to permit data communication between the participants and the STP trading platform 100.

Various input and output devices are preferably provided with the customer and dealer computers 200, 260 including, by way of non-limiting example, a display (e.g., cathode ray tube (CRT), liquid crystal display (LCD), etc.), and an input device (e.g., a keyboard, mouse, touch pad, or light pen). The customer and dealer computers 200, 260 would also preferably include a storage device such as, for example, a magnetic disk drive and magnetic disk, a CD-ROM drive and CD-ROM, DVD, or other equivalent device. The specific hardware combination/configuration is not crucial to the instant invention, and may vary as a matter of design choice within the functional parameters disclosed herein. Users of the STP trading platform 100 typically interact with the GUI's displayed by the software modules by "clicking" on numbers or graphics (e.g., buttons) that are displayed on the GUI's. Persons of skill will understand that the present invention is not limited to clicking with a computer mouse, but includes use of any other device for indicating an action with graphics-based software, such as a touch pad, light pen, touch sensitive display screen and the like.

The STP trading platform servers 105 may be computer servers of any type known in the industry, but capable of handling the flow of data on a substantially real-time basis. Moreover, persons of skill will recognize that multiple servers in a server farm arrangement may be utilized to handle the bandwidth and processing requirements of a particular arrangement of the present invention.

Trade history databases 115 and account management databases 110 are controlled by the software modules 120, 140, 160 to retrieve data, when necessary. The storage devices themselves may be any mass storage devices capable of storing large amounts of data in an organized fashion, such as known data storage devices including, but not limited to hard disks, tape drivers, optical disks and the like.

Communication between the customer-side, dealer-side and the STP trading platform 100 may be accomplished via electronic messaging using the Extensible Mark-up Language ("XML") or Financial Information Exchange ("FIX") format. In order for customer-side and dealer-side computers 200, 260 to communicate with the STP trading platform 100, an API is provided to enable users to establish connections to the STP trading platform 100, authenticate their systems, and exchange messages using, for example, the XML-based messaging protocol. By way of non-limiting example, Table I that follows illustrates exemplary messages that may be used during the flow of the trading cycle.

TABLE I

EXEMPLARY MESSAGES

| Message Type | Fields | Components |
| --- | --- | --- |
| PlaceOrder | OurOrderRef | Alphanumeric ID code |
| | YourOrderRef | Alphanumeric ID code |
| | OldOrderRef <required if Type = correct> | Alphanumeric ID code |
| | TransactTime <time stamp for order> | YYYYMMDD:HH:MM |
| | Type | +new |
| | | +correct |
| | Order | +side |
| | |    +buy |
| | |    +sell |
| | | +Quantity = non-negative integer |
| | | +Instrument (see Table II) |
| | | +Settlement (see Table II) |
| | | +StipulationList |
| | | +AllocationList (if breakdown provided) |
| | |    +Account ID |
| | |    +Quantity = non-negative integer |
| | |    +ClearingLoc (if non-US) |
| | | +ClearingLoc (if non-US) |
| | OrderList | +OrderLegRq (if swap) |
| | |    +side |
| | |       +buy |
| | |       +sell |
| | |    +Quantity = non-negative integer |
| | |    +SwapType |
| | |    +Instrument (see Table II) |
| | |    +Settlement (see Table II) |

TABLE I-continued

EXEMPLARY MESSAGES

| Message Type | Fields | Components |
|---|---|---|
| | | +StipulationList<br>+AllocationList (if breakdown provided)<br>    +Account ID<br>    +Quantity = non-negative integer<br>    +ClearingLoc (if non-US)<br>+ClearingLoc (if non-US) |
| | OrderType | +auction<br>+customer price |
| | Price <if OrderType=customer price> | +type<br>    +percent<br>    +yield<br>        +YieldType (maturity)<br>        +value<br>    +discount<br>    +premium<br>    +spread<br>+value<br>+NormalValue |
| | Capacity | +agent<br>+principal |
| | Trader <email address of trader> | String text |
| Allocate | OurOrderRef | Alphanumeric ID code |
| | YourOrderRef | Alphanumeric ID code |
| | Type | +new<br>+correct |
| | TransactTime <time stamp for order> | YYYYMMDD:HH:MM |
| | OurAllocationRef | Alphanumeric ID code |
| | OldAllocationRef <required if Type = correct> | Alphanumeric ID code |
| | ExecutionNotificationRef <system ID> | Alphanumeric ID code |
| | Trade | +side<br>    +buy<br>    +sell<br>+Quantity = non-negative integer<br>+Instrument (see Table II)<br>+Settlement (see Table II)<br>+Price (see above)<br>+Dealer (BIC)<br>+TradeDate (YYYYMMDD) |
| | AllocationList | +AllocationList<br>    +Account ID<br>    +Quantity = non-negative integer<br>    +ClearingLoc (if non-US) |
| Booking Notification | NotificationRef | |
| | OurOrderRef | Alphanumeric ID code |
| | YourOrderRef | Alphanumeric ID code |
| | Type | +new<br>+correct |
| | TransactTime <time stamp for order> | YYYYMMDD:HH:MM |
| | YourAllocationRef | Alphanumeric ID code |
| | Status | +BookingStatus<br>    +Affirmed (y/n)<br>    +UnknownAccount (y/n)<br>    +MissingInstructions (y/n)<br>    +Canceled (y/n)<br>    +Other (string) |
| | Trade | +TradeBk<br>    +side<br>        +buy<br>        +sell<br>    +Quantity = non-negative integer<br>    +Instrument (see Table II)<br>    +Settlement (see Table II)<br>    +StipulationList<br>    +Account ID<br>    +ClearingLoc (if non-US)<br>    +Price (see above)<br>    +PrincipalAmount<br>    +AccruedInterest<br>    +NetMoney<br>    +Dealer (BIC)<br>    +Market (BIC)<br>    +TradeDate (YYYYMMDD) |

TABLE II

EXEMPLARY COMPONENT CLASSES

| Type | Fields | Components |
|---|---|---|
| Instrument | SecurityID | +SecurityIDType<br>    +CUSIP<br>    +ISIN<br>    +Private<br>+Code (string) |
| | Description (string) | n/a |
| | Currency | +ISO-4217 values |
| | AmortizableInstrument <<implementation class>> | +Product<br>    +MORTGAGE<br>+Security<br>    +MBS<br>    +PFAND<br>+Issuer (string)<br>+Country (ISO-3166 values)<br>+Coupon<br>+Issued (YYYYMMDD)<br>+Maturity (YYYYMMDD)<br>+Factor |
| | CouponInstrument <<implementation class>> | +Product<br>    +GOVERNMENT<br>    +AGENCY<br>    +CORPORATE<br>+Security<br>    +CORP<br>    +EUCORP<br>    +EUSOV<br>    +EUSUPRA<br>    +FAC<br>    +SUPRA<br>    +TCAL<br>    +TINT<br>    +TPRN<br>    +UST<br>+Issuer (string)<br>+Country (ISO-3166 values)<br>+Coupon<br>+Issued (YYYYMMDD)<br>+Maturity (YYYYMMDD)<br>+WhenIssued (Boolean) |
| | DiscountInstrument <<implementation class>> | +Product<br>    +GOVERNMENT<br>    +AGENCY<br>    +MONEYMARKET<br>+Security<br>    +CP<br>    +EUCP<br>    +FADN<br>    +USTB<br>+Issuer (string)<br>+Country (ISO-3166 values)<br>+Coupon<br>+Issued (YYYYMMDD)<br>+Maturity (YYYYMMDD)<br>+WhenIssued (Boolean) |
| | FutureInstrument <<implementation class>> | +Product<br>    +MORTGAGE<br>+Security<br>    +TBA<br>+Issuer (string)<br>+Country (ISO-3166 values)<br>+Contract (YYYYMMDD) |
| Settlement | SettlementType | +Cash<br>+Regular<br>+NextDay<br>+T2<br>+T3<br>+T4<br>+T5<br>+WhenIssued<br>+Future |
| | Date | YYYYMMDD |

With respect to the exchange of messages between the customer-side, dealer-side, and STP trading platform 100, persons of skill in the art will recognize and understand the various message types being communicated across the system in light of the discussion of trade execution, allocation, confirmation, and settlement on the STP trading platform 100 in connection with the various screen shots and data flow diagrams. Persons of skill will also recognize that the particular structure of the messages and the preferred use of XML messaging is not necessary and alternate methods of messaging may be utilized.

Persons of skill in the art will further recognize that the exemplary system architecture shown and described herein may be modified in various manners so as to achieve the functionality set forth herein. Moreover, the particular layout or look and feel of the GUI's depicted in FIGS. 6-18, 20-21, 23, 25-28, 30, and 32-36 are meant only for illustration purposes and the scope of the present invention should not be so limited.

System Functionality

The above described account management, electronic trading, and back office modules 120, 140, 160 are configured to operate and the customer and dealer electronic trading and back-office management clients 215, 220 and 275, 280, respectively, on the trading platform servers 105 and databases 110, 115 act cooperatively to provide a solution for various aspects of the typical trading cycle. An exemplary embodiment of customer and dealer interaction with the STP trading platform 100 is described below in connection with FIGS. 5-36.

1. Account Management

Prior to initiating a trade, a customer may access the account management module 120 of the STP trading platform 100 so as to input information to create, maintain, and update sub-accounts for allocation of block trades and to enter standing settlement instructions to facilitate electronic settlement of executed trades in accordance with an exemplary embodiment of the present invention. The STP trading platform 100 is operative with the account management database 110 to act as a centralized account management database for customers, dealers, custodians, and agent bank accounts and sub-accounts, and to store standing settlement instructions for said customers, custodians, and agent banks.

Figure 5:
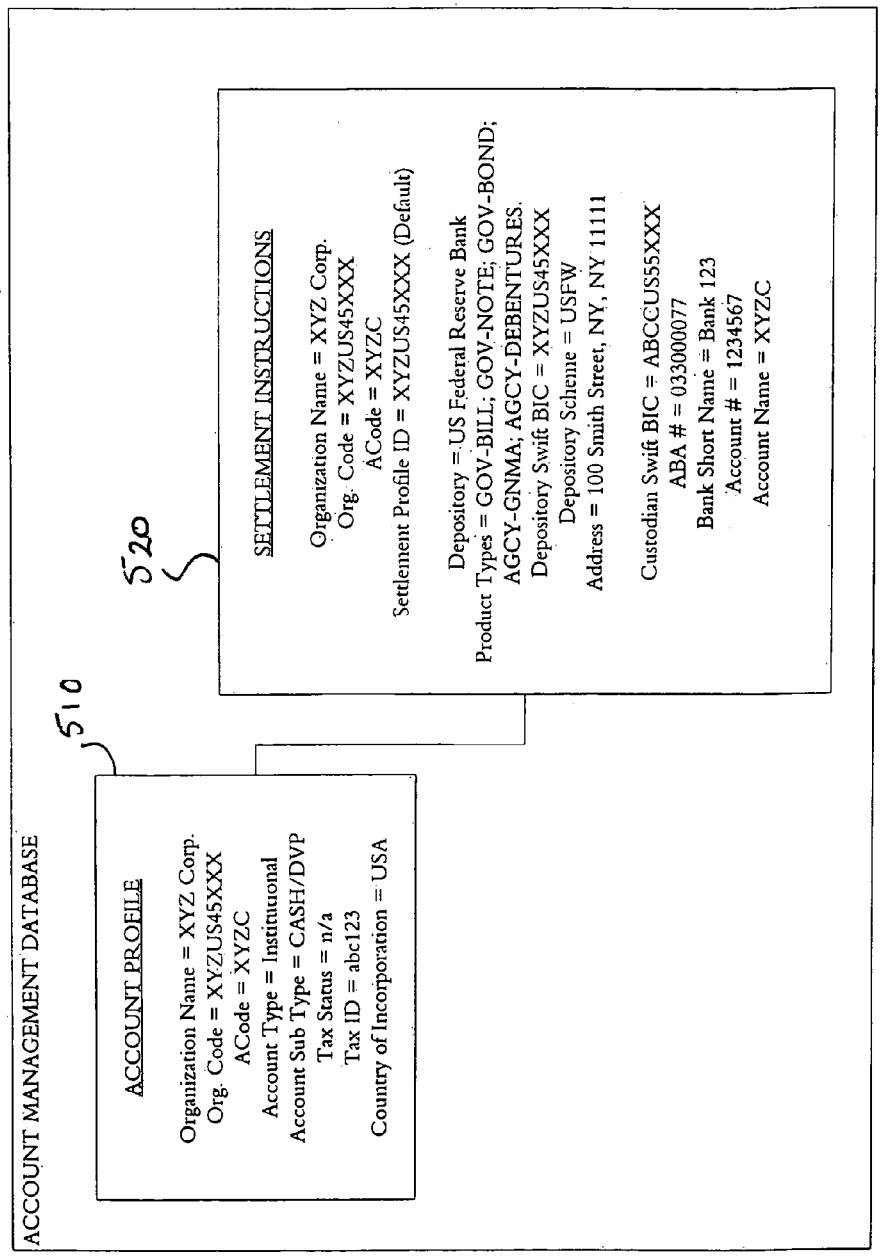
FIG. 5 is an exemplary database schematic for use with the STP trading platform.

In the exemplary embodiment, the account management module 120 is operative to create a web-based environment through which users can access settlement and account data, and manage standing settlement instructions. The account management module 120 also preferably performs account validation, as described further below. FIG. 5 is an example of a database schematic 500 of the account management database 110 for storing company account profiles 510 and corresponding settlement instructions 520. The account profiles and associated settlement instructions stored in the account management database 110 are mapped to the account information utilized by the electronic trading module 160. In this way, trade details can be enriched dynamically with account and settlement information from the account management database 110. In an exemplary embodiment, customers can interact with the account management module 120 of the STP trading platform 100 through a web-based interface 600 as shown in FIG. 6, to manage and update their account information. The account management interface 600 is preferably standardized and provides field level validation to reduce the possibility of errors in the account information. For example, the account management interface 600 has a minimum standard for information that must be entered in order to create a new account or sub-account. The minimum information requirement is driven by industry standards for the particular jurisdiction and financial product that the account is being created to accommodate. Where possible, to provide further ease of use and prevent errors, the account management interface 600 uses drop-down menus that users can select from pre-defined lists.

For example, according to the recently enacted the U.S.A. PATRIOT ACT (the "United and Strengthening America by Providing Appropriate Tools Required to Intercept and Obstruct Terrorism Act"), accounts in the United States must have a Tax ID number. The account management module 120, therefore, requires a Tax ID number to be entered for any account created in the United States.

Moreover, to accomplish field level validation, the account management module 120 is programmed to ensure that particular fields require particular types of information. For example, with reference to FIG. 6, the "TAX ID" field 610 generally requires an 8-digit numeric-code. In an exemplary embodiment, after the customer has completed entering the account information, the account management module 120 is configured to check the entered information against field level validation standards stored in a field level validation database to determine whether any information has been improperly entered. By way of example, if only 6-digits have been entered in the "TAX ID" field 610, the account management module 120 would detect the error and prompt the customer to enter the proper information. In an alternate embodiment, the account management module 120 could trigger a message to the customer as soon as improperly, non-validated information was entered into the system. In such a scenario, for example, as soon as the information was entered and the "tab" or "enter" key was pressed to move to the next input field, the account management module 120 would notify the user of the error.

In an exemplary embodiment, the account management database 110 also stores standing settlement instructions using a standardized and field level validated data structure. With reference again to FIG. 6, there is shown an exemplary embodiment of a customer account management interface 600 showing standing settlement instructions for a particular clearing institution and particular financial instruments. Because dealers use this information to settle securities transactions, its accuracy is important to achieving straight-through-processing. It should be understood that the information entered into the fields is illustrative and not meant to be indicative of actual settlement instructions. Input of standing settlement instructions using the account management module 120 is performed using industry-standardized data. For example, where possible, SWIFT codes are used to populate data fields. For instance, if a hypothetical SWIFT code of "ABCCUS33XXX" is entered, the other fields necessary to complete the creation of the settlement instructions are automatically populated using cross-references to the SWIFT codes embedded in the account management database 110. Such standardization and automation reduces the possibility of human input errors, which are a source of costly trade settlement failures. The account management module 120 may also perform field level validation on fields that are not able to be auto-populated using embedded cross-references in the same manner, as described above in connection with FIG. 6.

As a result of the standardization and validation performed by the account management module 120 in the creation and input of accounts, customers and dealers have access to an accurate and centralized depository of account and sub-account information and associated settlement instructions. When a customer updates, creates anew, or modifies an account or settlement instruction, the changes will be almost immediately available to all participants that the customer has enabled to view such settlement instructions, thereby streamlining the process of updating account information and eliminating the need for duplicative systems and processes. Moreover, because the selected participants have access to the same information, errors can be detected and corrected more efficiently. As will be described further below, integration of the account management module 120 and database with the electronic trading module 160, and back office management module 140 provides the functionality for straight-through-processing of trades throughout the entire trading cycle.

In an alternate embodiment as shown in FIGS. 6a-6c, the customer or dealer is provided with customized settlement instruction templates 600a, 600b, and 600c for inputting settlement instructions. By way of example only, templates 600a, 600b, and 600c may be provided for physical delivery of paper/scripted financial instruments 600a, U.S. Federal Reserve script-less securities, securities eligible for settlement with DTCC 600b, 600c, international securities settled at central banks, settlement of electronic cash payments over the U.S. Federal Reserve central bank payments network, international cash payments, and the like. As described above, the templates 600a, 600b, and 600c provide field level validation.

In the exemplary embodiment, the settlement instruction templates are divided into two sections: settlement instructions detail fields entered by users (upper portion of settlement instructions screen), and settlement template/model attributes defined by the user in the settlement profile/template master (lower portion of settlement instructions screen). The settlement template/model attributes (lower portion of settlement instructions) indicates the settlement instruction general criteria (market/country, depository/PSET, and security/cash type) counterparties can utilize to search for desired settlement instructions. The account management module 120 automatically populates this information (based on user settlement profile/template master settings) at the bottom of every settlement instruction.

With reference to FIG. 6a, an exemplary physical securities delivery instructions template is utilized to communicate the settlement instructions for a scripted security (delivered by hand; not delivered electronically) to a safekeeping account (likely at a Bank or central depository). This template can preferably be used for all markets/countries. The exemplary required fields for this template are: The Physical Depository Name, SWIFT BIC, and Address; The Beneficiary (Account Holder with Custodian/Safekeeping Institution) Account Number; Whether the Beneficiary is a Custodian? (If Yes, then the Safekeeping Account Holder isn't the final Beneficiary and a Further Credit Account Number is needed). Additional Recommended fields for this template are: Beneficiary Account Name and Further Credit Account Name (if available); Beneficiary Market Registration Details (any special tax or governing/exchange registration identifier); Settlement Currency and Exchange Currency (if FX transaction is necessary); Beneficiary Reference (special field value for the Beneficiary); Physical Depository Contact Name and Phone Number; Linked FX/Pair-off/Free Payment Instructions (link to Cash Payment Instructions that are specially used for this settlement instruction; if necessary).

With reference to FIG. 6b, an exemplary US DTC delivery instructions template is utilized to communicate the settlement instructions for United States Depository Trust Company book entry (electronic/script-less) eligible securities. FIG. 6c depicts an exemplary International (INTERNATIONAL) settlement delivery instructions template.

2. Trade Execution—Customer Initiated Inquiries

Figure 3:
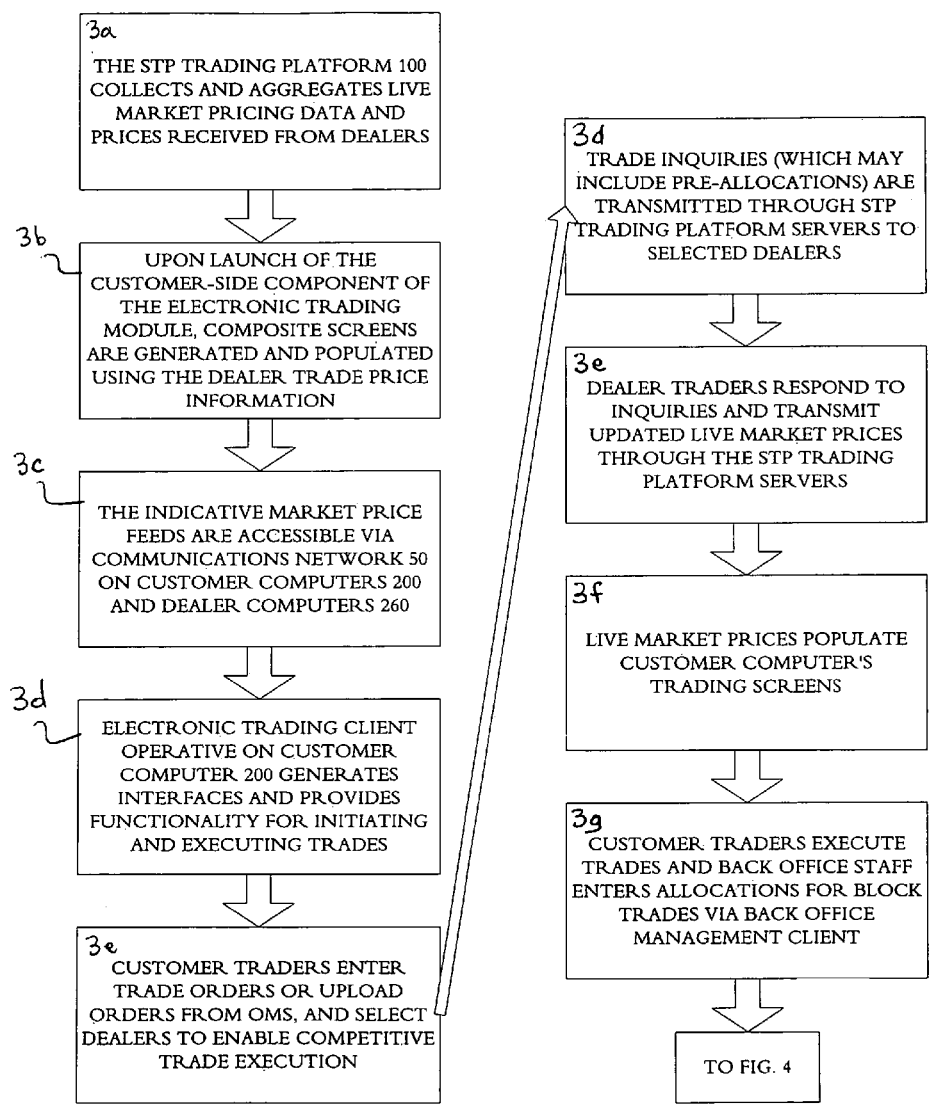
FIGS. 3 and 4 are flow diagrams depicting an exemplary flow of data between customer and dealer through the STP trading platform.
Figure 4:
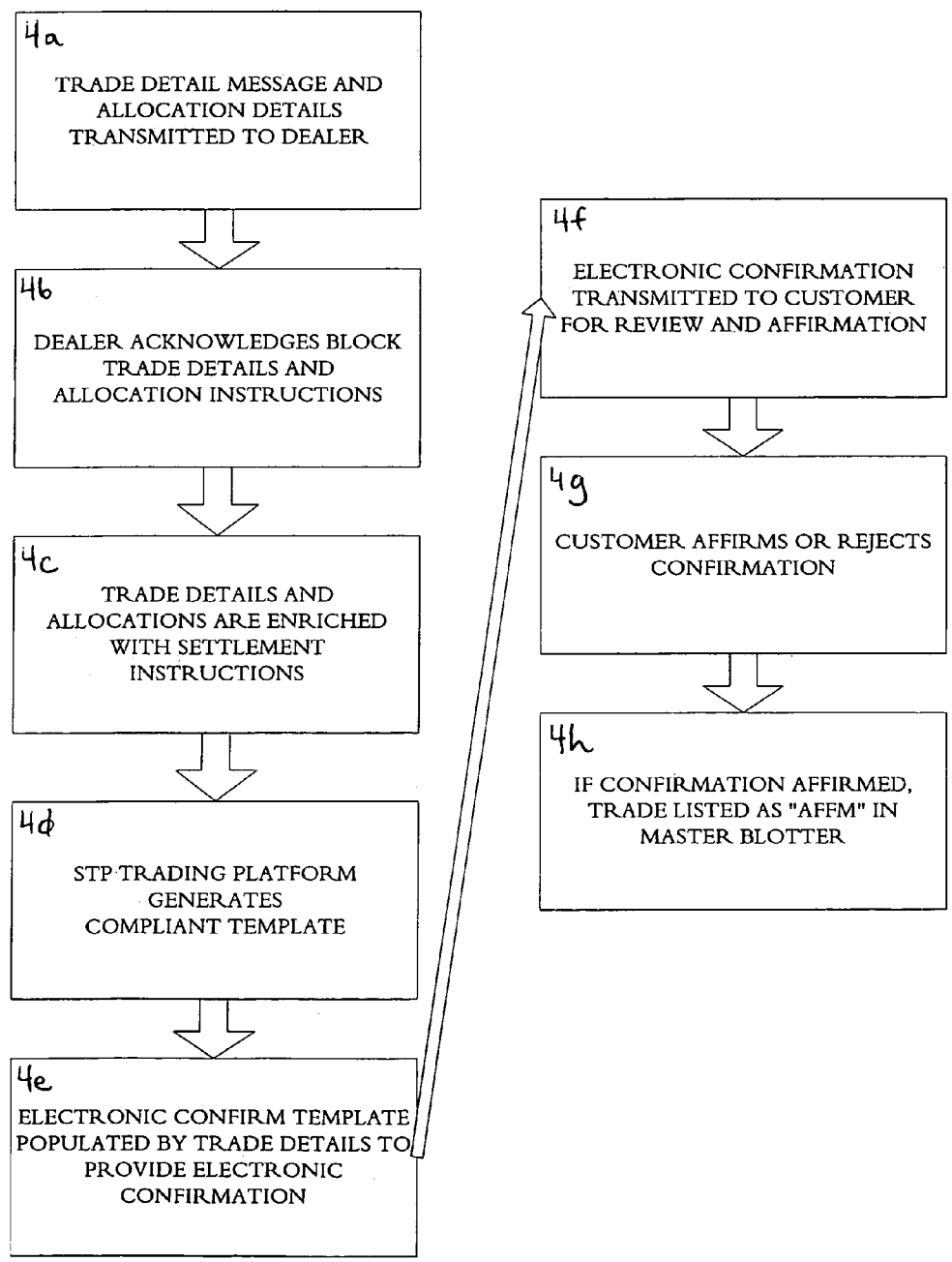

With reference now to FIGS. 3 and 4, there will be described an exemplary process for executing trades, allocating the trades, and confirming the trade details and allocations on the STP trading platform 100.

FIGS. 3 and 4 are data flow diagrams depicting an exemplary flow of data between customer and dealers through the STP trading platform 100 to effect a trade. Trade orders can be initiated either through interaction with the composite price matrices, shown in FIG. 7, as described further below, or through electronic submission from an internal order management system ("OMS"). In order to electronically submit orders through the OMS, the customer-side computers 200 communicate with OMS using a defined communication protocol supported by an API. Preferably, but not necessarily, the Financial Information Exchange ("FIX") protocol is utilized to facilitate communication between the OMS and the customer-side electronic trading component 215 of the customer-side computers 200, and in turn the STP trading platform 100. Table III shows an exemplary message for importing new order message from OMS:

TABLE III

EXEMPLARY NEW ORDER MESSAGES

| Message Type | Fields | FIX Tag |
|---|---|---|
| New Order | ClOrderID <customer assigned order ID> | 11 |
| | TransactTime <time stamp for order> | 60 |
| | HandlInst <Required by FIX protocol> | 21 |
| | TimeInForce | 59 |
| | Symbol <FIXED> | 55 |
| | Side <buy/sell> | 54 |
| | OrderQty <par value order size> | 38 |
| | SecurityID <CUSIP/ISIN> | 48 |
| | IDSource <CUSIP=1, ISIN=4> | 22 |
| | Product <high level security class code; e.g., Gov't Treasuries = GOVERNMENT Gov't Agencies = AGENCY Mortgage-Backed = MORTGAGE Corporate Bonds = CORPORATE> | 6613 |
| | SecurityType <security classification; e.g., CORP = Corporate Bonds CP = Commercial Paper MBS = Mortgage-Backed Securities TBA = TBA Mortgages UST = US Treasury Note/Bond | 6609 |
| | CouponRate <percentage> | 223 |
| | MaturityDate <YYYYMMDD> | 6637 |
| | IssueDate <YYYYMMDD> | 6620 |
| | ContractSettlmntMonth <used for TBAs> | 6689 |
| | Currency <currency code, default = USD> | 15 |
| | SettlementType | 63 |
| | FutSettDate <YYYYMMDD> | 64 |
| | Account <account ID> | 1 |
| | ClearingFirm <required for non-US issues> | 439 |
| | NoAllocs <indicates # of allocation groups> | 78 |
| | AllocAccount <Account ID for allocation> | 79 |
| | AllocQty <allocation amount> | 80 |
| | AllocClearingFirm <overrides "ClearingFirm"> | 6638 |
| | OrdType <auction or customer bid/offer> | 40 |
| | Price <required for customer bid/offer> | 44 |
| | OrderCapacity <agency/principal> | 47 |
| | TraderID <email address of trader> | 6606 |

Persons of skill will recognize that other fields may be utilized as appropriate for the trade type (e.g., swaps) or particular security being traded. In addition, other fields defined by the FIX protocol may be utilized as a matter of design choice.

It will also be evident from the above table that a customer may pre-allocate trades on the system or through its internal OMS and include such allocations in the new order message to the databases. If the customer chooses to create allocations after a block trade is entered, then an allocation message is created. Table IV shows an exemplary message for transmitting post-trade allocations using the FIX protocol:

TABLE IV

EXEMPLARY ALLOCATION MESSAGE

| Message Type | Fields | FIX Tag |
|---|---|---|
| Allocation | AllocID <customer generated ID> | 70 |
| | AllocTransType <new, replacement, cancel> | 71 |
| | TransactTime <date and time of trade> | 60 |
| | NoOrders <number of orders combined for allocation> | 73 |
| | ClOrdID <Order ID assigned to trade> | 11 |
| | NoExecs <number of executions combined for allocation> | 124 |
| | LastQty <size of referenced execution> | 32 |
| | ExecID <ID assigned to execution> | 17 |
| | LastPx <price of referenced execution> | 31 |
| | Symbol <FIXED> | 55 |
| | Side <buy/sell> | 54 |
| | OrderQty <par value order size> | 38 |
| | SecurityID <CUSIP/ISIN> | 48 |
| | IDSource <CUSIP=1, ISIN=4> | 22 |
| | Product <high level security class code; e.g., Gov't Treasuries = GOVERNMENT Gov't Agencies = AGENCY Mortgage-Backed = MORTGAGE Corporate Bonds = CORPORATE> | 6613 |
| | SecurityType <security classification; e.g., CORP = Corporate Bonds CP = Commercial Paper MBS = Mortgage-Backed Securities TBA = TBA Mortgages UST = US Treasury Note/Bond | 6609 |
| | CouponRate <percentage> | 223 |
| | MaturityDate <YYYYMMDD> | 6637 |
| | IssueDate <YYYYMMDD> | 6620 |
| | ContractSettlmntMonth <used for TBAs> | 6689 |
| | Currency <currency code, default = USD> | 15 |
| | SettlementTyp | 63 |
| | FutSettDate <YYYYMMDD> | 64 |
| | AvgPx <average price at which accumulated executions took place, percentage> | 6 |
| | Trade Date <the trade date as per FIX specification> | 75 |
| | NoAllocs <indicates # of allocation groups> | 78 |
| | AllocAccount <Account ID for allocation> | 79 |
| | AllocQty <allocation amount> | 80 |
| | ExecBroker <counterpart to trade, BIC> | 76 |
| | AllocClearingFirm <overrides "ClearingFirm"> | 6638 |

The exemplary flow of FIG. 3 depicts a trade initiated via the composite price matrices. In a first step 3a, the STP trading platform 100 collects and aggregates live market pricing data and prices received from dealers. In step 3b, upon launch of the customer-side electronic trading component 215, composite screens are generated and populated using the dealer trade price information transmitted to the STP trading platform 100 by dealer systems. In step 3c, the indicative market price feeds are accessible via communications network 50 on customer computers 200 and dealer computers 260. In step 3d, the electronic trading component 215 operative on customer computer 200 generates graphical interfaces and provides functionality for initiating and executing trades. In step 3e, customer traders manually enter trade orders or electronically upload orders from OMS that would include allocation instruction, and select dealers to enable a competitive, auction-type trade inquiry. Trade inquiries are then transmitted through the STP trading platform 100 servers to the selected dealer's computers 260, in step 3f. In most instances automated dealer trade systems, in step 3g, respond to the inquiries and transmit firm market prices through the STP trading platform servers 105. Using a trade execution screen, in step 3h, the firm dealer prices populate the customer's trading screens. In step 3i, customer traders can execute trades by hitting or lifting a bid or offer, as applicable. After a trade is accepted by the dealer, the customer's back office can enter block trade allocations if the trade was not already pre-allocated, and transmit the same to the dealer computers 260, in step 4a. In step 4b, the dealer acknowledges the customer's block trade allocation.

Upon receipt of the customer's allocations, if any, the dealer-side software client 270 confirms the details of the block trade and allocations and retrieves standing settlement instructions from the account management database 110, and may, but not necessarily, generate an electronic confirmation of the trade. Throughout the process outlined in FIGS. 3 and 4, records of the customer's trade inquiry, the dealer's price response, details concerning whether prices were rejected or accepted, the final trade details, the customer's account allocations, if any, and electronic confirmations are stored in the trade history database 115.

During the trading process, the STP trading platform 100 permits customers to submit trade inquiries to multiple dealers simultaneously. In this case, for example, the "Order Type" field of the "New Trade Order" message would be set to auction. As discussed above, in the exemplary embodiment, customers can submit requests to purchase from financial instrument inventories, such as commercial paper offering (CPO) and corporate bond inventories. All dealers receiving an inquiry and willing to trade the specific instrument for the transmitted quantity will message the customers with a firm quotation to buy or sell by filling out a trade ticket displayed on the dealer-side computers 260. The customer reviews the quote and determines to accept or reject the quote or allow the quote to lapse. A transaction is completed only if both the customer and dealer accept the quote.

With further reference to FIG. 4, after a transaction is effected over the STP trading platform 100 or imported into the STP trading platform 100, customers acting in some cases for multiple client accounts, may allocate the transaction among those client accounts by transmitting the relevant allocation information to the dealer via the STP trading platform 100. (Step 4a discussed above). Also, the pre-trade allocations may be entered in the original trade inquiry. The dealer then can acknowledge the receipt and processing of the allocation information through the STP trading platform 100. (Step 4b discussed above). The STP trading platform 100 provides functionality to dynamically enrich trade details with settlement instructions, and generate electronic confirmations, in steps 4c-4d, as discussed further below.

In the exemplary enrichment is accomplished through a mapping of information contained in the block or allocated trade, as the case may be, and account information stored in the account management database 110. For example, an exemplary mapping may comprise the following associations:

| TRADE DETAILS | ACCOUNT INFO. |
|---|---|
| Issue Country | Settling Country |
| Product Key | Security Type Major |
| Security Type | Security Type Minor |
| Company Name | Organization Code |
| Clearing Type | BIC |
| Account Id | Account Short Name |

Using these associations, the STP trading platform 100 can determine the appropriate settlement instruction set for the block or allocated trade. By way of further example a particular account may have one or more settlement instruction groups dependent on various parameters of the trade, as set forth above. Based on the trade details, the STP trading system 100 will pull the appropriate settlement instruction groups associated with the appropriate account profile. The appropriate settlement instruction group is then selected based on further details in the trade.

With reference now to FIGS. 7 to 12, there are shown screen shots of an exemplary user interface of the electronic trading module 160 of the STP trading platform 100. For the sole purpose of illustration, the screen shots and the description herein concern the trading of On-The-Run ("OTR") Treasuries. However, persons of skill in the art will understand that any type of financial instrument can be traded using the STP trading platform 100 described herein.

Figure 7:

On the interface 700 shown in FIG. 7, a composite listing 705 of various OTR treasuries, along with important market details, is presented to the customer. Specifically, the customer is presented with various treasury products, for example, and their respective coupon rates 710, bid/ask prices 712, the date of maturity 714, the number of dealers indicating that they are at or better than the bid/ask price 716 and the bid/ask yield rates 718. Persons of skill will recognize that the above-listed information is only illustrative of the type of information that may be presented to customers to facilitate the execution of trades, and that the type of information will vary according to the type of financial instrument being presented.

Figure 8:
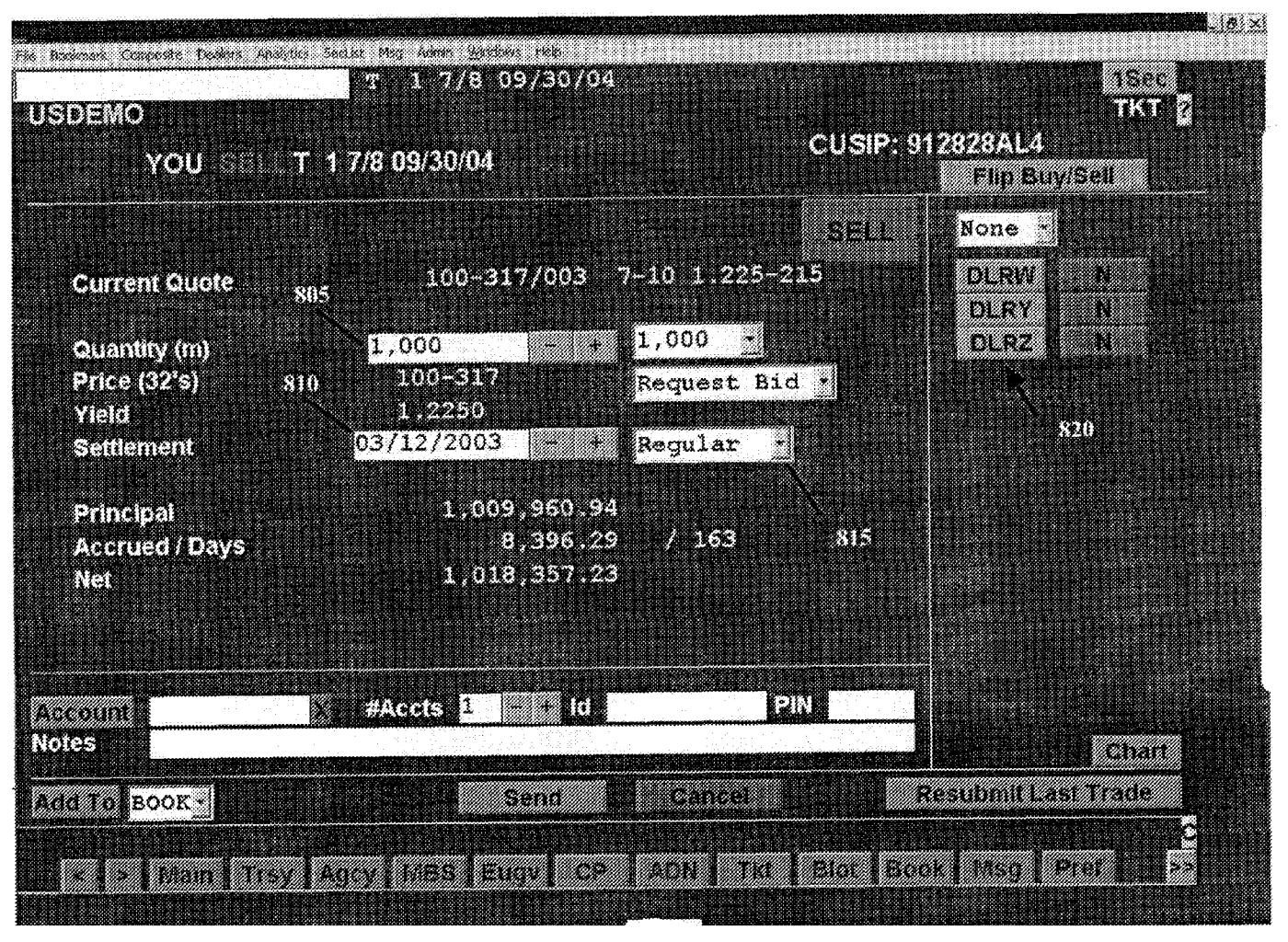

Using an input device, such as a mouse, the customer can select a particular OTR treasury coupon to trade. To most efficiently permit the customer to create a trade inquiry, the customer-side electronic trading component 215 (e.g., the software client operative on the customer's computer) is configured so as to permit the user to click directly on a selected instrument and launch a trade inquiry creation interface 800, as shown in FIG. 8. Thus, if the customer clicks the bid side of the price for a chosen OTR treasury note in the composite price interface 700, then the customer side electronic trading component 215 launches a second interface 800 that permits the customer to customize the terms of a sale of the chosen financial instrument—in this example an OTR treasury note having maturity date of Sep. 30, 2004. Similarly, the customer can click the offer side of the price to initiate the purchase of the chosen financial instrument.

With reference now to FIG. 8, the trade inquiry creation interface 800 provides fields that permit the customer to customize the transaction by modifying the default quantity 805, the settlement date 810, and the type of settlement 815. The trade inquiry creation interface 800 also permits the customer to select which dealers they desire to make inquiries of for prices for the chosen financial product. In the exemplary embodiment shown in FIG. 8, the customer can click buttons 820 to select one or more dealers. Although trade inquiry creation interface 800 lists only three possible dealer selections, a person of skill will recognize that any number of dealers may be presented to the customer for selection and that the customer may select any number of those dealers listed according to the trading rules then in effect on the system with respect to the particular instrument. Functionality may also be provided to permit the customer to cancel the transaction prior to submitting the inquiries or to "flip" the transaction or to create a switch or swap transaction, as is known in the industry. The term "flip" refers to the ability of the customer to quickly turn a sale inquiry into a purchase inquiry. The exemplary trade inquiry creation interface 800 through the electronic trading module provides such functionality via a "flip buy/sell" button 825.

Assuming that the customer does not wish to flip the transaction or create a switch/swap transaction, and the customer has completed customizing the transaction to his/her requirements, the customer can submit the inquiry to the selected dealers. Upon submission of the inquiry, the customer is provided with a trade execution interface. The trade execution interface 900 in the exemplary embodiment shown in FIG. 9 is a matrix 910 showing the trade details (e.g., the quantity, yield, and price) for each of the selected dealers. The price and yield fields are dynamic in that the dealers may refresh their prices in response to movements in the market after the on-the-wire time terminates. As such, the trading interface of FIG. 9 is dynamic and shows the customer fluctuations in the market prices.

In the exemplary embodiment presently being described, the dealer interacts with a trade execution interface similar to trade execution interface 900 through the dealer-side component 275 of the electronic trading module 160 configured to permit the dealer to update prices for the customer-selected instrument substantially in real-time. This process can be performed manually by a trader using such interfaces or dynamically through integration with the dealer's internal trade management system 290, as shown in FIG. 2.

Although not visible in FIG. 9, an advantageous feature of the exemplary trading interface 900 of FIG. 9 is that it highlights the best available market price to the customer. To execute a trade, the customer simply clicks (or double clicks, as a matter of design choice) with his/her mouse or other input device (e.g., a stylus, pointer, touch pad, touch sensitive screen, etc.) on a button 915 next to the best price, in this example marked "hit". In a buy scenario, the button would be labeled "lift". This customer action submits the bid in the case of a sale transaction (or an offer in the case of a buy transaction) to the dealer. If the bid or offer is submitted during the fix or "on-the-wire" time, the dealer must accept the bid or offer. In the alternative, if the bid or offer was submitted after the fix time has expired, then the dealer has the choice whether or not to accept the bid or offer or update the price and set a new "on-the-wire" time. The refresh process of updated prices and setting new "on-the-wire" time is typically performed automatically. In such instances, the dealer receives the customer's hit (or lift) through the electronic trading module 160 and dealer-side electronic trading client 275 and transmits an indication (such as a button click) that the trade is accepted.

3. Trade Execution—Dealer Initiated Electronic Axes

As discussed in the background section of the present application, a common shortcoming in known electronic trading systems is the inability for dealers to quickly respond to cancelled trade inquiries or generate liquidity by initiating an actionable trade inquiry the first instance. In the past, a trader at a dealer would telephone a particular customer to determine whether the customer was interested at trading a particular financial instrument at a particular level. More recently, electronic messaging systems, such as the BLOOMBERG PROFESSIONAL® service, permit traders to communicate electronically. Electronic mail systems, such as Microsoft® Outlook, can also be used to transmit such messages. However, such systems utilize traditional electronic messaging standards and proprietary input devices. Moreover, such systems are not integrated into trade execution engines-and therefore, traders must use alternate means to execute a trade. These messages also are non-executable and require the receiving customer(s) to telephone the dealer sending the message to execute a trade.

The electronic trading module 160 seeks to overcome this shortcoming by providing functionality for dealer initiated trade inquiries (also commonly referred to as an "axe"). Although dealers may initiate a trade inquiry or axe at anytime, the opportunity for an axe often arises in one of two situations. In one situation, the customer may have terminated a customer initiated trade inquiry and the dealer may wish to convey a better price level for the selected instrument. At this point, a dealer can transmit an electronic axe to the customer with an improved bid/offer from the customer's perspective. As will be described in greater detail below, the customer can hit the bid or lift the offer in the electronic axe and execute a trade at the axe price. In other instances, a dealer may require liquidity in a certain instrument and can communicate an electronic axe to one or more customers, rather that waiting for the termination of customer initiated trade inquiries. The electronic axe of the present invention, thus, adds an additional layer of liquidity to the market not traditionally present. Ordinarily, if a dealer needed to trade a particular financial instrument, for example, to create a flat position in the instrument, the dealer would have had only two options: (1) dealer could trade the instrument on the Interdealer Broker Market, or (2) make a hedging trade. Thus, the ability to use a dealer's customer base to make necessary or desired trades adds a valuable third layer of liquidity.

An exemplary embodiment of an electronic axe system operative in connection with the above-described STP trading platform 100 will now be described in connection with FIGS. 10 to 18, which depict exemplary screens shots of an electronic trading system adapted to provide the functionality to create, manage and trade electronic axes. To achieve the axe functionality, the dealer-side electronic trading component 275 is further configured to permit dealers to create and manage axes, communicate axes to one or more customers, and execute axe trades.

Figure 11:
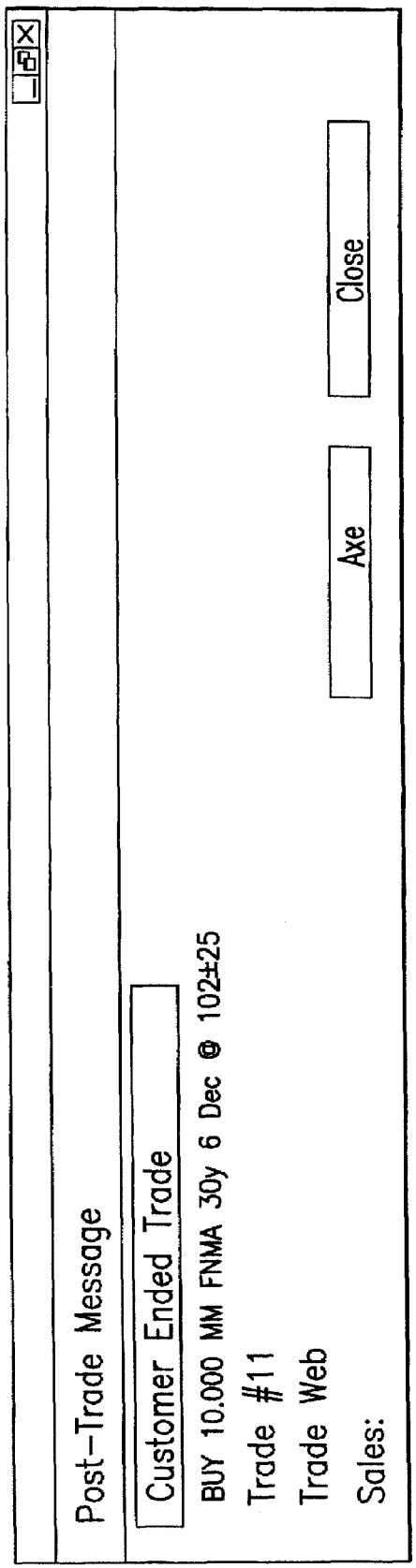

In a first scenario, after a customer-initiated trade inquiry is transmitted to one or more dealers and cancelled by the customer, as described above, the dealer is notified of the cancelled trade. One manner of notification is for the dealer to be notified via a change in the trade state field 1005 of the trade blotter screen 1000, as shown in FIG. 10. Alternatively, a post-trade notification window 1100 may also be launched on the dealer's display, as shown in FIG. 11. In either case, the dealer is provided with the ability to commence an axe trade ticket. In both FIGS. 10 and 11, the functionality to initiate an electronic axe is provided via a button 1010, 1110. Of course, persons of skill will recognize that the process of initiating the axe functionality can be accomplished in any number of ways, including but not limited to clicking a button, clicking a hyperlink, or checking a check box.

Initiating the axe functionality launches an electronic axe trade ticket 1200, as shown in FIG. 12. The electronic axe trade ticket 1200 provides an interface through which the dealer can set the terms of the electronic axe trade inquiry. As depicted in FIG. 12, it is preferred that the electronic axe ticket 1200 permits at least the following information to be entered: (1) the instrument being inquired about 1205; (2) the nominal quantity (e.g., 10,000 OTR Treasury Notes) to be traded 1210; (3) the settlement date 1215; (4) the unit price 1220; and (5) the "on the wire" time 1225. In an exemplary embodiment in which the electronic axe is initiated in response to a cancelled customer initiated trade inquiry, as in the present example shown in FIG. 12, the fields 1205, 1210, 1215 on the electronic axe trade ticket for the instrument type, quantity, and settlement are dynamically imported to reflect the customer's initial trade inquiry which was cancelled.

Thus, in the exemplary embodiment, the only variables that can be altered by a dealer are the quoted price 1220 and "on the wire" time 1225.

After creation of the electronic dealer axe, the dealer-side electronic trading component 275 provides the dealer with several options for communicating the axe to one or more customers. In a first scenario, the dealer can simply transmit the electronic axe and the customer will be presented with an electronic axe message, as further described below. In a second scenario, the dealer can load the electronic axe into an electronic axe blotter for transmission at a later time to one or more selected customers or preset groups of customers. In a third scenario, the dealer can select multiple customers or groups of customers for immediate transmission of the electronic axe. This feature is also described in further detail below.

Figure 14:
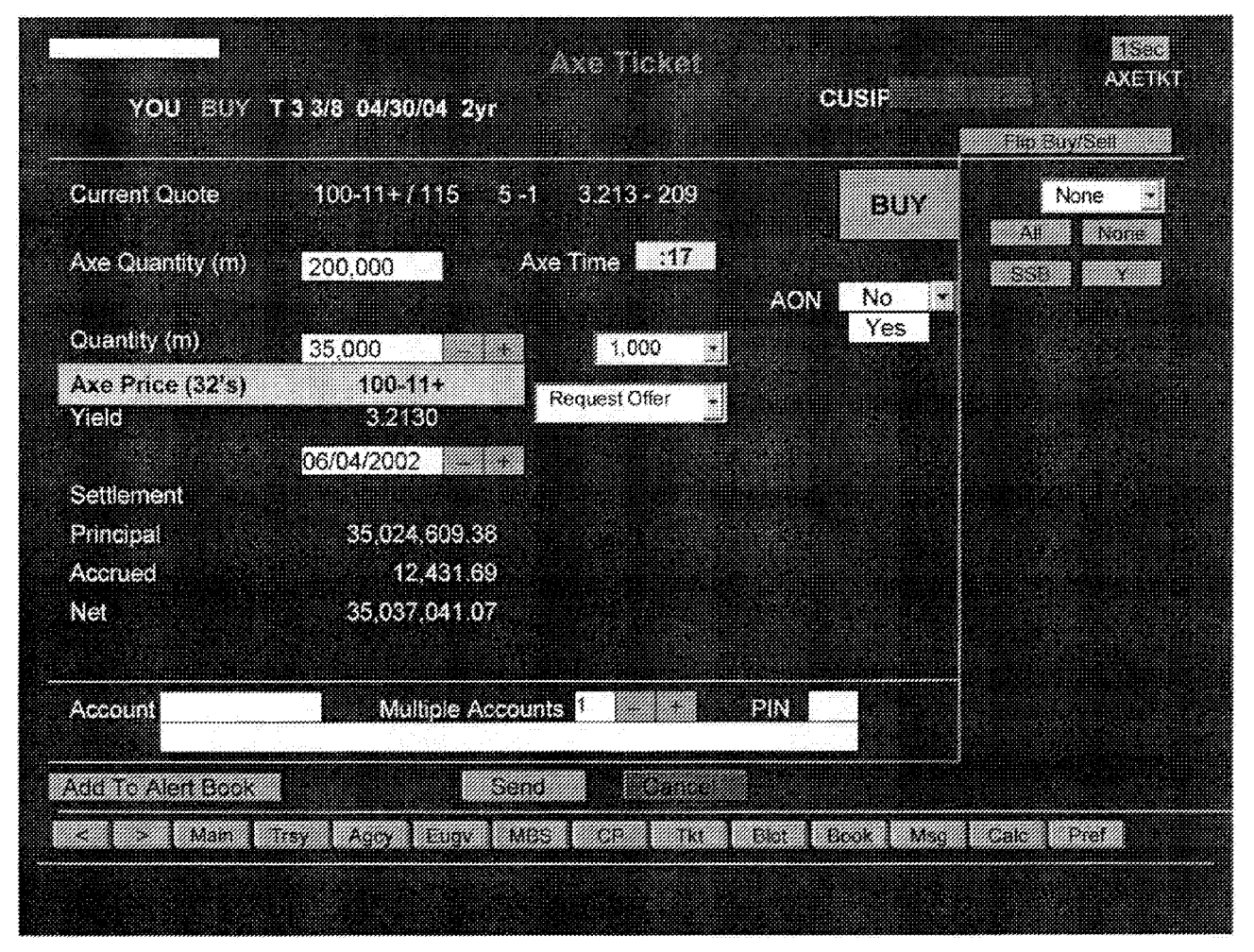

Upon completion of the electronic axe ticket by the dealer, the electronic axe ticket is transmitted through the STP trading platform 100 to the one or more selected customers. The customer-side electronic trading client 215 provides several ways in which the customer is notified of receipt of an electronic dealer axe. In a first exemplary embodiment, a message area 1310 on the client-side trading interface 1300, such as on the composite price screens, is used to list incoming electronic axes. In this case, the electronic dealer axe is displayed as a line item 1315 containing the information pertinent to the trade inquiry. The customer, upon seeing the electronic axe message, can click the electronic axe message to launch an electronic customer axe trade ticket 1400 as shown in FIG. 14. The electronic customer axe trade ticket 1400 permits the customer to customize the terms of the axe within the parameters set by the dealer. For instance, field 1410 displays the "axe quantity" that is set by the dealer. The customer can execute a trade up to the axe quantity amount displayed in field 1410 by adjusting the quantity in field 1420. The "axe time" field 1430 shows the remaining on-the-wire time.

Figure 15:
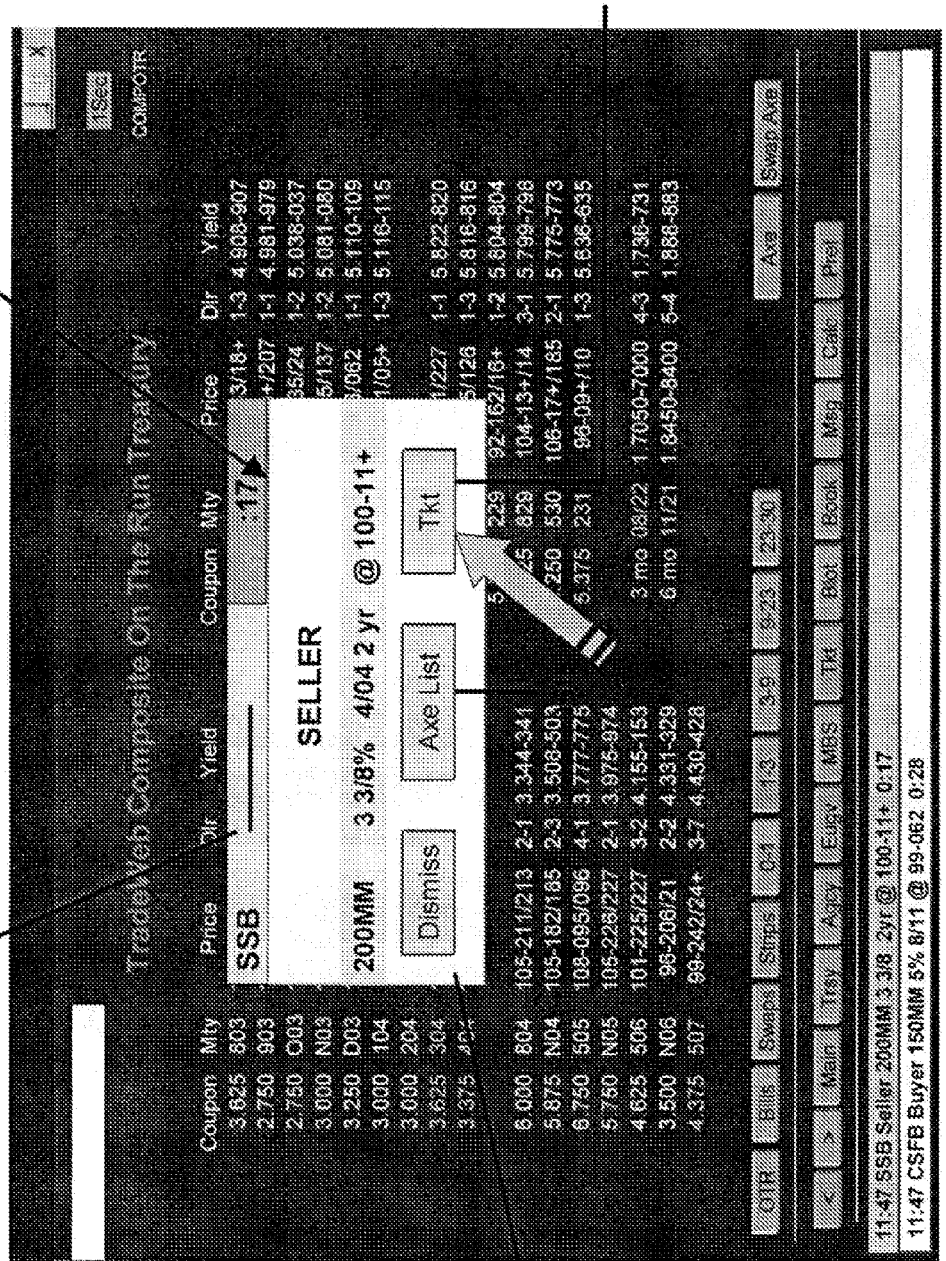

In a second embodiment, shown in FIG. 15, either in addition to or in lieu of the line item axe message described above, and shown in FIG. 13, a pop-up axe window 1500 may be displayed to notify the customer of an incoming electronic axe. The pop-up window, as shown in FIG. 15, preferably includes summary information 1505 about the electronic axe and at least three function buttons. A first button 1510 will dismiss the axe. A second button 1515 will launch the axe monitor interface, which is described in connection with FIG. 18 below. A third button 1520 will launch the customer electronic axe trade ticket. Preferably, the pop-up axe window also includes a display of the running "on the wire" time 1530 remaining to execute the trade at the firm electronic axe price.

Figure 16:
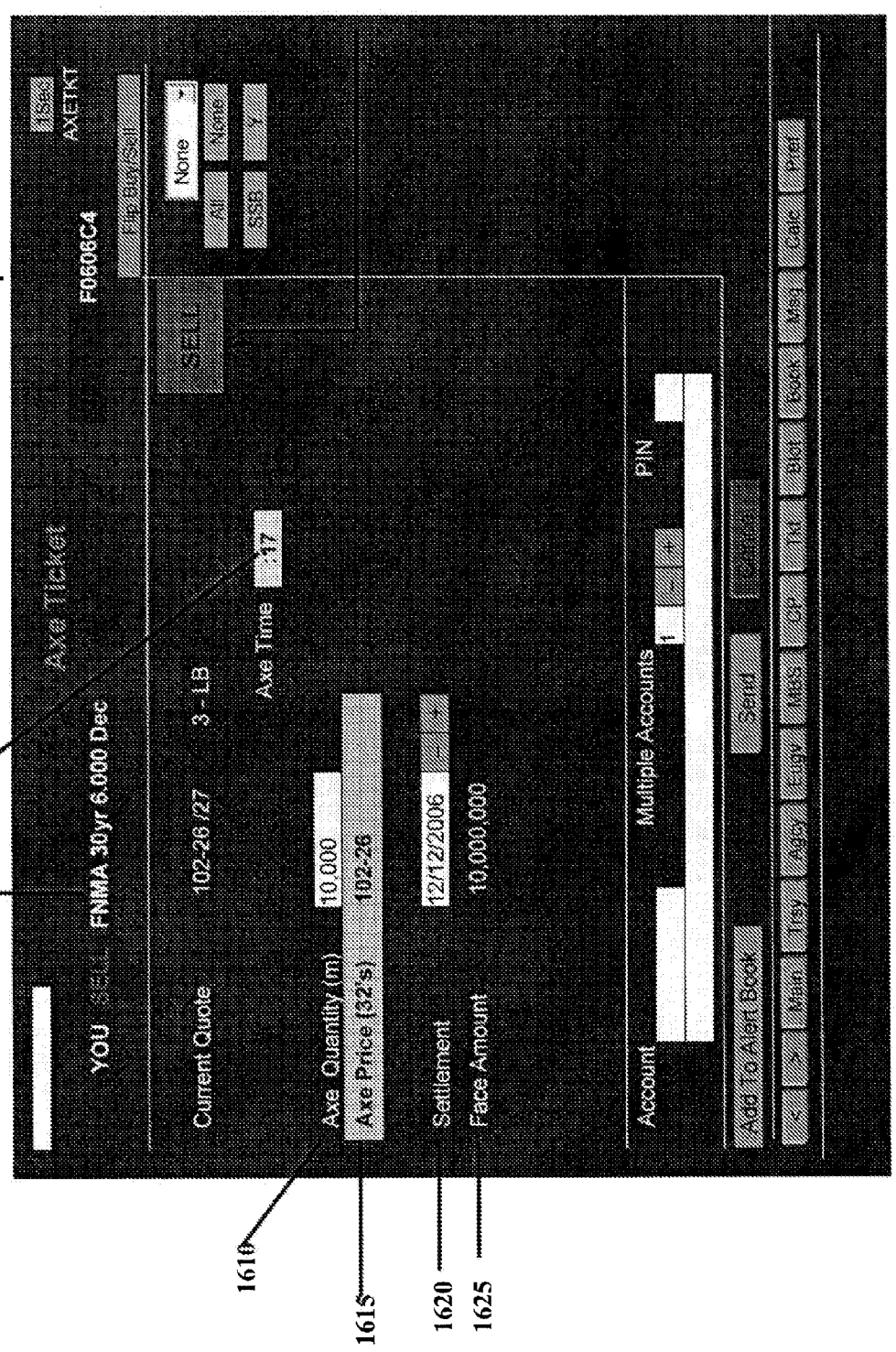

As depicted in FIG. 16, the customer axe trade ticket 1600 preferably includes all of the information pertinent to the axe inquiry, including but not limited to the "on the wire" time remaining 1605, the axe quantity 1610, the axe price 1615, the settlement date 1620, the face amount 1625, whether the axe is to buy or sell 1630, and the instrument to be traded 1635. Because the electronic axe represents a firm dealer offer, in the exemplary embodiment, the customer cannot modify the settlement, price, or instrument type shown in the axe ticket 1600, and, the electronic axe can only be sent back to the initiating dealer, although these features may be disabled and a broadcast option in which the axe is transformed into a customer initiated auction inquiry may be utilized. The customer may have the option to take only part of the face amount offered in the electronic axe.

Figure 17:
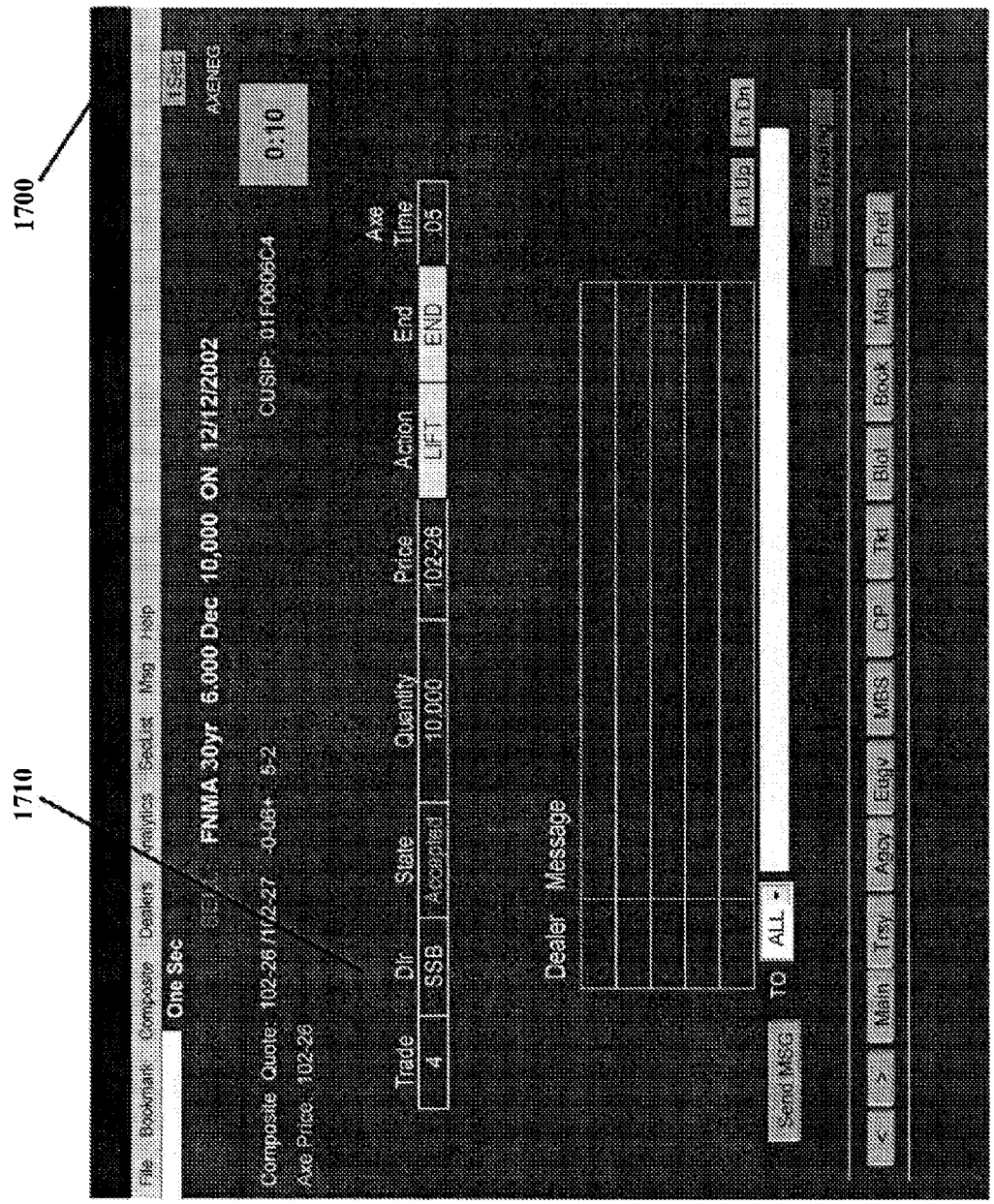

As with other trades, if the customer accepts the trade in the electronic axe ticket 1600 while "on the wire" time remains, the electronic axe trade will be accepted as indicated in the customer negotiation screen 1700 of FIG. 17 in the "state" field 1710. If the "on-the-wire" time has expired, the trade is subject to dealer approval as previously described.

Moreover, it is preferred that the electronic axe ticket 1600 that is displayed to the customer be highlighted with a bright color and be conspicuously marked as a dealer axe. Also, it is preferred that the axe ticket 1600 include a field for previous quote made by the dealer to the customer in response to the customer initiated trade inquiry. By issuing the electronic axe ticket to the customer in this manner, the customer will be able to more easily discern the value inherent in the dealer axe.

In an alternate embodiment, the dealer axe functionality may be utilized even if a customer-initiated inquiry did not trigger a cancelled trade. In this scenario, the dealer axe may be directed to a single customer or multiple customers. For example, the dealer may select to send the electronic axe to all of the dealer's customers or one or more groups of customers. An advantage of the electronic axe functionality provided by the present invention is that it provides dealers with a mechanism for conveying binding and timely positions to its customers, while giving dealers another outlet for initiating trades to create liquidity.

Figure 18:
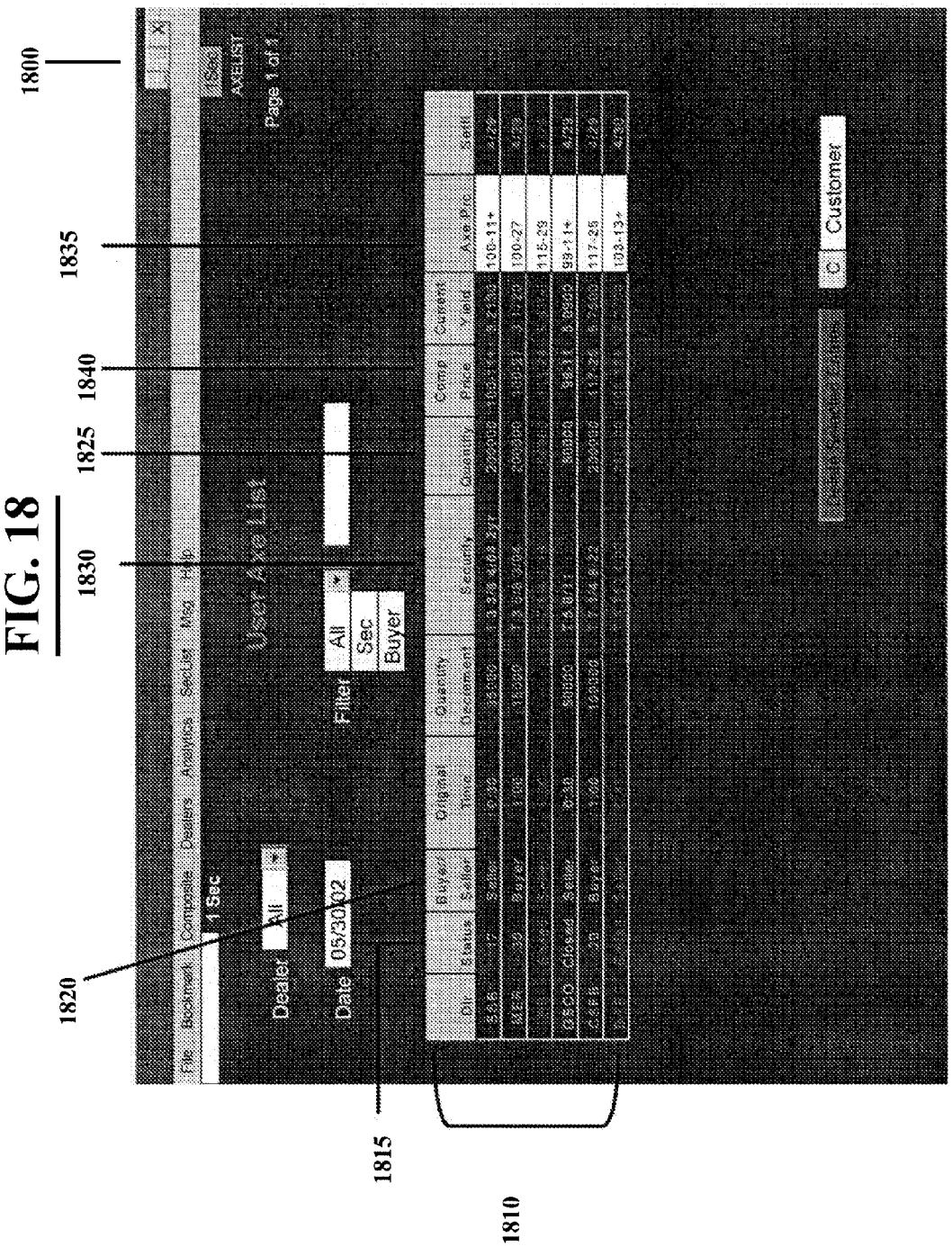

With reference to FIG. 18, the dealer is presented with an axe list screen 1800. The primary function of the axe list screen 1800 is to permit the dealer to monitor the electronic axes they have created through a particular day. The axe list screen 1800 preferably includes, but is not limited to, the following information: (1) a list of the day's axes 1810, (2) the status of the axes 1815; (3) whether the axe was a buy or sell offer 1820; (4) the unit quantity of the axe 1825; (5) the security or instrument that was the subject of axe 1830; (6) the axe price 1835; and (7) the current composite price 1840. In the exemplary embodiment, the status of the axe is represented by color, although a separate status field may be used. They are generally four (4) states for an electronic axe: (1) active, (2) completed, (3) ended, and (4) expired.

Figure 19:
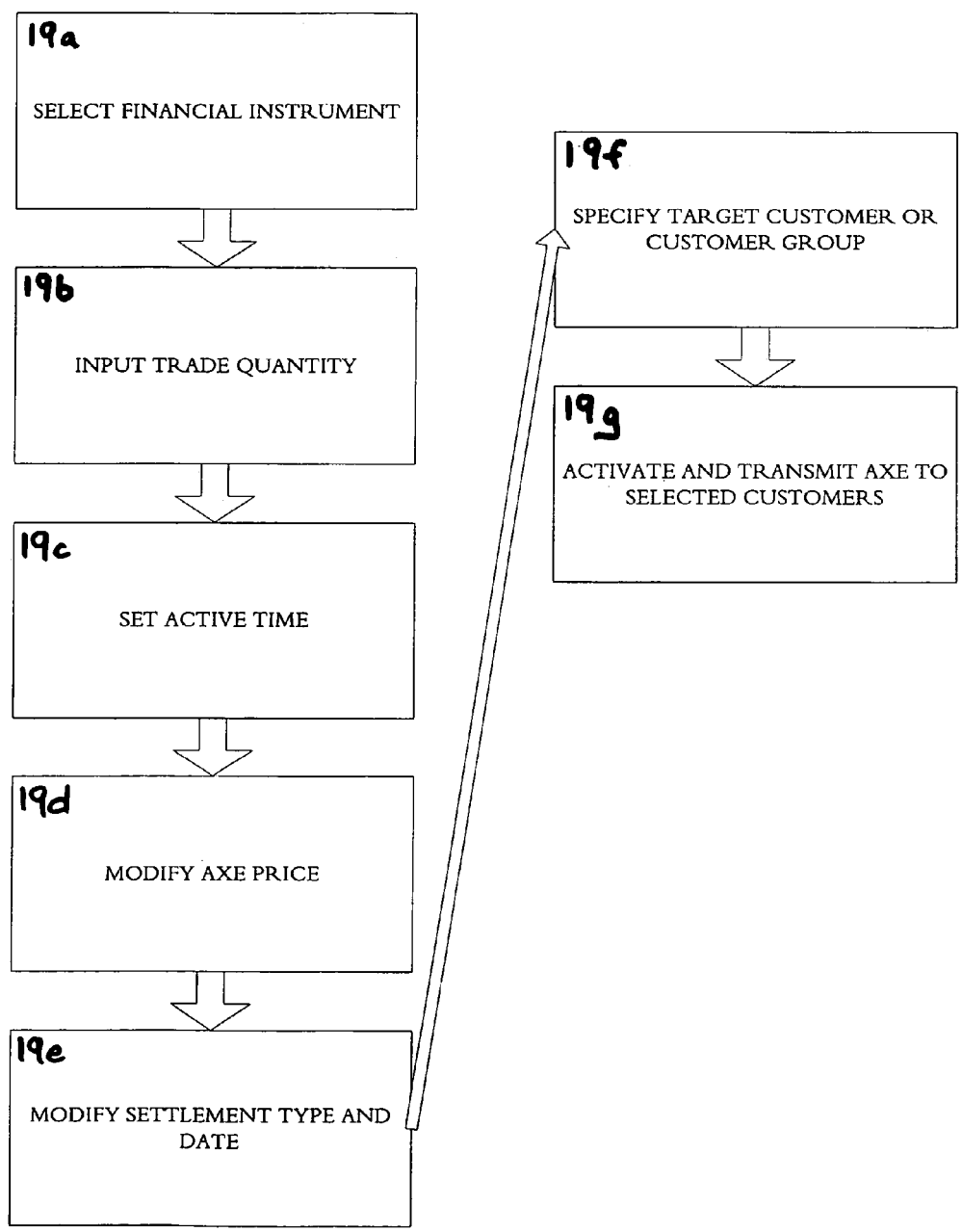
FIG. 19 is a flow diagram depicting an exemplary flow of creating and transmitting electronic axe messages.

With reference now to FIG. 19, an exemplary method of creating an axe will be described. In the exemplary embodiment, a button is included on the axe list screen 1800 for initiating the creation of an electronic axe. In the exemplary screen of FIG. 18, a "Add Swap" button 1850 is provided to initiate the create axe functionality. In a first step 19*a*, the dealer would select a specific financial instrument that will be the subject of the electronic axe. Upon selection, information concerning the selected instrument populates a line item on the axe list screen. In steps 19*b* and 19*c*, the dealer then inputs the quantity to be traded and sets time for the axe to be active. The dealer then can modify the axe price, which in a preferred embodiment is preloaded based on the then current composite price in the STP trading platform 100 upon selection of the instrument type. The dealer can modify the axe price, for example by inputting a price or by using (+) or (−) toggle buttons, in a step 19*d*. As an added layer of security, the dealer may be required to take some additional action to confirm the axe price, such as depressing (or clicking) a confirmation button. In step 19*e*, the dealer can modify the settlement type and date, as desired. In step 19*f*, the dealer can specify the target customer or customer group. Lastly, in step 19*g*, the dealer activates and transmits the axe to selected customers by indicating acceptance of the newly created electronic axe. The indication may be a click of an "activate" button or some other like action.

As described above, upon activation by the dealer, the information input into the axe list screen is transmitted to the STP trading platform 100 and the electronic trading module 160 uses the dealer information to generate an electronic axe message. The axe message is then communicated to the selected customers and displayed in several different manners, as described above. Transmission of the electronic axe data and electronic axe message is performed according to known electronic communication protocols such as TCP/IP. Preferably, the electronic axe data and electronic axe messages are formatted in XML so as to facilitate transmission between the dealer and the STP trading platform 100 and the systems 260 customer systems 200. The electronic axe message that is transmitted to the customer system 200 preferably includes a dealer name, an indication of whether the dealer is a buyer or a seller, the instrument type, the amount, and the on-the-wire time limit. The purpose of formatting the electronic axe message in this manner is to convey all of the material terms of the electronic axe and its binding nature to the customer.

Figure 20:
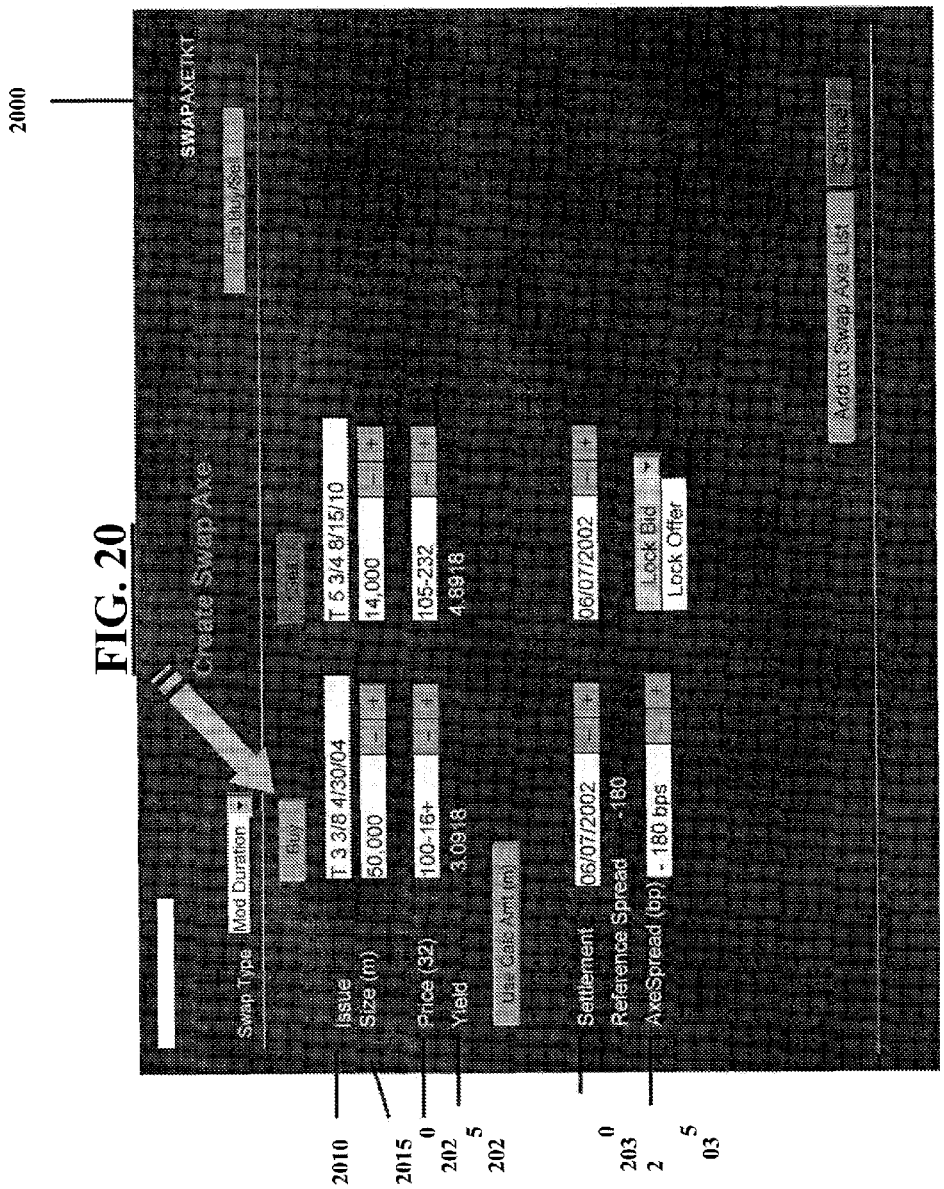
FIGS. 20-21 are screen shots depicting exemplary graphical user interfaces of various features of the STP trading platform.
Figure 21:
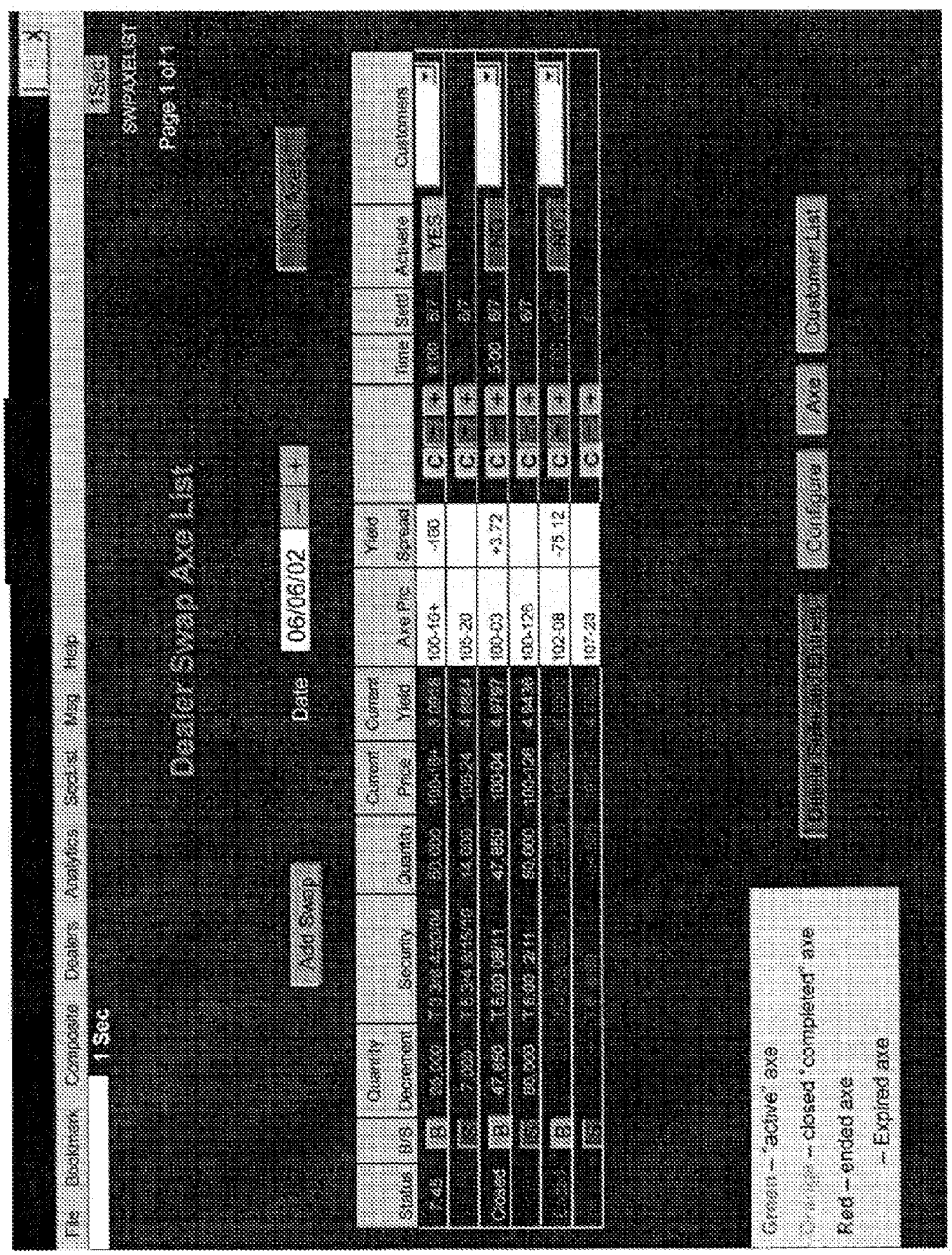

With reference now to FIGS. 20 and 21, the dealer may also create and monitor electronic swap axes. By way of background, a swap is a derivative transaction in which two trading entities agree to pay the other a certain amount of money at agreed to intervals where the amount of money to be paid is based on an underlying financial instrument. For example, a dealer may be willing to pay a customer the yield on a treasury bond on a monthly basis in return for the customer's payment of a fixed interest rate. To create and monitor electronic swap axes, the dealer is provided with an electronic swap axe list screen 2100, which is depicted in FIG. 21. The swap axe list screen 2000 may comprise the same information as the axe list screen 1800, shown in FIG. 18, with the addition of a "yield spread" field showing the difference in yield between the instruments to be swapped.

Figure 22:
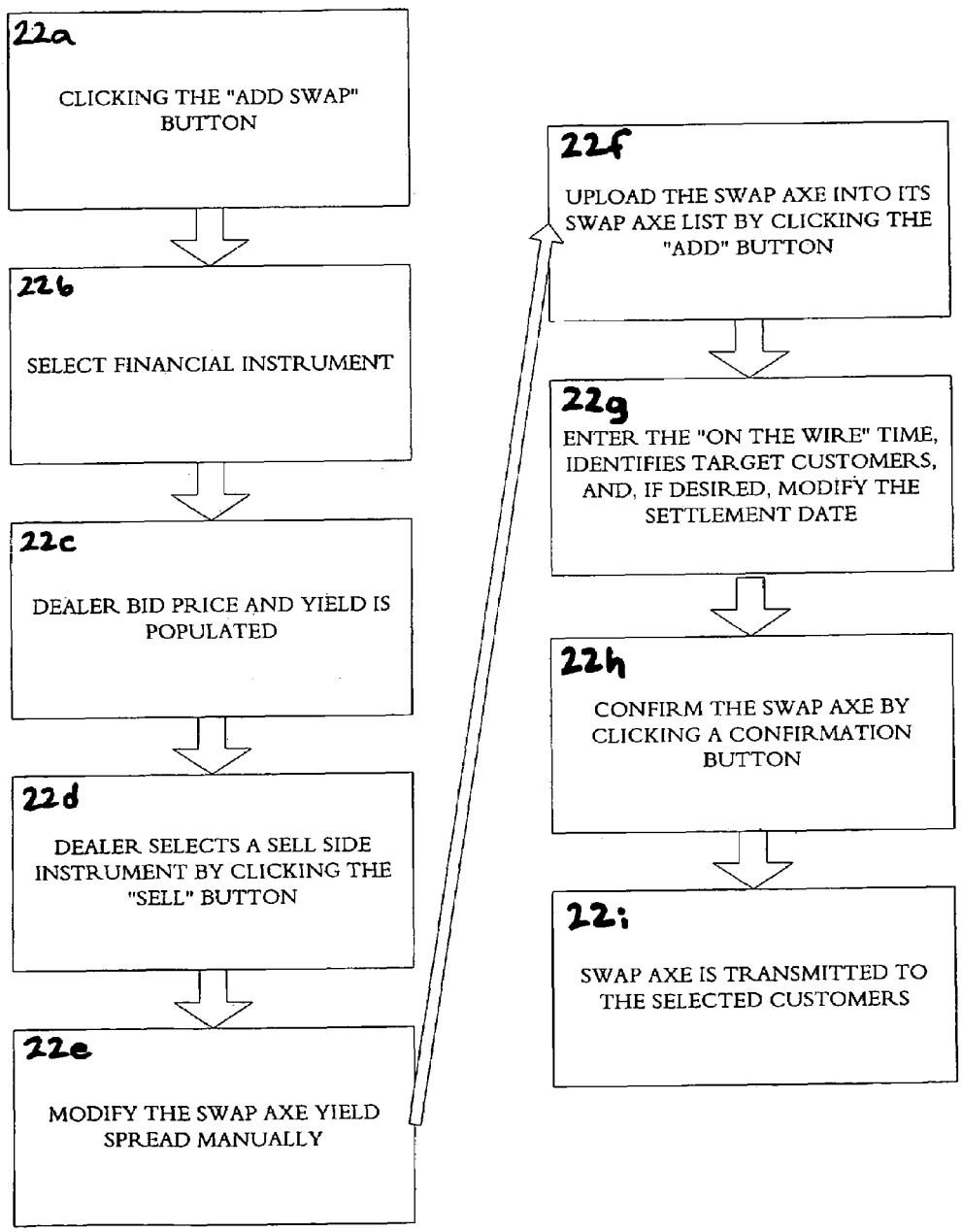
FIG. 22 is a flow diagram depicting an exemplary flow of creating and transmitting electronic swap axe messages.

With reference to FIG. 22, an exemplary method of creating a swap axe will be shown and described. By clicking the "add swap" button, in step 22*a*, a create swap axe screen 2000 is provided, as depicted in the exemplary screen of FIG. 20, and the create swap axe functionality is initiated. The create swap axe interface 2000 preferably includes input fields for information related to both a buy and sell side of a swap transaction, including the instrument type 2010, amount 2015, price 2020, yield 2025, settlement date 2030, and the axe spread 2035. In step 22*c*, by clicking the "buy" button, the dealer can choose an instrument type, in this example, 3 year T-Bills. Upon selection of the instrument, in step 22*b*, the maturity date, dealer bid price and yield is populated from the dealer's internal systems via an API, as described herein, in step 22*c*. Similarly, in step 22*d*, the dealer selects a sell side instrument by clicking the "sell" button. The maturity, dealer offer price, and yield is populated in the same manner. The system then calculates the reference yield from the dealer offer and bid prices. The dealer may also modify the swap axe yield spread manually in step 22*e*.

In step 22*f*, the dealer can upload the swap axe into its swap axe list by clicking the "add" button. In the swap axe list screen 2000, the swap axe is preferably shown as two list items so that the dealer can view both the buy-side and sell-side of the swap axe. If the dealer modified the yield spread during creation of the swap axe, then the trading module automatically calculates the buy and sell prices using the dealer modified axe yield spread. On the swap axe list screen 2000, in step 22*g*, the dealer then enters the "on the wire" time, identifies target customers, and, if desired, modify the settlement date. In step 22*h*, the dealer confirms the swap axe by clicking a confirmation button—in this example the "C" button. In step 22*i*, the swap axe is transmitted to the selected customers in the same manner as described above in connection with all electronic data communicated through the STP trading platform. The swap axe, as described above, is displayed to the selected customer in various manners including, but not limited to a pop-up notification window, a line item or an axe execution screen.

a. Axe Alerts

In certain situations, a customer may be interested in trading certain instruments or may desire to be specially notified if an electronic axe is received from a dealer or concerning a particular instrument. In such instances, according to an exemplary embodiment, the customer through operation of the electronic trading module 160 of the STP trading platform 100 and the customer-side electronic trading client 215 is provided with functionality to set alerts. Using the customer-side electronic trading client 215, the customer can link certain actions to be triggered by selected events. By way of example, a customer can choose to have a pop-up message launched if a certain price on a certain security from the composite price data is met or if an electronic axe on that security is received. Thus, whereas the customer may be receiving electronic axes as list items by default, an electronic axe on a selected security will trigger an alert in the form of a pop-up message. The message may be of the type described in connection with FIG. 15, above.

b. Axe Monitor

Throughout a given trading day a customer may receive several electronic axes or swap axes. Similarly, a dealer may create and transmit several electronic axes during the trading day. To aid customers and dealers in managing the receipt or transmission of electronic axes, the STP trading platform is further configured to record received and transmitted axes and provide an electronic axe management interface or electronic axe monitor.

Figure 23:
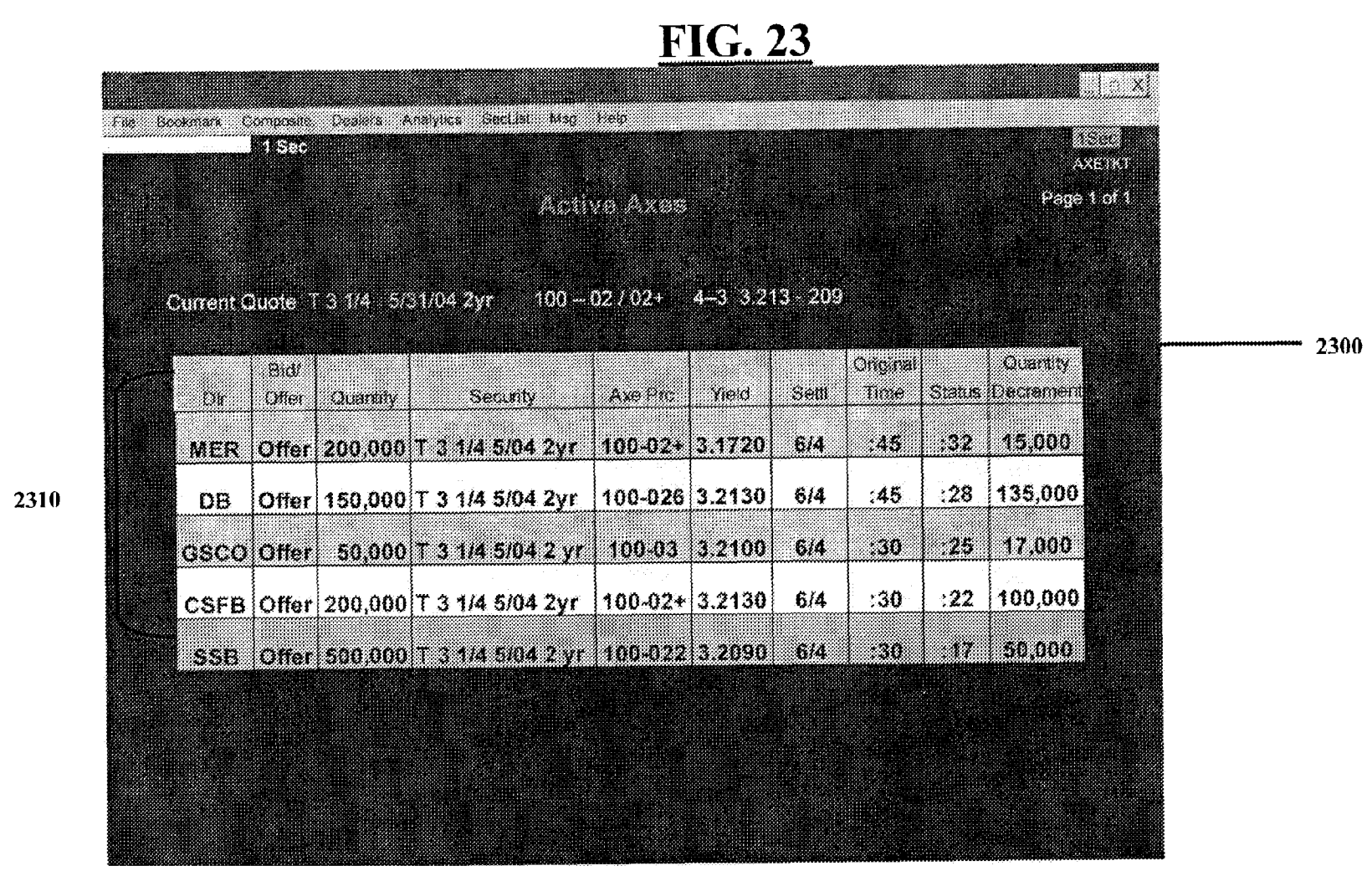

An exemplary electronic axe monitor 2300 interface is shown in FIG. 23. The electronic axe monitor 2300 preferably lists all of the electronic axes 2310 that a customer receives or a dealer transmits for a particular trading day. The customer electronic axe monitor 2300 displays each electronic axe along with pertinent information, which may include but is not limited to: the time received, the dealer, whether the axe was a buy or sell offer, the instrument type, the quantity, settlement date, price and status (e.g., active, expired, subject, etc.). The customer electronic axe monitor also preferably permits the customer to filter or sort the axes by product, dealer, and status. Because the electronic axes were executable trade offers at then-current market prices, the customer is provided a view of market movements beyond the level of information provide by composite price screens.

Similarly, the dealer electronic axe monitor (not shown) presents a view of a dealer's axes from the dealer perspective. Thus, in lieu of listing which dealer an axe was received from, the axe monitor will display the customer or group of customers to which the axe was transmitted.

4. Trade Execution—Alternate Systems and Phone Trades

The STP trading platform 100 is also preferably configured to process trades executed on systems other than the electronic trading module of the STP trading platform 100, such as trades executed via telephone or by an alternate electronic trading system. In these cases, trade details from alternate systems can be electronically imported into the STP trading platform 100 via electronic messaging using an API. Once the trade data is imported into the trade history database of the STP trading platform 100, STP functionality, as described herein, can be provided for trades executed on alternate systems or via the telephone. In the exemplary embodiment, the STP trading platform 100 are communicatively linked to a dealer's internal systems or trade management systems to import trade details. The trade details are delivered to the customer via STP trading platform 100 in the "DONE" state.

If the trade details are accepted or "checked-out" by the customer, the state will change to "ACC", and thereafter trade details are then treated similarly as trades completed via the electronic trading module of the STP trading platform 100. Such trades may then be allocated and electronically confirmed via the STP trading platform 100, as described further below.

Figure 24:
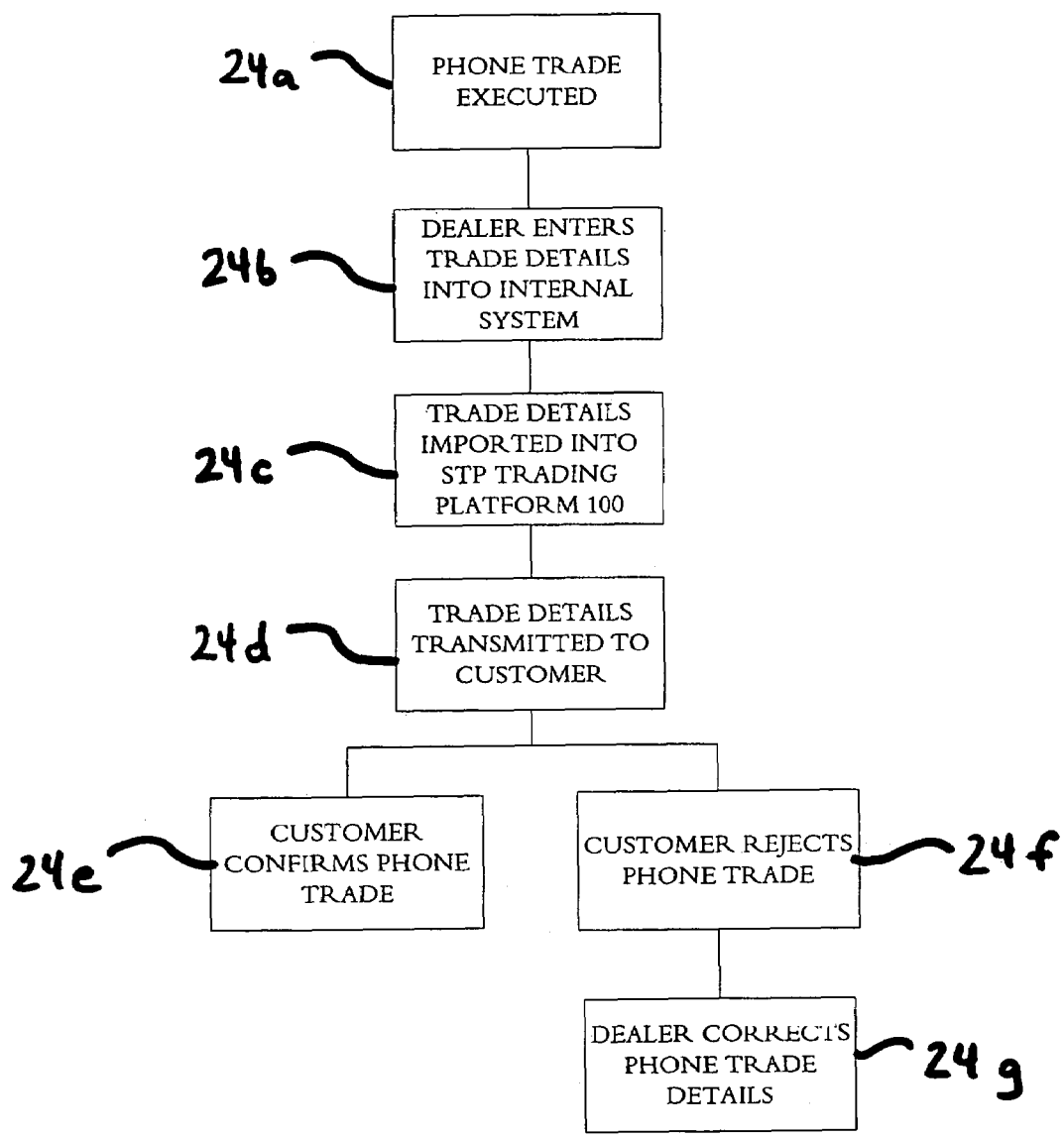
FIG. 24 is an exemplary data flow for handling phone trades via the STP trading platform.

With reference now to FIG. 24, the flow of a phone trade will now be shown and described. In a first step 24a, the dealer and customer execute a phone trade in a known manner. The dealer then inputs the trade details into its internal trade management system, in step 24b. In step 24c, the phone trade details are electronically imported into the STP trading platform 100 using the exemplary message format shown above. Phone trades are differentiated from other trades by virtue of an identifier, for example, "TELTRD." At this point, the phone trade details are assigned a "DONE" state (see Table V below) while customer acceptance is outstanding. In step 24d, the phone trade details are messaged to the customer-side electronic trading module 215 for review by the customer. The customer may accept the phone trade, as in step 24e, or reject the phone trade, as in step 24f. If the phone trade is accepted or checked-out, it is assigned the "ACC" state. If the phone trade is rejected, it is assigned the "REJ" state. In the case of a rejected trade, the dealer is given an opportunity to correct the phone trade details, in step 24g. The process flow returns to step 24d and the corrected phone trade is transmitted again to the customer. The corrected phone trade is again assigned the "DONE" state.

Additionally, a phone trade pop-up message 2400, as shown in FIG. 24a, may be used to confirm a phone trade. The pop-up message will include the phone trade details 2410 that can be reviewed by the customer, and may include graphical buttons 2420 (or the like) to permit the customer to confirm or reject the phone trade. Simply by selecting "confirm" or "reject" the customer can accept or reject a phone trade.

Phone trades that are accepted by the customer may be allocated, confirmed, and enriched with settlement instructions in the same manner as other trades handled by the STP trading platform 100.

5. Trade Acceptance, Allocation, and Confirmation

At each stage of a trade effected on the STP trading platform 100, or via alternate methods (e.g., phone trades) the trade is assigned a state that can be monitored by customers and dealers. An exemplary set of state codes is shown in Table V below.

TABLE V

EXEMPLARY STATE CODES

| State Codes | Explanation |
| --- | --- |
| DONE | Imported block trade details form phone trade or alternate trading system. |
| ACC | Block trade is accepted by customer, but not allocated. |
| REJ | Block trade not accepted by customer. |
| END | Inquiry made, but no trade executed. |
| ALLOC | Block trade allocated to sub-accounts, but not confirmed by dealer. |
| CONF | Dealer confirms all allocations, but does not send ETC. |
| DLRCONF | Dealer confirms all allocations and sends ETC to customer. |
| CONFP | Dealer confirms some, but not all of the allocations. No ETC transmitted. |
| AFFM | Customer affirms trade details in ETC. |
| ETCREJ | Customer rejects ETC or chooses to amend allocations. |
| ERR | Dealer cannot confirm trade details. | a. No ETC

Figure 29:
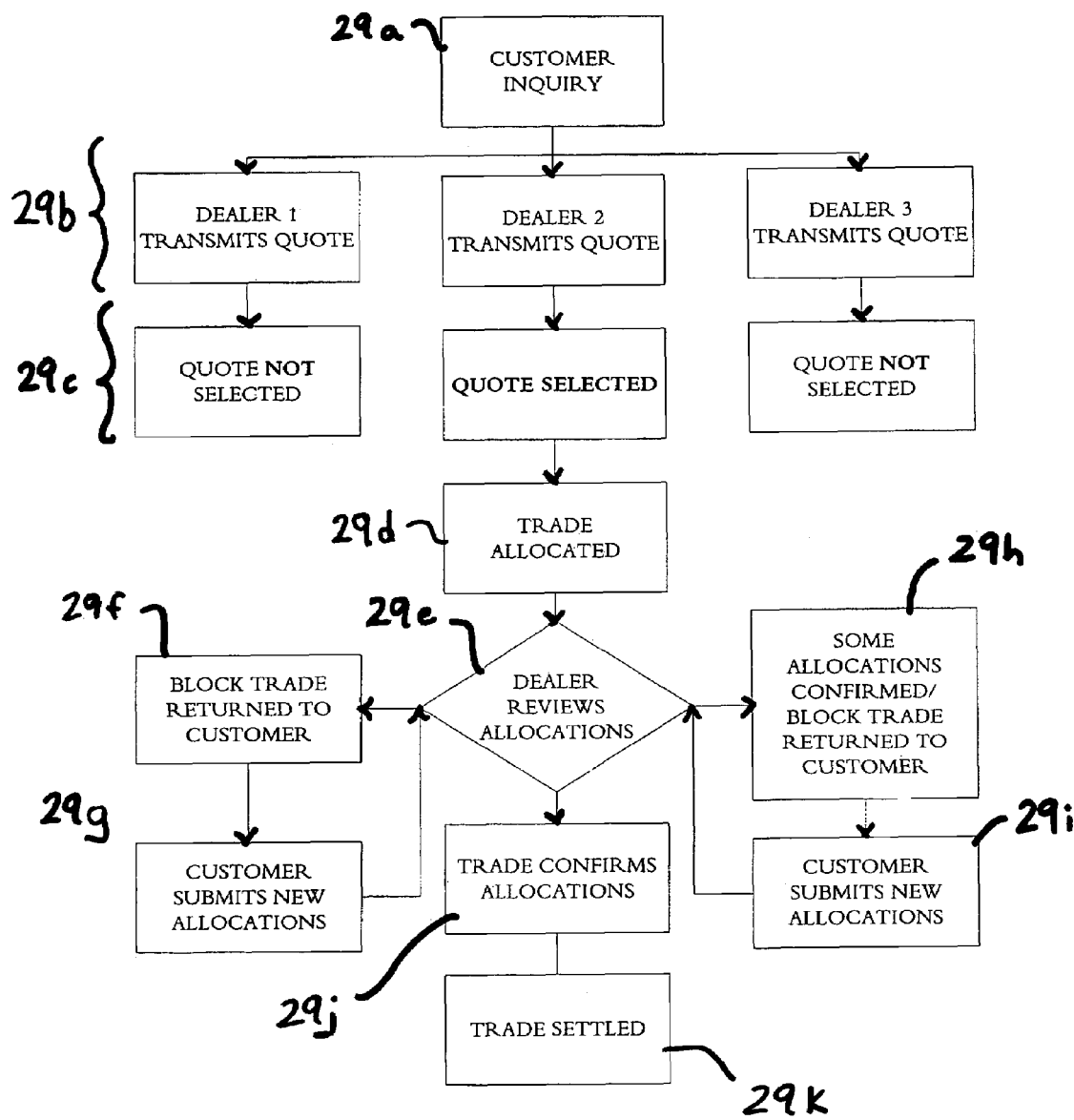
FIG. 29 is an exemplary data flow for allocating and confirming a block trade.

An exemplary trade acceptance and allocation process where an electronic trade confirmation is not utilized will now be described in connection with the exemplary states listed above in Table V and the flow of FIG. 29. In instances where the bid or offer is accepted, and thus a trade executed, the state of the trade is updated to show that the executed trade has been "accepted" using the "ACC" state. Non-selected dealer quotes that have "terminated" receive the "REJ" state. If a customer makes an inquiry and does not execute any trades, the dealer quotes receive the "END" state (not shown in FIG. 29).

At this point, because the details of all trades and trade inquiries are stored in the trade history database 115, the customer can view a trade detail screen 2500, which provides the particulars of the accepted transaction and the rejected dealer quotes or ended inquiries, as shown in FIG. 25. The customer can also view a transaction history interface 2600, as shown in FIG. 26.

Figure 27:
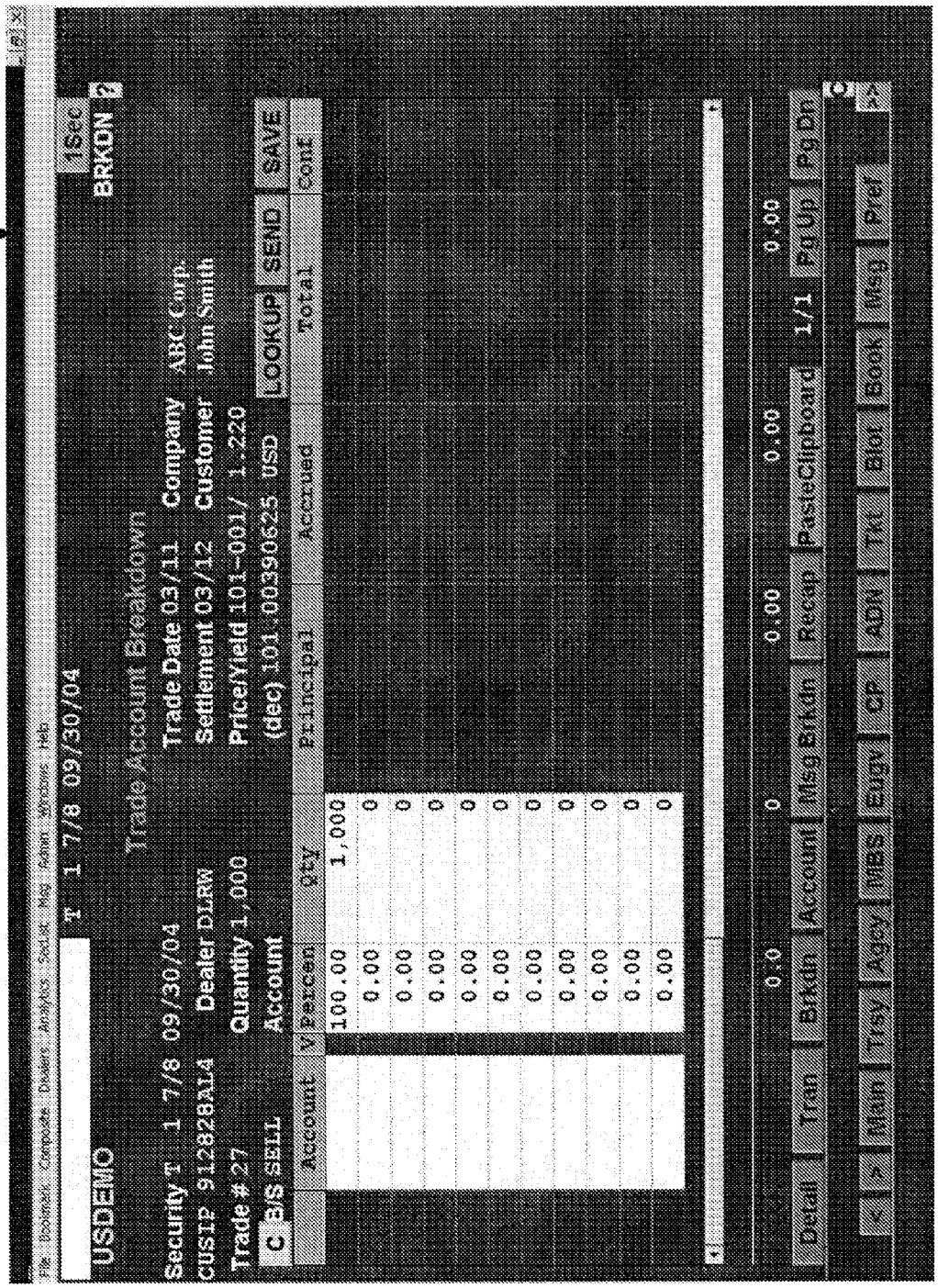
Figure 28:
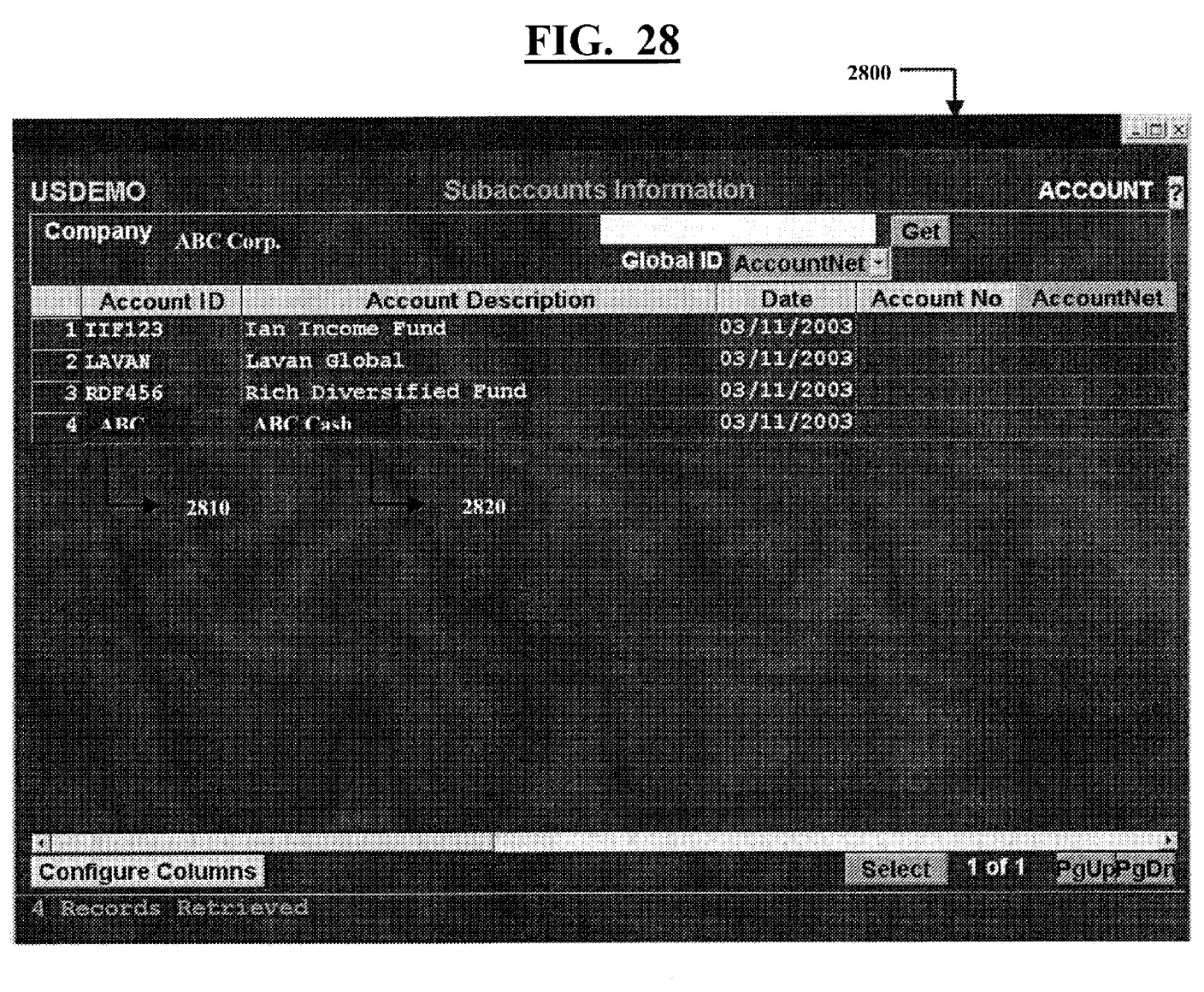

Further, the customer can choose to view a breakdown screen, as shown in FIG. 27, to allocate the block transaction to one or more sub-accounts. Of course, this is only necessary if the trade was not pre-allocated in the order generation stage. To perform this functionality, the electronic trading module 160 accesses information stored in the account management database 110. For example, the customer, by clicking the "lookup" button 2710 in an account search interface 2700, for example, can access a listing of its sub-accounts that are stored in the account management database 110. Account information may also be keyed in or auto-populated from the customer's OMS or other back office system. Account profiles that are stored in the account management database 110 may also store breakdown profiles, such that when an account profile is selected the breakdown percentages are also auto-populated. Upon accessing the sub-accounts, the customer is presented with an interface 2800 through which the customer can select one or more sub-accounts in which the customer desires to allocate the block trade, as shown in FIG. 28. In the exemplary embodiment of FIG. 28, the customer simply clicks on the "Account ID" 2810 or "Account Description" 2820 of the sub-account to make the selection.

To further facilitate post-trade allocation breakdown of a block trade, a drop down menu of available clearing firms (e.g., DTCC, Euroclear, Swift, Crest, etc.) will be auto-populated based upon the trade details, including account information, security and quantity.

Figure 30:
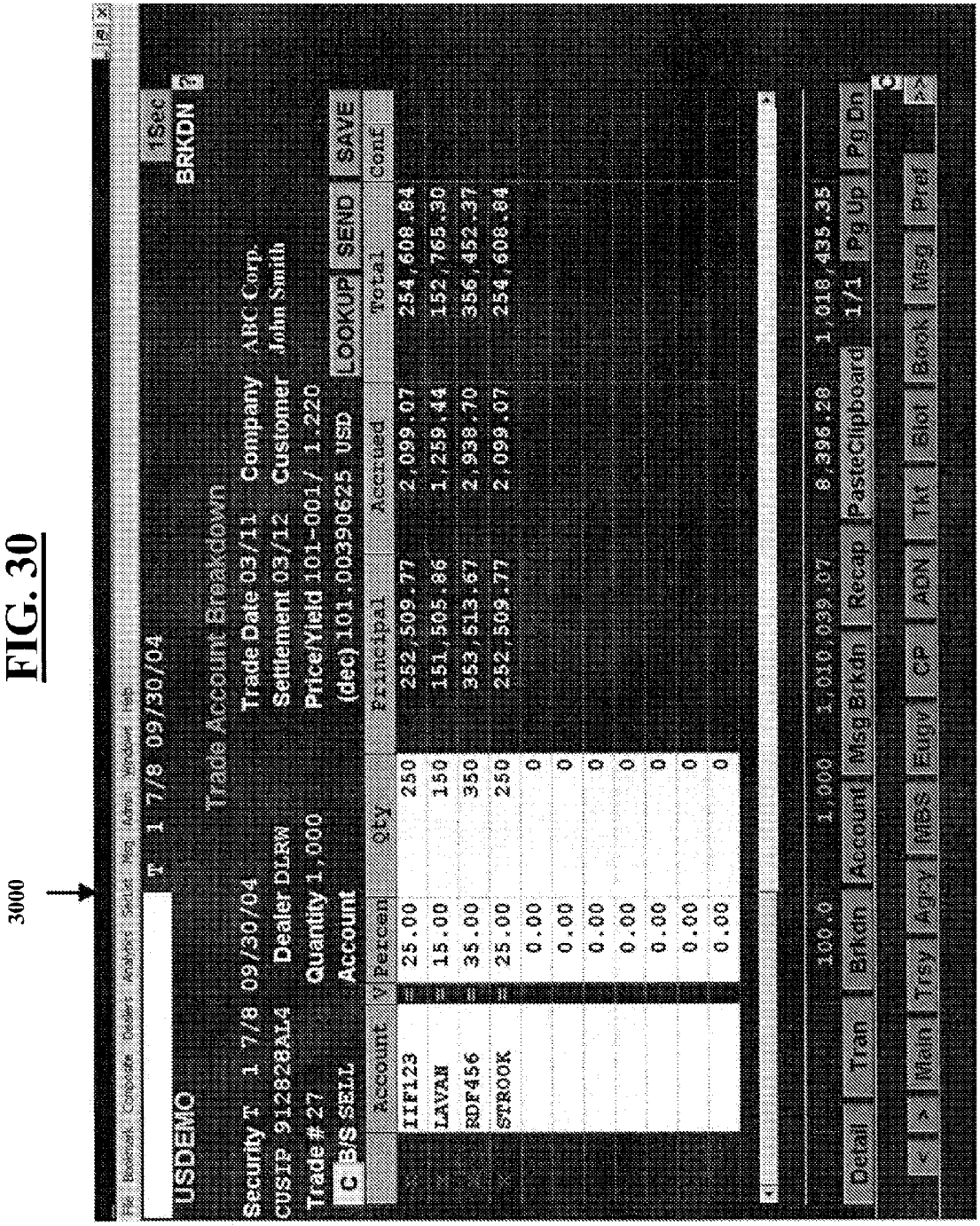
FIG. 30 is a screen shot depicting an exemplary graphical user interface of a features of the STP trading platform.

With reference to FIG. 30, upon selection, the customer is presented with a trade breakdown interface 3000 to permit the desired allocation. As shown in FIG. 30, a spreadsheet-type format may be used to effect the allocation. In this case, the customer keys in a percentage (column 3010) or quantity (column 3020) for each of the selected sub-accounts, as shown in FIG. 30. Upon completion of the allocations, an allocation message can be transmitted to the dealer to permit electronic confirmation of the trade and the respective allocation. The trade state is changed from "ACC" to "ALLOC" to indicate that the customer has allocated the block trade.

The allocation message transmission is preferably accomplished through the generation of an electronic message that is communicated to the dealer as described above. Persons of skill will recognize that the electronic allocation message and other electronic messages that are discussed herein as being transmitted between the customer and dealer through the STP trading platform 100 may be formatted in any known communication format, but are preferably formatted using a standardized message format, such as XML or FIX, as detailed above. XML stands for "Extensible Markup Language," that enables the definition, transmission, validation, and interpretation of data between applications. Similarly, FIX stands for "Financial Information Exchange" protocol, which is a standardized message format typically used to describe "real-time" security transactions. In either instance, or using any other standardized format known or heretofore developed, the STP trading platform 100 can transmit the trade details directly to dealers in a standardized format. By interfacing with an application program interface (API) exposed to all participants, or at a minimum exposed only to the dealers, participants can interface with the STP trading platform 100 to receive transaction details, along with settlement instructions, as described further below, in a standardized format that can be manipulated by the recipient participant to work with the participants internal trade management system.

For example, if a dealer uses an internal trade management system that employs a proprietary database format for storing trade details, the dealer may still achieve straight-through-processing of trades by interfacing with the exposed API of the STP trading platform. The dealer would then receive trade details in a standardized format that could be automatically translated to the dealer's proprietary format for use with the dealer's internal systems.

Moreover, when the customer transmits the allocation to the dealer, the STP trading platform 100 preferably dynamically enriches the transaction details with the customer's standing settlement instructions for the particular sub-accounts allocated by the customer as previously described. These settlement instructions preferably include a dealer identification code, commonly referred to as a BIA code, that is specific to the dealer for the particular sub-account identified by the allocation. Further, upon allocation, a separate allocation ticket is generated for each account. The allocation tickets include an identifier of the base block trade and are, thus, mapped to such block trade data file.

In order to facilitate STP integration with customer and dealer internal systems, the back office management module 140 of the STP trading platform 100 may generate a "booking report" message that can be used to confirm each of the allocations in a particular trade. Table VI shows an exemplary booking report message using the FIX protocol:

TABLE VI

EXEMPLARY BOOKING REPORT MESSAGE

| Message Type | Fields | FIX Tag |
| --- | --- | --- |
| Booking Report | BookingID <unique system generated ID> | 6641 |
| | BookingTransType <new, replacement, cancel> | 6642 |
| | AllocID <system generated ID> | 70 |
| | RefAllocID <customer generated ID> | 72 |
| | NoOrders <number of orders combined for allocation> | 73 |
| | OrderID <dealer assigned order ID> | 37 |
| | SecondaryOrderID <system assigned ID> | 198 |
| | ClOrdID <Order ID assigned to trade> | 11 |
| | Symbol <FIXED> | 55 |
| | Side <buy/sell> | 54 |
| | SecurityID <CUSIP/ISIN> | 48 |
| | IDSource <CUSIP=1, ISIN=4> | 22 |
| | Product <high level security class code; e.g., Gov't Treasuries = GOVERNMENT Gov't Agencies = AGENCY Mortgage-Backed = MORTGAGE Corporate Bonds = CORPORATE> | 6613 |
| | SecurityType <security classification; e.g., CORP = Corporate Bonds CP = Commercial Paper MBS = Mortgage-Backed Securities | 6609 |

TABLE VI-continued

EXEMPLARY BOOKING REPORT MESSAGE

| Message Type | Fields | FIX Tag |
|---|---|---|
| | TBA = TBA Mortgages | |
| | UST = US Treasury Note/Bond | |
| | CouponRate <percentage> | 223 |
| | MaturityDate <YYYYMMDD> | 6637 |
| | IssueDate <YYYYMMDD> | 6620 |
| | Currency <currency code, default = USD> | 15 |
| | FutSettDate <YYYYMMDD> | 64 |
| | Qty <total size of trade allocated> | 53 |
| | AvgPx <average price at which accumulated executions took place, percentage> | 6 |
| | Trade Date <the trade date as per FIX specification> | 75 |
| | TransactTime <date and time of execution> | 60 |
| | Account <customer defined sub-account #> | 1 |
| | GrossTradeAmt <principal amount of trade> | 381 |
| | Net Money <net proceeds of trade> | 118 |
| | ExecBroker <counterparty to trade, BIC> | 76 |

Further, the STP trading platform 100 may provide an automatic download feature in which all accepted trades performed by any trader at either a customer or dealer are consolidated into a single flat file. This consolidated file may be imported into the customer's or dealer's in-house systems to automatically update back office systems.

By way of non-limiting example, in operation, the first trade of each day creates a new file for the trading day. Subsequent trades will be posted to the same file throughout the day. An exemplary naming convention is as follows: TWTRDCCYYMMDDF.TXT, where TWTRD denotes that this is the company's trades, CCYYMMDD is the century, year, month, and day and F denotes the format. As an example, the file name for trades executed on Jan. 4, 2004 in comma-delimited format is TWTRD20040104C.TXT. This file may be uploaded to in-house systems at any time.

The actual file format may be either: (1) text file format that may be interfaced to other systems, or (2) delimited format for spreadsheets. An example of the fields and information of such a file is shown below in Table VII:

TABLE VII

| Description | Columns | Format | Notes | Max length in fixed format |
|---|---|---|---|---|
| Trade Type | 1-8 | Character | Currently this field may contain one of three values:<br>(1) "USGOV" for U.S. Government Securities, U.S. Agency-issued securities, U.S. TBA Mortgage securities and Euro Sovereign Debt securities.<br>(2) "USTSWAP for Treasury Swaps.<br>(3) "OUTRIGHT" for Commercial Paper. | 8 characters |
| Product Group | 10-17 | Character | (1) "TRSY" for U.S. Treasury securities.<br>(2) "AGCY" for U.S. Agency-issued securities.<br>(3) "EUGV" for Euro Sovereign Debt securities.<br>(4) "MBS" for U.S. TBA Mortgage securities.<br>(5) "CP" for U.S. Commercial Paper. | 8 characters |
| Trade Date | 19-28 | CCYY/MM/DD | Century, year, month and day format.<br>10 characters<br>Trade Number 30-34 Numeric The trade number is unique per product per dealer. | 5 characters |
| Dealer | 36-41 | Character | ABN—ABN AMRO<br>BARC—Barclays Capital<br>BEAR—Bear Stearns<br>BNPP—BNP Paribas<br>COMZ—Commerzbank<br>CSFB—Credit Suisse First Boston<br>DB—Deutsche Banc Alex Brown<br>DRKW—Dresdner Kleinwort Wasserstein<br>GSCO—Goldman Sachs<br>GCM—Greenwich Capital Mkts<br>HSBC—HSBC<br>JPM—JP Morgan Chase<br>LEH—Lehman Brothers<br>MER—Merrill Lynch<br>MS—Morgan Stanley<br>SSB—Salomon Smith Barney<br>SG—Societe Generale<br>UBSW—UBS Warburg | 6 characters |
| Trade State | 43-52 | | "Accepted", "Cancel", "Cancel-mod" or "Cancel-brk" | 10 characters |
| CUSIP | 54-65 | Character | CUSIP number | 12 characters |
| Security | 67-91 | Character | Security description | 25 characters |
| Settlement Date | 93-102 | CCYY/MM/DD | Century, year, month and day format. | 10 characters |
| Account | 104-123 | Character | Trade or breakdown account name, (may be empty) | 20 characters |

TABLE VII-continued

| Description | Columns | Format | Notes | Max length in fixed format |
|---|---|---|---|---|
| Trade Time | 125-132 | | HH:MM:SS Trade, Correction, Cancellation or Breakdown time (The time the trade was done, or further modified.) | 8 characters |
| Buy/Sell | 134-139 | Character | "BUY", "SELL" | 6 characters |
| Quantity | 141-152 | Numeric | Max 12 digits, Quantity is number of bonds. 1000 = 1 million par value | 12 characters |
| Price (decimal) | 154-169 | Numeric | Max 16 digits | 16 characters |
| Discount Rate | 171-186 | Numeric | Max 16 digits | 16 characters |
| Yield | 188-203 | Numeric | Max 16 digits | 16 characters |
| Principal Amount | 205-222 | Numeric | Max 18 digits | 18 characters |
| Total Payment | 224-241 | Numeric | Max 18 digits | 18 characters |
| Accrued Interest Per Bond | 243-260 | Numeric | Max 18 digits | 18 characters |
| Accrued Interest Amount | 262-279 | Numeric | Max 18 digits | 18 characters |
| Breakdown Number | 281-285 | Numeric | When a trade is broken down, it will be assigned a unique number by the system. This is the Breakdown Number. All breakdowns will also have in the Trade Number field the trade number of original (i.e. parent) trade. All parent trades or single ticket trades will have zero in the Breakdown Number field. | 5 characters |
| Customer Name | 287-306 | Character | Customer name | 20 characters |
| Branch Name | 308-327 | Character | Branch name | 20 characters |
| ISIN | 329-344 | Character | For Product Group "EUGV" it will contain the ISIN otherwise it will be blank. | 16 characters |
| Clearing Code | 346-361 | Character | Clearing Code details if appropriate | 16 characters |
| Coupon | 363-369 | Numeric | Max 7 digits | 7 characters |
| Maturity date | 371-380 | CCYY/MM/DD | Security maturity date | 10 characters |
| Security type | 382-391 | Character | U.S. Treasury securities: "REGBILL", "WIABILL", "WIBBILL", "REGNOTE", "WIANOTE", "WIBNOTE" "STRIPPRIN" or "STRIPPINT" U.S. Agency-issued securities: "WIAFNMA", "WIBFNMA", "REGFNMA", "WIAFHLMC", WIBFHLMC", "REGFHLMC", "WIAFHLB", "WIBFHLB", "REGFHLB", "WIASUPRA", "WIBSUPRA", "REGSUPRA" U.S. TBA Mortgage securities: "TBAFNMA", TBAFHLMCG" or "TBAGNMA1" U.S. Commercial Paper: "CP" Euro Sovereign Debt securities: "REGBGB", "REGBTNS", "REGBTPS", "REGDBR", "REGBKO", "REGFRTR", "REGIRISH", "REGNETHR", "REGOBL", "REGPGB", "REGRAGB", "REGRFGB", "REGSPGB", "REGTHA", or "REGOLO" Pfandbriefe: "DEPFAN", "ESPFAN" or "FRPFAN" | 10 characters |
| STIP | 393-456 | Character | STIP, if applicable | 64 characters |
| Time sent | 458-465 | HH:MM:SS | Trade sending time. When a trade is broken down, it will be assigned original (i.e. parent) trade sending time. | 8 characters |
| Time zone | 467-474 | Character | Time zone implied by "Trade time" and "Time sent" fields. "EST"—Eastern Standard Time, "EDT"—Eastern Daylight Time, "GMT"—Greenwich Mean Time, "BST"—British Standard Time | 8 characters |
| Customer notes | 476-603 | Character | Notes entered on trade ticket, if any. | 128 characters |
| Customer tracking number | 605-636 | Character | To be implemented at a later date. Customer enters info on ticket, which will persist through the trade. | 32 characters |
| Issuer Acronym | 608-639 | Character | CP Issuer Acronym Info | 32 characters |
| Customer location | 641-644 | Character | Linked to Account Management Module | 4 characters |
| Dealer Location | 646-649 | Character | Linked to Account Management Module | 4 characters |

TABLE VII-continued

| Description | Columns | Format | Notes | Max length in fixed format |
|---|---|---|---|---|
| Currency | 651-653 | Character | USD, GBP or EUR | 3 characters |
| Regulatory type | 655-662 | Character | Character CP Issue Regulatory type: "3(a)2", "3(a)3", "3(a)4", "4(2)", "144A", "3(c)7" | 8 characters |

By way of summary, and as further described below, the enriched trade details may also populate an electronic confirmation form standardized as required by government regulation, such as SEC Rule 10b-10. Dealers may also be provided functionality to manually add additional disclosures to the electronic confirms, as desired. Persons of skill will recognize that additional dealer disclosures can be automatically inserted into the standardized confirm form. With reference again to FIG. 4, the electronic confirms are then made available to customers for review and acceptance, in step 4e, and, in step 4f, the customer can electronically confirm or reject the trade through the STP trading platform 100. In step 4g, if the electronic confirmation is confirmed by the customer and dealer, then the trade is listed as "AFFM" in the master blotter stored in the trade history database 115 of the STP trading platform 100. This process will be described in greater detail below.

Thus, in an exemplary embodiment depicted in FIG. 30, when the customer selects the "send" button 3030, for example, to transmit the allocation to the dealer, the electronic trading module 160 retrieves the standing settlement instructions for the allocated sub-accounts from the account management database and adds the settlement instructions to the electronic allocation message carrying the trade details, which preferably include the dealer BIA code that refers to the dealer's internal records of the allocated sub-accounts. Upon receipt of the electronic message, the dealer can analyze the trade details, allocations, and settlement instructions, and electronically confirm the transaction. Upon confirmation by the dealer, the trade is assigned the "CONF" state.

In cases were no electronic trade confirmation is to be utilized, the settlement instructions received with the trade details are used by the dealer to settle the trade through the appropriate clearing agency. By eliminating the need for the customer's back office personnel to have to provide the dealer's back office with allocations and settlement instructions via fax or telephone, as is presently done, the chance for human error is significantly reduced. Moreover, the need for the customer's back office personnel to have to key the allocations and settlement instructions into a fax transmission is eliminated, as is the need for the dealer's back office personnel to re-key the allocations and settlement instructions in their internal systems. Thus, redundant systems can be eliminated, and the trading process simplified.

If the dealer cannot confirm any of the allocations made by the customer, then the dealer rejects the allocations and the trade is assigned the "ERR" state. Dealers may reject allocated trades under several circumstances, including but not limited to (i) the allocated trade details not matching the details of the block trade and (ii) the dealer not having the proper account data. Table VIII lists various conditions that can lead to a trade rejection.

TABLE VIII

EXEMPLARY TRADE REJECTION CODES

| Rejection Codes | Explanation |
|---|---|
| 0001 | Trade not recognized |
| 0002 | Incorrect "Bought" or "Sold" indicator |
| 0003 | Incorrect security |
| 0004 | Incorrect price |
| 0005 | Incorrect price currency |
| 0006 | Incorrect commission |
| 0007 | Incorrect interest |
| 0008 | Incorrect trade date |
| 0009 | Incorrect trade time |
| 0010 | Incorrect dealing capacity |
| 0011 | Incorrect settlement date |
| 0012 | Narrative not understood |
| 0013 | Trading conditions not understood |
| 0014 | Incorrect fund ID or fund name |
| 0015 | Incorrect quantity |
| 0016 | Incorrect settlement instructions |
| 0017 | Incorrect (initial charges) amount, rate or currency |
| 0018 | Incorrect charges |
| 0019 | Incorrect settlement currency |
| 0020 | Incorrect exchange rate |
| 0021 | Incorrect trade net cost |
| 0022 | Duplicate trade |
| 0023 | Incorrect tax |
| 0099 | Dealer specific rejection comment. |

In some instances the dealer may be able to confirm some of the allocations, but not all of the allocations. In this case, the block trade is assigned the "CONFP" state and a message is transmitted to the customer. Upon receipt of a message including a CONFP state, the customer can either (i) cancel and reissue new allocations or (ii) cancel or correct the block trade. If new allocations are made, then an allocation message with the state "ALLOC" is transmitted to the dealer and the process begins again until the trade is either confirmed or cancelled altogether.

b. Electronic Confirmation/Clearance

Figure 31:
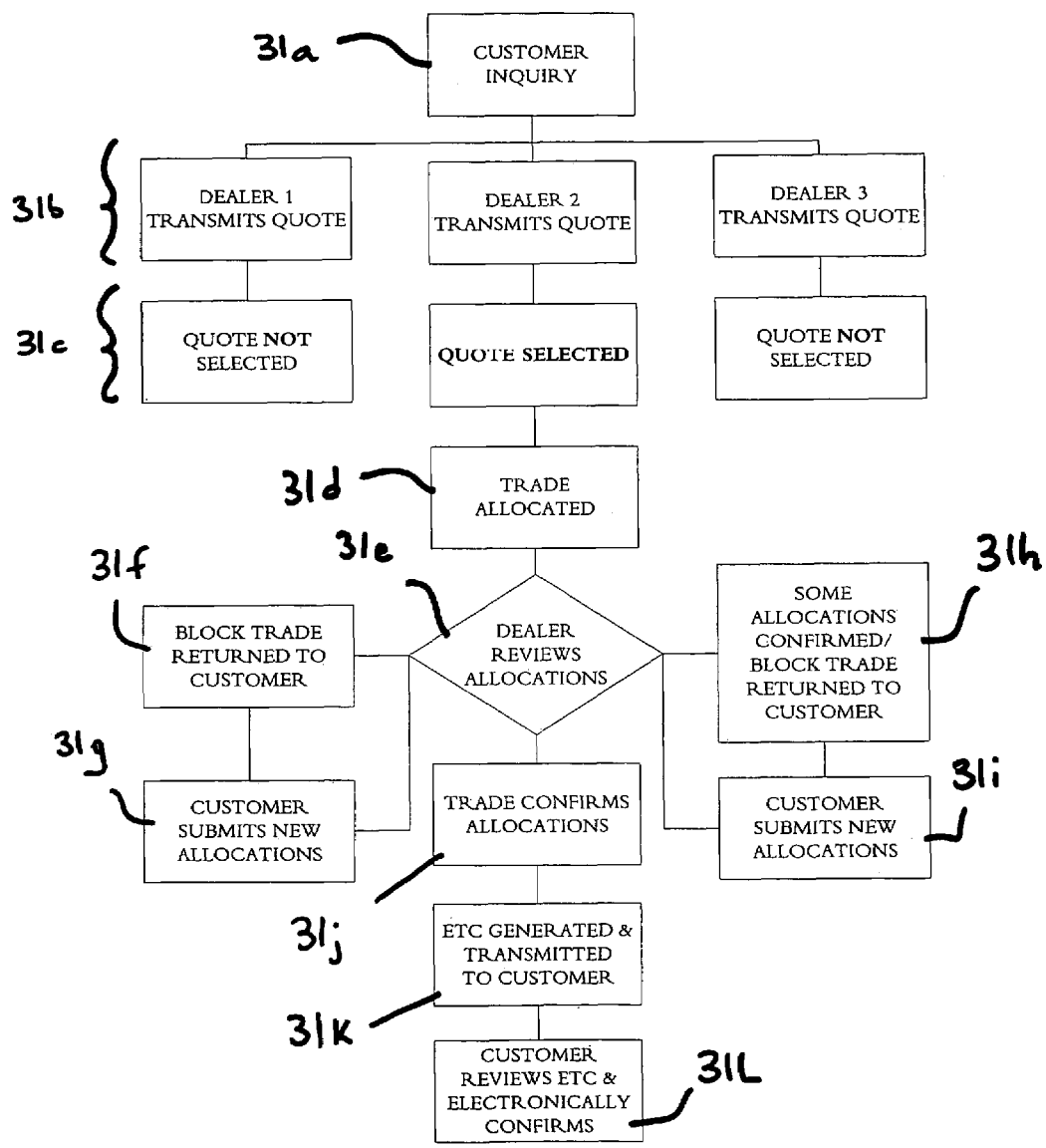
FIG. 31 is an exemplary data flow for allocating and confirming a block trade using an Electronic Trade Confirmation.

Furthermore, according to the exemplary data flow of FIG. 31, the STP trading platform 100 is preferably, but not necessarily, configured to compare trade details and related information received from dealers and customers and permit electronic confirmation according to applicable government laws, rules and regulations. By example, SEC Rule 10b-10 requires that certain disclosures be included in a confirmation. In order to satisfy SEC Rule 10b-10, the STP trading platform 100 may be programmed to generate an electronic trade confirmation ("ETC") template containing the required Rule 10b-10 disclosures. To satisfy SEC Rule 10b-10, in the exemplary embodiment, the ETC template preferably includes the fields listed in Table IX. Table IX also sets forth an exemplary model for retrieving information from the account management and trade history databases 110, 115 to facilitate creation of the ETC.

TABLE IX

EXEMPLARY ETC FIELDS

| Fields | Dealer Supplied | STP Trading Platform Supplied |
|---|---|---|
| Trade time | | TH |
| Trade date | | TH |
| Price | | TH |
| Nominal/Quantity | | TH |
| Principle/Gross amount | X | |
| Accrued | X | |
| Net | X | |
| Acted as: Principal/Agent/ Agency Cross | X | |
| Dealer legal entity | X | |
| Buy/Sell | | TH |
| Settlement date | | TH |
| Number of days accrued | | TH |
| Settlement currency | | TH |
| Security code | | TH |
| Security code type (e.g., CUSIP, ISIN, SEDOL) | | TH |
| Security description | | TH |
| Client name | | TH |
| Confirmation reference number | | TH |
| Trading conditions | X | |
| Dealer disclaimer | | AM |
| Dealer address | | AM |
| Customer address | | AM |
| Dealer telephone number | | AM |
| Callable debt disclaimer (may be part of Dealer disclaimer above) | | AM |
| Asset backed disclaimer (may be part of Dealer disclaimer above) | | AM |
| Comment field | X | |
| Alternative security code | | AM |
| Exchange rate | X | |
| Standing Settlement Instructions (SSI) from account management system. | | AM |

TH = Retrieved from trade history database 115
AM = Retrieved from account management database 110

The exemplary confirmation system of the present invention preferably follows the following data flow as shown in FIG. 31. In step 31a, a customer makes a trade inquiry. One or more dealers transmit trade quotes, in step 31b. The customer then, in step 31c, selects one of the quotes to execute a trade. For trades effected on the STP trading platform 100, the trade details for block trades would be stored electronically in an associated trade history database 115. As described above, the trade history database 115 stores a record for each trade executed on the STP trading platform 100 using a unique identifier for each such trade. For non-system trades, such as trades effected over alternate electronic systems and telephone trades, the trade details for block trades would be electronically imported by a dealer through the dealer's trade blotter interface and then communicated to the appropriate customer, as described above. If the terms of the non-system block trade are accepted by the customer, the block trade is given the "ACC" state and a record of the accepted trade is stored in the trade history database 115. The block trade detail can then also be used to populate the trade blotter and other back office management interfaces of the customer.

After receiving the trade details of an accepted block trade, a customer would review the details and may include any trade allocation instructions (e.g., instructions to allocate the trade among sub-accounts, as described above), in step 31d. The STP trading platform 100 assigns the "ALLOC" state and transmits each allocation ticket created by the STP trading platform 100 as a result of the customer's allocations to the dealer. A record of the allocations is also stored by the trade history database 115. At this point, each allocation ticket may be enriched with settlement instructions electronically accessed from the account management database 110 of the STP trading platform 100.

Next, in step 31e, the dealer reviews the allocation tickets and processes the trade details for each sub-account set forth in the allocation. The dealer may then acknowledge that it has processed and accepted each allocation ticket in step 31g. In the event that an allocation is not processed by the dealer (e.g., a sub-account has not been mapped to the dealer's internal system), as in step 31h, the dealer can only confirm certain of the allocations and the trade will be assigned the "CONFP" partial confirmation state and an error message will be transmitted over the STP trading platform 100 to the customer with specific instructions explaining why the specific allocation ticket could not be processed. If the dealer rejects all of the allocations, as in step 31f, the trade will be returned to the customer and assigned the "ERR" state.

After all of the allocation tickets are processed and confirmed by the dealer, the STP trading platform 100 may generate an ETC, in step 31j. At this point, the allocated trade is assigned the "CONF" state. Each ETC will preferably include all the information required to be disclosed under relevant government laws, rules, or regulations, if applicable, such as by way of example SEC Rule 10b-10. In addition, the ETCs would provide dealers the ability to include any additional disclosures that they may wish to provide, which are specific to the dealer. The ETC may also indicate that the customer should contact the dealer with whom it effected a transaction with any questions. Any such communication following delivery of the ETC would preferably occur directly between the dealer and the customer, although the dealer and the customer may elect to use electronic messaging facilities provided by the STP trading platform 100. Persons of skill in the relevant art will recognize that although it is preferred that the ETC conform to applicable government laws, rules, or regulations, the ETC of the present invention may be utilized in jurisdictions where not such applicable government laws, rules, or regulations exist. In such cases, the ETC may still be used to electronically confirm trades in a binding fashion through use of master trading agreements and the like.

Figure 32:
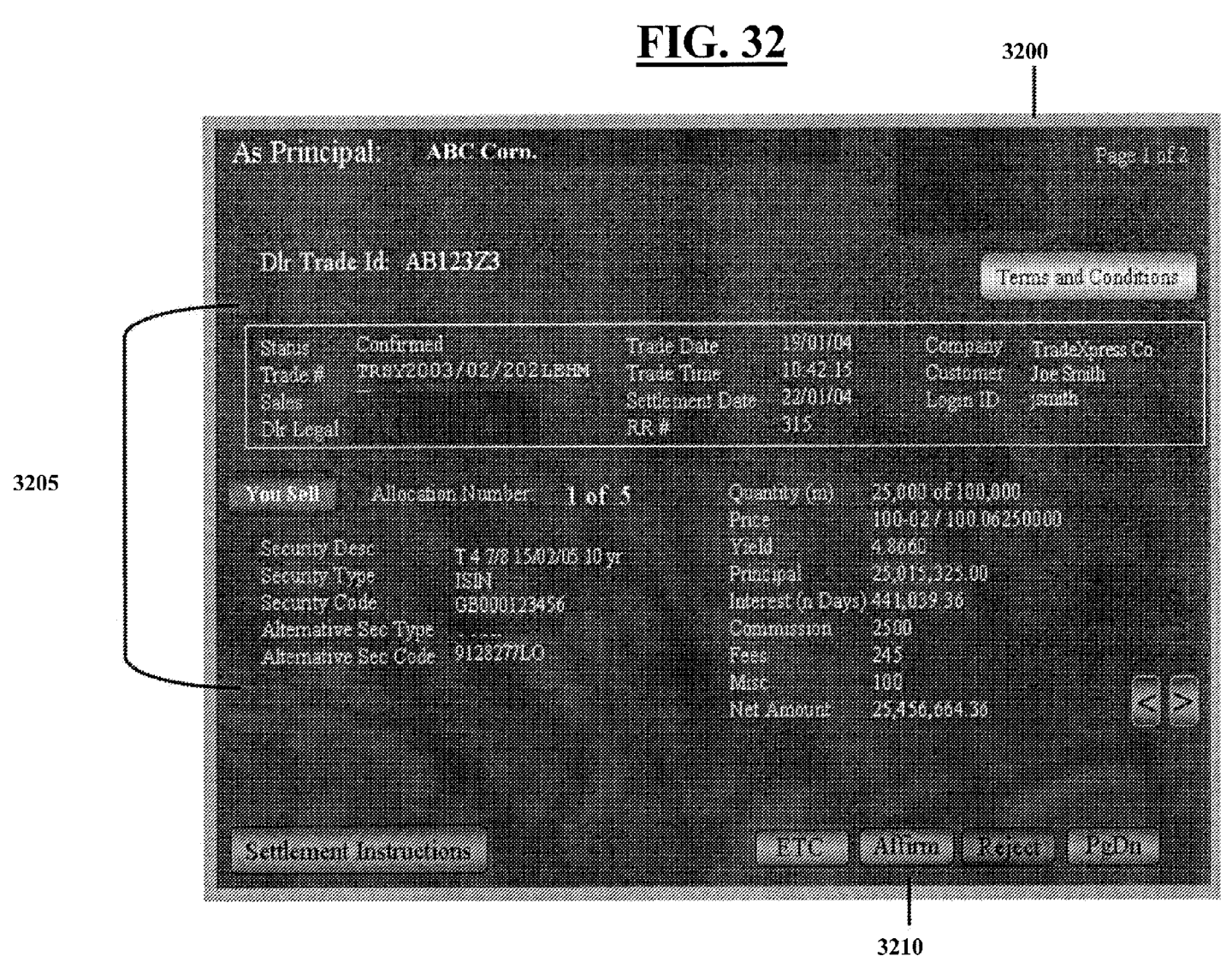
Figure 34:
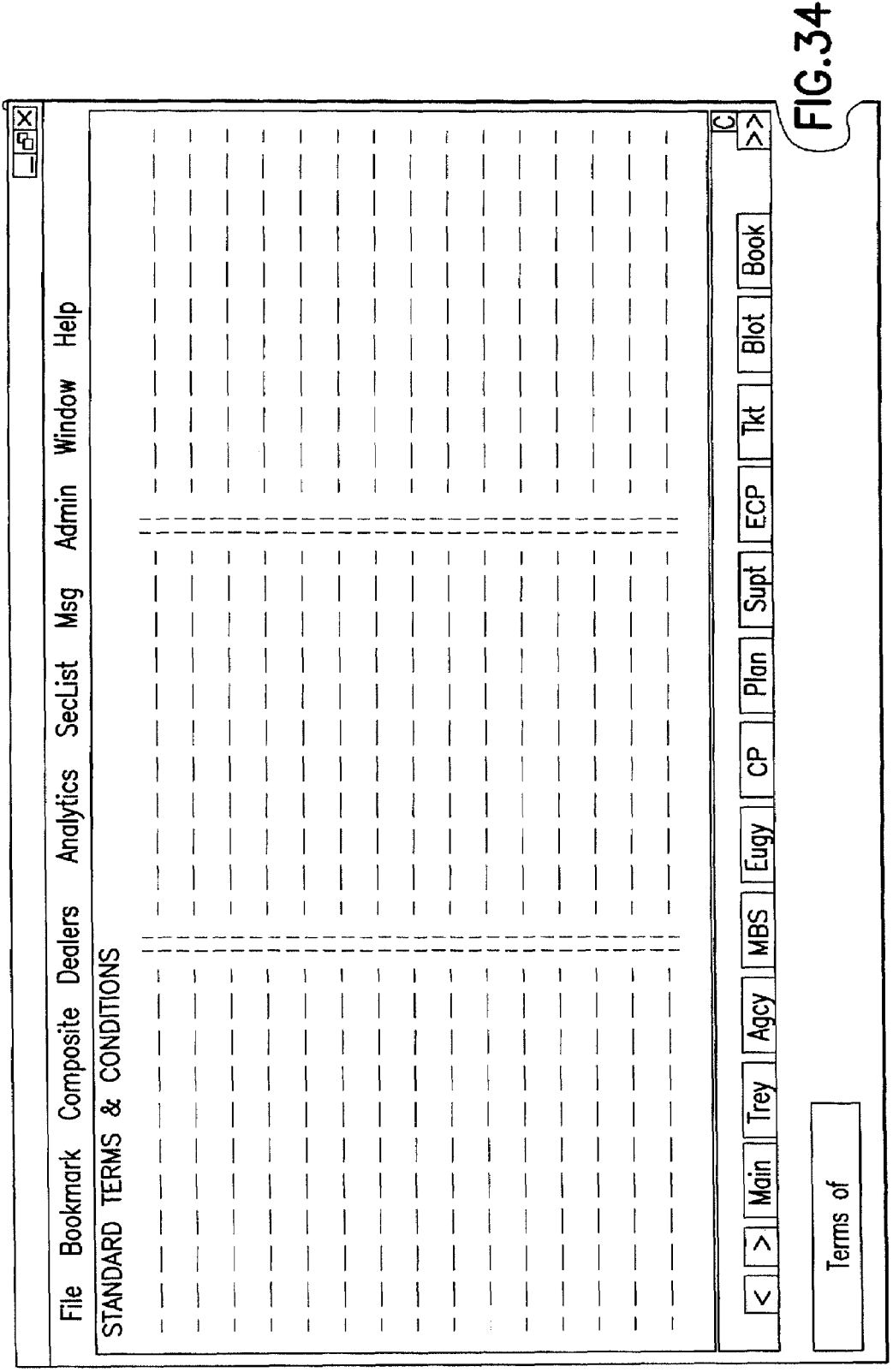

In operation, the ETC is populated by the STP trading platform 100 using the enriched trade details and allocations stored in the trade history database 115 and the settlement instructions retrieved from the account management database 110 to preferably provide a standardized electronic confirmation as required by government regulation. (e.g., SEC Rule 10b-10). Persons of skill will recognize that additional dealer disclosures can be automatically inserted or manually input into the standardized ETC form. Once the ETC is generated on the dealer-side, through transmission of the ETC through the STP trading platform 100, the customer receives and can review and electronically confirm the trade details 3205 through the STP trading platform 100 by indicating an acceptance of the ETC—for example, by clicking a "affirm" button 3210 on an exemplary ETC 3200 as shown in FIG. 32. FIGS. 33 and 34 depict an exemplary ETC that includes both trade detail and settlement information, as well as the dealer's standard terms and conditions. Upon confirmation by a customer, in step 31k, the STP trading platform 100 would display the transaction state as "AFFM".

Each of the customer and dealer would have the ability to view, download, and/or print their ETCs through the STP trading platform 100, and may establish default procedures pursuant to which such ETCs are downloaded and/or printed automatically. ETCs would also preferably be stored electronically by the STP trading platform 100 in the trade history database 115, although this feature is not required.

The STP trading platform 100 may also enable the customer (or a custodian or designated third party on behalf of the customer) to accept the trade details and settlement instructions in a number of different ways. First, the customer may use the back office management tools provided by the STP trading platform 100 to receive the trade details and the related settlement instructions from the dealer and manually compare the information it receives against its internal records. If the customer agrees that the information it received from the dealer matches with the information in its database, the customer will transmit an indication that the customer affirms the trade details and the settlement instructions via the STP trading platform 100 to the dealer.

Alternatively, the STP trading platform 100 may provide functionality to enable customers to electronically affirm trade details and settlement instructions in order to electronically match trade data submitted by dealers and customers. In such instances, the electronic confirmation would be based on the matched trade data and other information provided. In one exemplary embodiment, the STP trading platform 100 records the trade details on behalf of the customer as trades are effected via the electronic trading module 160 of the STP trading platform 100, as described above. In a second exemplary embodiment, trade information is made available to the STP trading platform 100 through an API that interacts with the customer's internal trade processing systems and/or order management systems, as also described above.

The trade details and settlement instructions provided by the customer are then electronically matched by the STP trading platform 100 to trade details and settlement instructions provided by the dealer on the STP trading platform 100. If the trade details and settlement instructions received from the dealer match the information provided or made available to the STP trading platform 100 by the customer, the STP trading platform 100 will electronically and automatically affirm the trade on behalf of the customer.

The STP trading platform 100 may also transmit the affirmed trade confirmation (in accordance with the applicable self-regulatory organization rules) directly to a depository, such as the Depository Trust & Clearing Corporation ("DTCC") or a settlement agent for settlement of the trade.

Back Office Management Tools

Figure 35:
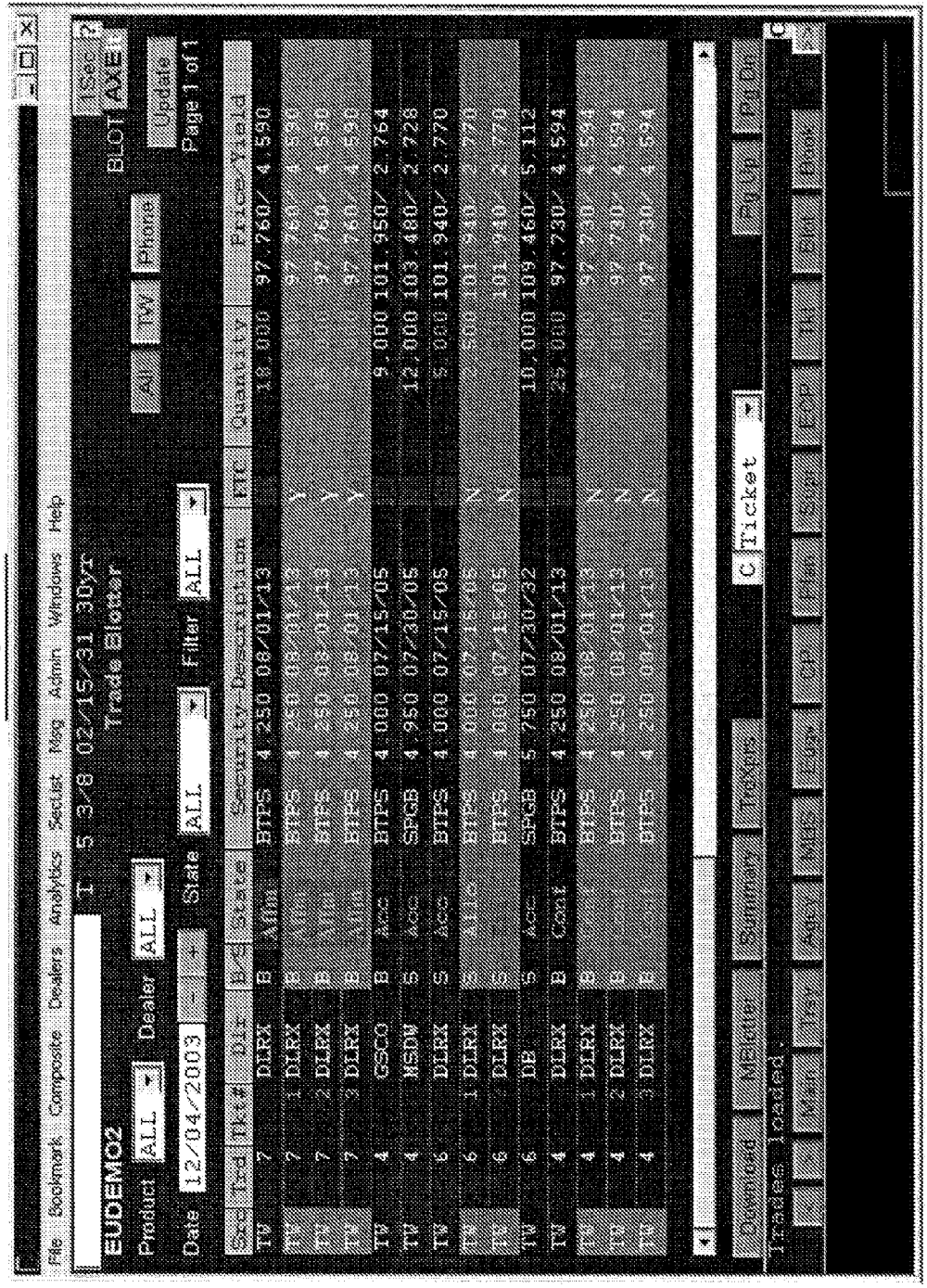
Figures 36, 36A, 36B:
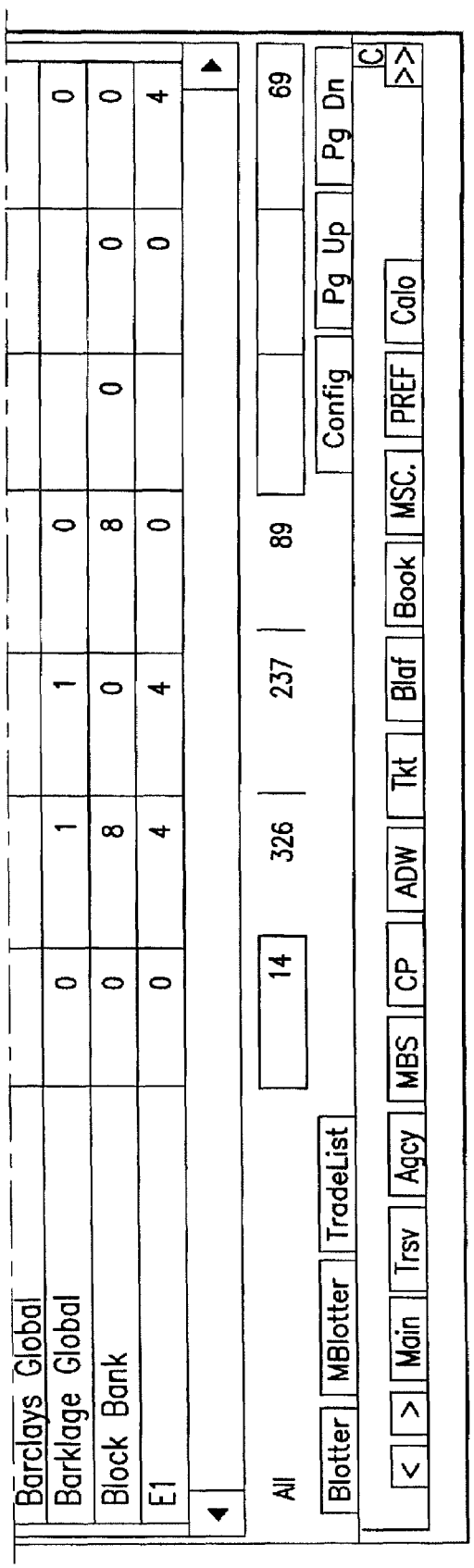

According to an exemplary embodiment, as shown in FIGS. 35-36, both customers and dealers are provided access through a back office management module 140 to a master trade blotter interface, as well as various summary interfaces. The interfaces display various details for executed trades, including the status of the trade. The details listed in the master blotter interface are populated from the trade history database 115.

In the exemplary embodiment, the functionality of the master blotter, shown in FIGS. 35-36, is controlled through integration of the customer-side and dealer-side back office management components 220, 270 and the back office management module 140. As an example, the master blotter preferably can be sorted to view trades on a customer or ticker basis. Further, the master blotter can be sorted on a dealer, state, product, and date basis. Persons of skill will recognize that additional viewing and sorting functionality can be programmed into the back office management components 220, 270 of the back office management module 140 as a matter of design choice.

The back office management module 140 also provides a summary interface on which dealers and counterparts can view summary information related to their trades. Like the functionality of the master blotter, the functionality of the trade summary interface, shown in FIG. 36, is controlled through integration of the back office management client 220, 270 with the back office management module 140. On the customer-side, the summary interface preferably displays trade information on a dealer-by-dealer basis. The summary information preferably includes the number of trades, the number of trades cancelled or corrected, the number of block trades allocated or unallocated, the number of tickets generated, the number of trades confirmed or unconfirmed, and the number of trades for which there are errors. This summary interface allows back office personnel to quickly and efficiently determine whether any executed trades have outstanding issues that require attention. Similarly, the dealer has access to summary trade information on a customer-by-customer basis.

Settlement Instruction Validation

With reference to FIG. 2, in the exemplary embodiment, on a periodic basis, a settlement instruction validation system 180 compares the data in the account profiles stored on the account management system 110 to known data sources. By making such a comparison, the settlement instruction validation system 180 can determine whether there are any errors present in the stored settlement instructions.

By way of non-limiting example, on one level, the settlement instruction validation system 180 compares settlement instructions to databases such as the SWIFT BIC, the Euroclear code, and other like directories comprising codes for various entities and securities involved in the settlement process. Furthermore, the settlement instruction validation system 180 may perform character-based validation. In this example, the settlement instruction validation system 180 compares known standards for certain fields with the actual stored fields. For example, it is known that Bank Routing Number (or ABA number) must have 8-digits. The settlement instruction validation system 180 would detect an ABA number field with less than 8-digits. Errors can be reported in a summary validation report that may be issued daily, weekly, monthly, or on some other time basis as a matter of design choice. The reports would identify errors in stored settlement instructions and permit correction to avoid settlement failures.

Performance Reports

In the exemplary embodiment, as illustrated in FIG. 37-38, the STP trading platform 100 periodically or dynamically, as applicable, is programmed to generate performance reports for customers and dealers to enable enriched tracking of trade executed and STP performance. In particular, using recorded trade details, including but not limited to the number of trades, volume, and allocation details, reports may be generated to give customers or dealers the ability view an overview of their trading activity. As is evident from the illustrative reports of FIGS. 37 and 38, the STP trading platform 100 also preferably records data related to the percentage of trades allocated, the time to allocate and acknowledge allocation tickets as measured against benchmarks, the number of trades confirmed, unconfirmed or resulting in error, and the time to confirm as measured against benchmarks.

Moreover, as shown in FIG. 37, a performance report may be generated that provides the customer or dealer a view of how they rank as compared to other customers or dealers on a financial product basis.

These reports may be provided on a periodic basis (e.g., daily, weekly, or monthly) and in varying degrees of detail. Moreover, in a preferred embodiment, customers and dealers would have access to web-based accounts so as to access performance reports as desired. In such an embodiment, the performance reports are preferably dynamically updated in substantial real time such that recent trades, allocations, and confirmations are available to customers and dealers.

Thus, while there have been shown and described fundamental novel features of the invention as applied to the exemplary embodiments thereof, it will be understood that omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for effecting straight-through-processing of trades executed between a customer and a dealer, the system comprising:
   a trade execution system including one or more computer systems capable of generating a trade order and executing a block trade between the customer and the dealer based on the trade order wherein the trade order includes a pre-allocation of customer accounts, the trade execution system in communication with one or more customer computer systems and dealer computer systems having software operable thereon for permitting communication of trading data through the trade execution system;
   an account database for storing one or more account information records that are accessible by the trade execution system, the account information records being associated with one or more settlement instruction sets; and
   wherein the trade execution system is operative with programming to:
      store a block trade record including details of the block trade executed by the customer and the dealer;
      generate an allocated trade record for each of the account allocations received from the customer computer system, each of the allocated trade records being associated with the block trade record;
      receive an indication from the dealer computer system that the allocated trade records are confirmed;
      enrich the allocated trade records by incorporating one of the settlement instruction sets into each of the allocated trade records; and
      transmit each of the enriched allocated trade records to an appropriate clearing institution.

2. The system of claim 1, further comprising a trade history database wherein the block trade records and allocated trade records are stored, the block trade records and allocated trade records being accessible by the customer computer and dealer computer systems such that the customer and dealer can view summary reports.

3. The system of claim 1, wherein programming operative on the trade execution system is server-based programming that operates in conjunction with programming on the customer computer system and dealer computer system which is client-based programming to achieve a client-server environment.

4. The system of claim 3, wherein the server-based programming provides core trading, confirmation and settlement functionality and the client-based programming provides graphical interfaces viewable on the customer computer system and dealer computer system to enable the customer and dealer to interact with the server-based programming of the trade execution system.

5. The system of claim 4, wherein the graphical interfaces enable the customer to generate trade inquiries and transmit the trade inquiries to one or more dealers.

6. The system of claim 4, wherein the graphical interfaces enable the dealer to receive the trade inquiries and generate firm prices in response to the trade inquiries and transmit firm prices to the customer.

7. The system of claim 1, wherein the programming operable on the trade execution system includes an account management module for permitting the customer to manage the customer's account records, a back office management module for permitting the customer and the dealer to access current and historical trade details and create and generate trade history reports, and an electronic trading module for effecting trades between the customer and the dealer.

8. The system of claim 1, wherein the trade execution system includes at least an electronic trading module to:
   receive customer-initiated trade inquiries including pre-allocation of sub-accounts directed to one or more dealers;
   transmit the customer-initiated trade inquiries to the dealer computer system of the one or more dealers;
   receive a trade price from at least one of the dealer computer systems;
   transmit the trade price to the customer computer system;
   receive from the customer computer system an indication that the trade price is accepted; and
   execute a block trade at the accepted trade price.

9. The system of claim 8, wherein the indication is a click of a graphical button.

10. The system of claim 1, wherein the trade execution system includes at least an electronic trading module to:
    receive dealer-initiated trade inquiries, including at least the type of financial instruments to be traded, the price, and settlement details, directed to one or more customers;
    transmit the dealer-initiated trade inquiries to the customer computer system of the one or more customers;
    receive from at least one of the customer computer systems an indication that the trade price is accepted; and
    execute a block trade at the accepted trade price.

11. The system of claim 1, wherein the electronic trade system is further operable with programming to generate an electronic trade confirmation for each of the allocated trade records.

12. The system of claim 11, wherein the electronic trade confirmation includes at least trade details associated with the allocated trade record and a settlement instruction set.

13. The system of claim 11, wherein the electronic trade confirmation meets applicable government regulations.

14. The system of claim 13, wherein the electronic trade confirmation is configured to meet Rule 10b-10 of the Securities and Exchange Commission.

15. The system of claim 1, wherein the electronic trade system is further operable with programming to:
    receive block trade details corresponding to a trade executed by the customer and dealer.

16. The system of claim 15, wherein the trade is executed via telephone.

17. The system of claim 15, wherein the trade is executed via an alternate trading system.

18. An electronic trading system for effecting and clearing trades between customers and dealers comprising:
    a processing system including one or more servers capable of communication via a network;
    an account database capable of communication with the processing system via the network, the account database configured to store account information for each of the customers, each of the sub-accounts being mapped to a corresponding set of settlement instructions; and a trade history database for storing details of trades effected and cleared on the electronic trading system;

wherein the processing system is operative with a trade execution module to process trades between a customer and a dealer, and wherein the processing system is further operative with an account management module to permit customers to make sub-account allocations of the trades, the processing system generating one or more trade tickets for each sub-account allocation and, in response to an acceptance indication received from a dealer, enriching the trade tickets with settlement instructions stored in the account database, the processing system generating an electronic confirmation in accordance with government regulations and presenting the electronic confirmation to the customer and dealer.

19. A method of validating a plurality of settlement instruction sets stored on an account database, the method comprising:

comparing information stored in the plurality of settlement instruction sets with a first information database;

determining whether an error in one or more of the settlement instruction sets exists; and reporting the error to the appropriate party.

20. The method of claim 19, wherein the first information database is a SWIFT BIC database.

21. The method of claim 19, wherein the first information database is a Euroclear code directory.

22. The method of claim 19, further comprising performing field level validation of information stored in the plurality of settlement instruction sets.

23. The method of claim 22, wherein the step of performing field level validation comprises comparing the number of characters stored in a field to a known correct number of characters.

24. The method of claim 19, wherein the method of electronically presenting a dealer axe to one or more selected customers, the method comprising:

initiating an axe generation module;

inputting axe details into an interface provided by the axe generation module;

generating an electronic axe trade ticket wherein the axe trade ticket is actionable by the customers for a quantity up to a total axe quantity or only for the total axe quantity;

transmitting the electronic axe trade ticket to the one or more selected customers;

receiving an indication from at least one of the selected customers that the axe details in the electronic axe are acceptable.

25. The method of claim 24, wherein the axe generation module is triggered by an action of the customer.

26. The method of claim 25, wherein the action of the customer is the cancellation of a dealer price received in response to a customer-initiated trade inquiry.

27. The method of claim 24, wherein the axe generation module is initiated by an action of the dealer.

28. The method of claim 24, further comprising:

receiving the indication that the axe details in the electronic axe are acceptable;

executing an axe trade based on the axe details;

receiving an allocation from the customer for the axe trade;

generating electronic trade tickets for each allocation of the axe trade;

enriching the electronic trade tickets with settlement instructions; and generating an electronic confirmation.

29. The method of claim 28, wherein the electronic confirmation conforms to SEC Rule 10b-10.

30. The method of claim 19, wherein the method for incorporating a settlement instruction set from an account information record into a trade record storing details of a trade, the method comprising:

detecting a first indicia of the trade; and accessing the appropriate account information record and determining the appropriate settlement instruction set using the first indicia.

31. The method of claim 30, further comprising:

detecting a second indicia of the trade if the appropriate settlement instruction set cannot be determined using the first indicia; and accessing the appropriate account information record and determining the appropriate settlement instruction set using the first indicia and the second indicia.

32. A system for effecting straight-through-processing of trades executed between a customer and a dealer, the system comprising:

a trade execution system including one or more computer systems capable of generating a trade order and executing a block trade between the customer and the dealer based on the trade order wherein the trade order includes a pre-allocation of customer accounts;

an account database for storing one or more account information records that are accessible by the trade execution system, the account information records being associated with one or more settlement instruction sets; and wherein the trade execution system is operative with programming to:

store a block trade record including details of the block trade executed on the trade execution system;

generate an allocated trade record associated with the block trade record for each pre-allocation of customer accounts;

receive an indication that the allocated trade records are confirmed;

enrich the allocated trade records by incorporating one of the settlement instruction sets into each of the allocated trade records; and transmit each of the enriched allocated trade records to an appropriate clearing institution.

* * * * *